(12) United States Patent
Kwon

(10) Patent No.: US 11,848,545 B2
(45) Date of Patent: Dec. 19, 2023

(54) AUTOMATIC OPENING AND CLOSING STRIPPING DEVICE FOR INDIRECT LIVE WIRE HAVING WIRE STRIPPING AND TAPING FUNCTIONS, AND METHODS FOR STRIPPING AND TAPING INDIRECT LIVE WIRE USING SAME

(71) Applicants: DAEWON ELECTRIC CO., LTD., Cheongju-si (KR); DAEWON INDUSTRY COMPANY, Chungcheongbuk-do (KR)

(72) Inventor: Sae Won Kwon, Chungcheongbuk-do (KR)

(73) Assignees: DAEWON ELECTRIC CO., LTD, Cheongju-si (KR); DAEWON INDUSTRY COMPANY, Chungcheongbuk-do (KR)

( * ) Notice: Subject to any disclaimer, the term of this patent is extended or adjusted under 35 U.S.C. 154(b) by 347 days.

(21) Appl. No.: 17/433,061

(22) PCT Filed: Feb. 10, 2020

(86) PCT No.: PCT/KR2020/001800
§ 371 (c)(1),
(2) Date: Aug. 23, 2021

(87) PCT Pub. No.: WO2020/175815
PCT Pub. Date: Sep. 3, 2020

(65) Prior Publication Data
US 2022/0123534 A1   Apr. 21, 2022

(30) Foreign Application Priority Data
Feb. 27, 2019   (KR) .................. 10-2019-0022909

(51) Int. Cl.
*H02G 1/12* (2006.01)
*B25G 1/04* (2006.01)
(Continued)

(52) U.S. Cl.
CPC ............. *H02G 1/1224* (2013.01); *B25G 1/04* (2013.01); *H01B 13/06* (2013.01); *H01B 13/0808* (2013.01)

(58) Field of Classification Search
None
See application file for complete search history.

(56) References Cited

FOREIGN PATENT DOCUMENTS

JP   2009-142009 A   6/2009
KR   20-2016-0004445 U   12/2016
(Continued)

*Primary Examiner* — Barbara J Musser
(74) *Attorney, Agent, or Firm* — NKL Law; Jae Youn Kim

(57) ABSTRACT

Proposed are a device which is used as both a taping device and a stripping device and is used for stripping or taping a coating of an extra-high-voltage wire in a live wire state and, more particularly, an automatic opening and closing stripping device for an indirect live wire having wire stripping and taping functions, and methods for stripping and taping an indirect live wire using the automatic opening and closing device. The automatic opening and closing stripping device for an indirect live wire having wire stripping and taping functions allows an insulation stripping or taping operation to be performed on a wire in a live wire state while not being close to the wire, thus securing safety, allows a stripping operation and various taping operations to be performed by using one equipment.

32 Claims, 34 Drawing Sheets

(51) Int. Cl.
*H01B 13/06* (2006.01)
*H01B 13/08* (2006.01)

(56) References Cited

FOREIGN PATENT DOCUMENTS

| KR | 10-1693146 B1 | 1/2017 |
| KR | 10-1912558 B1 | 10/2018 |
| KR | 10-1946206 B1 | 2/2019 |

AUTOMATIC OPENING AND CLOSING STRIPPING DEVICE FOR INDIRECT LIVE WIRE HAVING WIRE STRIPPING AND TAPING FUNCTIONS, AND METHODS FOR STRIPPING AND TAPING INDIRECT LIVE WIRE USING SAME

TECHNICAL FIELD

The present invention relates to a device which is used as both a taping device and a stripping device used for stripping or taping a wire in an extra-high-voltage live wire state and, more particularly, to an automatic opening and closing stripping device for indirect live wires having wire stripping and taping functions, which allows an insulating stripping operation to be performed on a wire in a the state in which a sufficiently safe distance is assured so as to enable a worker to secure safety, particularly allows the lead-in and stripping operations of the wire or the taping operation of the wire to be automatically performed without requiring an additional tool through continuous rotation manipulation, and allows release and withdrawal of the wire from an operator head to be performed by reverse rotation of a driving unit so as to finish the operation, and methods for stripping and taping an indirect live wire using the automatic opening and closing stripping device for indirect live wires having wire stripping and taping functions.

BACKGROUND ART

Power equipment is being continuously increased in response to surge in power demand, as the level of electricity quality required by electricity users rises, momentary power failure becomes a target of public grievance, group actions and litigation cases of electricity users, such as compensation claims, tend to be increased, and thus, an uninterruptible method, in which power distribution work is performed in the state in which power is not interrupted (i.e., in a live wire state) so as to supply high-quality electricity, is carried out.

Further, in a process for performing the above-described uninterruptible work, live wire work was conventionally performed through indirect live wire work (using a live wire stick), but such indirect live wire work causes restriction of the range of the work and considerable working time delay due to inconvenience, difficulty and a complicated procedure of the work.

Therefore, as various equipment is being developed recently, using a wire stripper disclosed in Korean Patent Registration No. 10-1436026 filed by the applicant of the present invention, a worker easily approaches an electric line using a live wire bucket truck and thus direct work in which the worker directly contacts the electric line while wearing insulation equipment is generalized, and the direct work expands the range of the work and is far superior to the indirect work in terms of working time and work efficiency.

However, because the worker comes into direct contact with the electric line or works very close to the electric line, an accident may frequently occur and thus the need to stop and reduce the uninterruptible work is raised.

Further, because the entirety of the casing of a stripping tool is rotated so as to strip the sheath of a wire, the stripper is big and heavy, and thus, the stripper comes into direct contact with the wire in a live wire state so as to manually strip the wire or the casing of the stripper comes into direct contact with the wire in the live wire state using a hand-operated tool so that the wire is inserted thereinto, and a stripping operation is very difficult and dangerous.

Therefore, in order to solve the above problems, the applicant of the present invention proposed an insulating stripper for extra-high-voltage wires, which may perform the insulating stripping operation of a live wire even in the state in which the stripper is not close to an electric line so as to secure safety in the stripping operation, as disclosed in Korean Patent Registration No. 10-1693146.

However, such a stripper has a very complicated structure and is thus inconvenient to use, particularly, the wire must be manually led into an operator head and gripped, the stripper alone is provided, and thus, when uninterruptible distribution line work is performed on a wire in the live wire state, various operations, such as a stripping operation and a taping operation in which the end of an insulating tape are held to the wire using a separate stick tool, may be performed, but efficiency may be lowered.

RELATED ART DOCUMENT

Patent Document

Patent Document 1 Korean Patent Registration No. 10-1436026
Patent Document 2 Korean Patent Registration No. 10-1693146

DISCLOSURE

Technical Problem

Therefore, the present invention has been made in view of the above problems, and it is an object of the present invention to provide an automatic opening and closing stripping device for indirect live wires having wire stripping and taping functions and methods for stripping and taping an indirect live wire using the same, which allow an operator head to be automatically open and closed through continuous rotation manipulation in the state in which the device is not close to an electric line and thus allow an insulating stripping or taping operation to be performed on a wire in a live wire state through continuous so as to secure safety in the stripping or taping operation, and enhance convenience in use and durability through structural improvement of the device.

It is another object of the present invention to provide an automatic opening and closing stripping device for indirect live wires having wire stripping and taping functions and methods for stripping and taping an indirect live wire using the same, which allow not only a stripping operation but also various taping operations using an insulating tape, as needed, to be performed using one equipment so as to improve efficiency in use.

It is a further object of the present invention to provide an automatic opening and closing stripping device for indirect live wires having wire stripping and taping functions and methods for stripping and taping an indirect live wire using the same, which allow lead-in and gripping operations of the wire and a stripping or taping operation of the wire to be automatically performed without separately performing the lead-in and gripping operations of the wire and the stripping or taping operation of the wire and without additionally requiring a separate stick tool to fix the end of an insulating tape to the wire through one continuous rotation manipulation, allow release and withdrawal of the wire from an operator head to be performed by reverse rotation of a driving unit so as to finish the operation, and thus achieve convenience in manipulation of the device and convenience in operation.

Technical Solution

In accordance with an aspect of the present invention, the above and other objects can be accomplished by the provision of an automatic opening and closing stripping device for indirect live wires having wire stripping and taping functions, including, a driving unit including a driving unit body provided in a form of a pipe having a hollow formed therein, a drive shaft axially installed around the driving unit body and provided with a first bevel gear located therein so that a rotating tool is combined therewith, an interlocking shaft axially installed in a front part of the driving unit body and provided with a second bevel gear provided at a rear part of the interlocking shaft so as to be engaged with the first bevel gear, and a handle combined with a rear part of the driving unit body and configured to provide rotating power;

an insulating extension stick provided in a form of a pipe having a hollow formed therein, combined with a front part of the driving unit body, configured to have a designated length so as to protrude, and provided with a power transmission rod formed therein without interference and combined with the interlocking shaft so as to be rotated by receiving the rotating power;

an adaptor unit including an adaptor body provided in a form of a pipe and configured such that a front part of the insulating extension stick is combined with the adaptor unit, and an adaptor rod provided inside the adaptor body and configured such that the power transmission rod is combined with a rear part of the adaptor rod;

an operator head provided with an adapter combination pipe provided at a rear end of the operator head so as to be inserted into the adaptor body, a rotation guide hole formed through a center of the operator head in a width direction and provided with power unit receipt recesses respectively formed at both sides of an inside of the rotation guide hole, and a wire lead-in groove formed at an upper part of the operator head so as to lead a wire thereinto;

a rotating power unit combined with the power unit receipt recesses of the operator head so as to lead the wire thereinto together with the operator head, and rotated by receiving the rotating power from the adaptor unit; and a working tool detachably combined with the rotating power unit so as to perform stripping or taping of the wire placed in the working tool through a rotating operation of the rotating power unit, wherein the working tool includes any one of a stripping tool configured to strip the wire and a taping tool configured to tape the wire, and is mounted on the rotating power unit.

In accordance with another aspect of the present invention, there is provided a method for stripping an indirect live wire using an automatic opening and closing stripping device for indirect live wires having wire stripping and taping functions which has a driving unit configured to provide rotating power, an insulating extension stick combined with a front part of the driving unit body and configured to protrude, an adaptor unit configured such that a front part of the insulating extension stick is combined therewith, an operator head combined with the adaptor unit, a rotating power unit combined with the operator head so as to be rotated, and a working tool combined with the rotating power unit so as to strip the wire, the method including, preparing for an operation such that the automatic opening and closing stripping device for indirect live wires having wire stripping and taping functions to strip the wire is prepared by mounting a stripping tool as the working tool on the rotating power unit on the operator head using stripping tool holders, and the prepared automatic opening and closing stripping device for indirect live wires having wire stripping and taping functions to strip the wire approaches an electric line;

gripping a wire such that a worker inserts the wire into the operator head at a safe distance from the wire using the insulating extension stick of the prepared automatic opening and closing stripping device for indirect live wires having wire stripping and taping functions;

stripping the wire such that the wire is stripped by driving the rotating power unit in a regular direction by operating the driving unit though rotation of a rotating tool in an indirect live wire state at the safe distance from the wire through the insulating extension stick; and separating the wire such that a sheath stripped from the wire is cut in a state in which stripping of the wire is completed, and the wire is separated from the operator head by driving the rotating power unit in a reverse direction.

In accordance with a further aspect of the present invention, there is provided a method for taping an indirect live wire using an automatic opening and closing stripping device for indirect live wires having wire stripping and taping functions which has a driving unit configured to provide rotating power, an insulating extension stick combined with a front part of the driving unit body and configured to protrude, an adaptor unit configured such that a front part of the insulating extension stick is combined therewith, an operator head combined with the adaptor unit, a rotating power unit combined with the operator head and rotated, and a working tool combined with the rotating power unit so as to tape the wire, the method including, preparing for an operation such that the automatic opening and closing stripping device for indirect live wires having wire stripping and taping functions so as to tape the wire is prepared by mounting a taping tool as the working tool on the rotating power unit on the operator head using taping tool holders or a single taping tool holder and mounting an insulting tape on a bobbin, applying pressure to a circumference of the insulating tape using tension members and unwinding the insulating tape so that an end of the insulating tape is fixed to a tape fixing bar, and the prepared automatic opening and closing stripping device for indirect live wires having wire stripping and taping functions approaches an electric line;

gripping a wire such that a worker inserts the wire into the operator head at a safe distance from the wire using the insulating extension stick of the prepared automatic opening and closing stripping device for indirect live wires having wire stripping and taping functions;

taping the wire such that the wire is taped by driving the rotating power unit in a regular direction by operating the driving unit though rotation of a rotating tool in an indirect live wire state at the safe distance from the wire through the insulating extension stick; and separating the wire such that the wire is separated from the operator head by driving the rotating power unit in a reverse direction in a state in which taping of the wire is completed, and the insulating tape is cut.

Advantageous Effects

As described above, in an automatic opening and closing stripping device for indirect live wires having wire stripping and taping functions and methods for stripping and taping an indirect live wire using the same according to the present invention, a head unit configured to grip and strip a wire is provided to have a designated length through an insulating extension stick having a driving unit provided at the rear part thereof, and thus, a stripping operation of the wire in an indirect live state or a taping operation of the wire to be performed without requiring a separate stick to fix the end of an insulating tape to the wire in the state in which a worker is not close to an electric line and thus a safe distance is assured, the automatic opening and closing stripping device may be conveniently used without any separate mounting unit, and the failure rate of the automatic opening and closing stripping device is remarkably reduced through improvement in structural simplification.

Further, the head unit includes a stripping unit or a detachably taping unit, and thus not only a stripping operation of the live wire but also a taping operation of the live wire using an insulating tape, as needed, to be performed using one equipment so as to improve efficiency in use.

Moreover, lead-in and gripping operations of the wire in an operator head and a stripping or gripping operation of the wire by driving of a rotating power unit may be performed through continuous rotation manipulation of a driving unit, and release and withdrawal of the wire from the operator head may be performed by reverse rotation of the driving unit so as to finish the operation, thereby being capable of achieving convenience in operation and remarkably reducing working time.

(Description of Marks and Reference Numbers)

Figure 1:
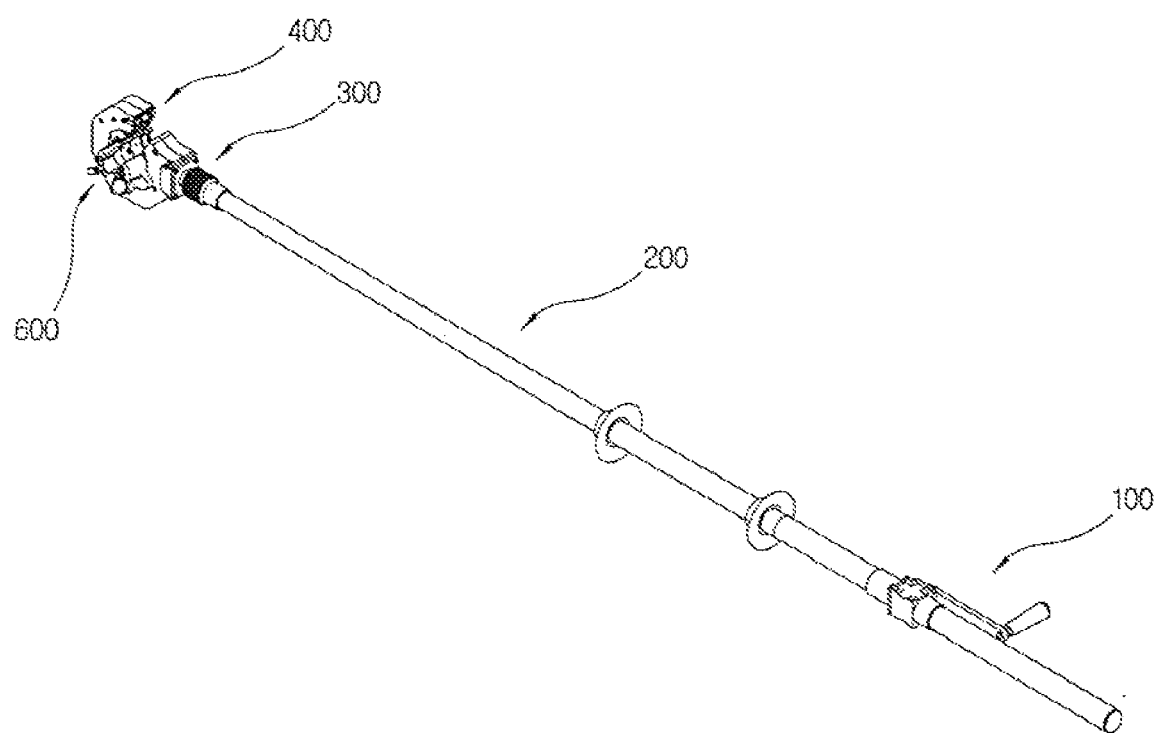
FIG. 1 is a perspective view of an automatic opening and closing stripping device for indirect live wires having wire stripping and taping functions according to the present invention.

| | |
|---|---|
| 100: driving unit | 110: driving unit body |
| 120: drive shaft | 121: first bevel gear |
| 122: tool combination groove | 130: interlocking shaft |
| 131: second bevel gear | 140: handle |
| 200: insulating extension stick | 210: power transmission rod |
| 300: adapter unit | 310: adapter body |
| 320: adapter rod | 350: locking unit |
| 351: locking guide groove | 352: locking ball |
| 353: ball receipt recess | 354: stopper |
| 355: protruding guide pin | 360: locking lever |
| 361: pressing protrusion | 362: stopping protrusion |
| 363: protruding guide groove | |
| 400: operator head | 411: adapter combination pipe |
| 411a: ball locking recess | 412: rotation guide hole |
| 413: power unit receipt recess | 414: wire lead-in groove |
| 415, 415': power gear fixing pin | 420: elastic movement recess |
| 430: elastic projection | 431: inclined plane |
| 440: tape fixing bar | 441: tape fixing groove |
| 450: tape cutter | |
| 500: rotating power unit | 510: power transmission unit |
| 511: power bevel gear | 512: power transmission shaft |
| 513: interlocking bevel gear | 514: interlocking gear |
| 520: first power gear | 521: holder installation hole |
| 522: holder fixing pin | 523: first gear part |
| 524: idling recess | 525: expanding projection |
| 525a: stopper operation groove | 525b: inclined engagement plane |
| 526: first shaft pipe | 526a: holder combination groove |
| 526b: elastic fixing pin | 526c: elastic guide groove |
| 527: power guide groove | 528: first wire lead-in groove |
| 529, 529': power gear fixing protrusion | 529a, 529a': inclined plane |
| 530: second power gear | 531: power guide pin |
| 532: second gear part | 533: second shaft pipe |
| 534: pressing tool guide bearing | 535: engagement groove |
| 538: second wire lead-in groove | 530: interlocking plate |
| 541: third shaft pipe | 544: pressing tool guide bearing |
| 548: third wire lead-in groove | 550, 550': finishing member |
| 560: anti-rotation stopper | 561: stopping protrusion |
| 600: working tool | |
| 700: stripping tool | 710, 710': stripping tool holder |
| 711: stripped wire receipt recess | 714a: guide pin |
| 715: holder combination hole | |
| 716: elastic fixing pin | 717: elastic guide groove |
| 718: holder combination pin | 718a: inclined plane |
| 718b: fixing pin engagement groove | 719a: stripping blade guide groove |
| 719b: spring installation groove | 720, 720': wire pressing tool |
| 721: stripped wire pressing recess | 722: cam groove |
| 723: bearing fixing recess | 724: stripping blade guide bearing |
| 725, 725': cutting protrusion | |
| 730: stripping unit | 740: stripping blade holder |
| 741: pressing support | 750: stripping blade |
| 760: sheath collection bar | 761: winder spring |
| 762: engagement projection | 770: discharge guide hole |
| 780: discharge guide member | 781: inclined guide plane |
| 800: taping tool | 801: taping tool holder |
| 802: taped wire inner diameter expansion receipt recess | 810, 810': taping tool holder |
| 811: taped wire receipt recess | 814a: guide pin |
| 815: holder combination hole | 816: elastic fixing pin |
| 817: elastic guide groove | 818: holder combination groove |
| 818a: inclined plane | 818b: fixing pin engagement groove |
| 820, 820': wire pressing tool | 821: taped wired pressing groove |
| 822: cam groove | 823: bearing fixing groove |
| 830: taping machine mount unit | 831: mount bar |
| 832: engagement recess | 835: interval adjuster |
| 836: fixing lever | 837: shaft combination pipe |
| 838: holder combination pin | 838a: inclined plane |
| 838b: fixing pin engagement groove | |
| 840: taping machine | 850: taping machine body |
| 851: combination shaft | 852: sliding hole |
| 860: tape mount unit | 861: bobbin |
| 865: bobbin finishing cap | 880: tension unit |
| 881: slider | 881a: nut sliding hole |
| 882: guide rod | 883: connector |
| 883a: tension member | 884: screw shaft |
| 885: nut | |
| 890: extension shaft | |
| 891: combination projection | 892: second shaft combination pipe |

BEST MODE

Terms or words used in the following description and the claims are not interpreted as being limited to usual or dictionary meanings, and are interpreted as having meanings and concepts according with the technical scope of the present invention based on the principle that the inventor(s) can appropriately define the concept of a term so as to describe their own invention in the best mode.

Therefore, embodiments disclosed in the description and the drawings are merely exemplary but do not represent all of the technical scope of the present invention, and thus, it will be understood that there are various equivalents and modifications as substitutes of the embodiments at the time of filing of the present invention.

Hereinafter, preferred embodiments of the present invention will be described in detail with reference to the accompanying drawings.

First, an automatic opening and closing stripping device for indirect live wires having wire stripping and taping functions will be described, and FIG. 1 is a perspective view of the automatic opening and closing stripping device for indirect live wires having wire stripping and taping functions according to the present invention.

As shown in FIG. 1, an automatic opening and closing stripping device 1 for indirect live wires having wire stripping and taping functions according to the present invention includes a driving unit 100, an insulating extension stick 200, an adapter unit 300, an operator head 400, and a working tool 600.

Figure 2:
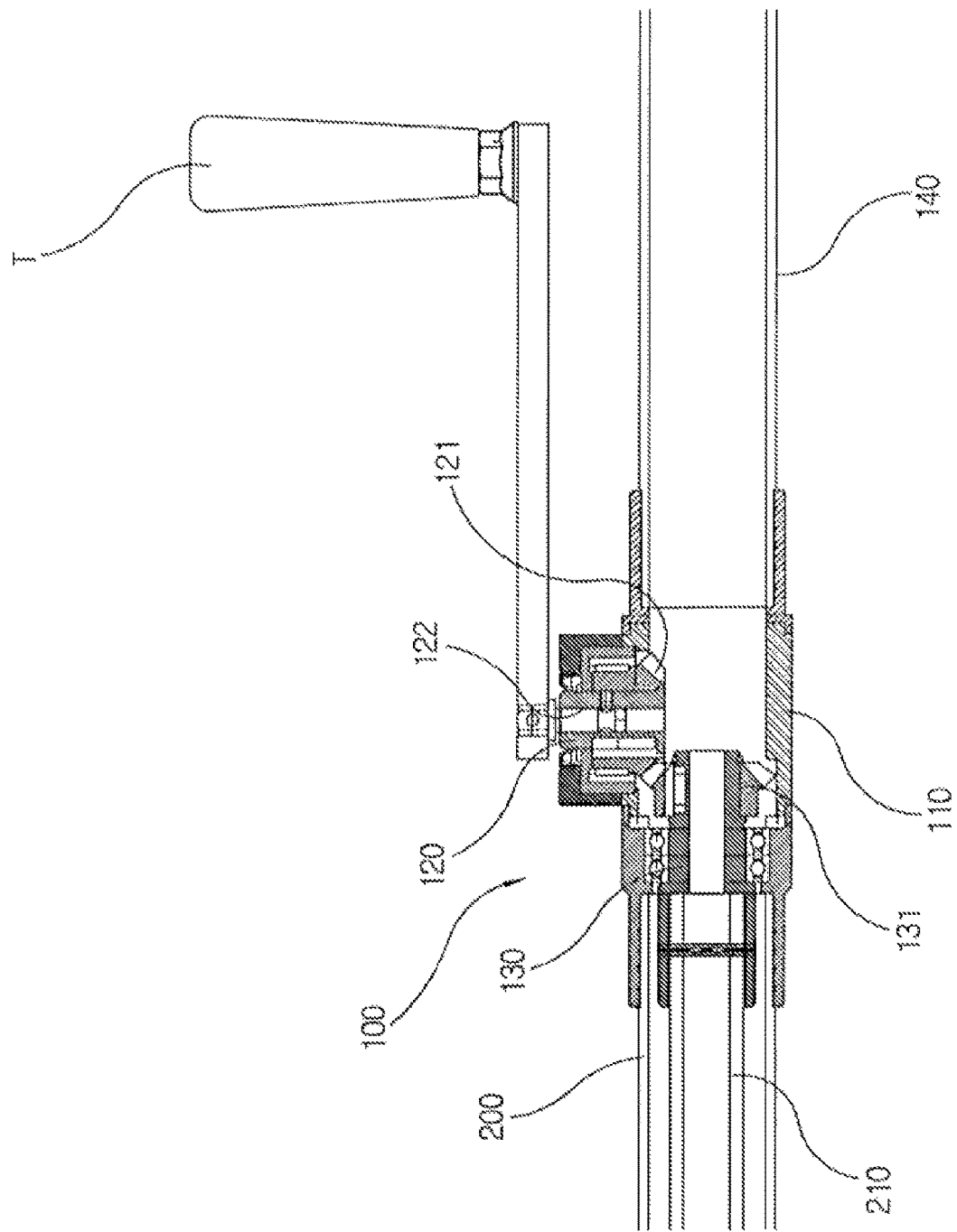
FIG. 2 is a cross-sectional view of a principal part of a driving unit of the automatic opening and closing stripping device for indirect live wires having wire stripping and taping functions according to the present invention.

First, the driving unit 100 of the automatic opening and closing stripping device 1 for indirect live wires having wire stripping and taping functions according to the present invention is configured to control driving of the operator head 400, which will be described below, and, referring to FIG. 2, the driving unit 100 includes a driving unit body 110, a drive shaft 120, an interlocking shaft 130, and a handle 140.

First, the driving unit body 110 is provided in the form of a pipe having a hollow formed therein and extending to have a lateral length.

The drive shaft 120 is axially installed around the driving unit body 110 at right angles with the driving unit body 110 through a bearing or the like, and a first bevel gear 121 located inside the driving unit body 110 is provided at the front end of the drive shaft 120.

Further, a tool combination groove 122 provided in the form of an angular groove, which is open outwards so that a rotating tool T is combined therewith, is formed in the center of the drive shaft 120, and in this case, a tool which is used is not limited to the rotating tool T and other tools, such as a hand-operated rotating handle or an electric tool, may be combined with the tool combination groove 122.

The interlocking shaft 130 is axially installed in the front part of the driving unit body 110 through a bearing or the like so as to generate rotating power, and a second bevel gear 131, which is engaged with the first bevel gear 121 so as to change a rotating direction, is provided at the rear part of the interlocking shaft 130.

The handle 140 is provided in the form of a pipe extending to have a length, is combined with the rear part of the driving unit body 110 so as to be gripped by a worker, and is preferably formed of an insulator.

That is, the driving unit 100 is configured to control the rotating operation of a rotating power unit 500, which will be described below, the drive shaft 120 is rotated when the rotating tool T is combined with the tool combination groove 122 of the drive shaft 120 and thus transmits rotating power to the drive shaft 120, and thereby, the rotating direction of the drive shaft 120 is changed by the second bevel gear 131 engaged with the first bevel gear 121 and thus rotates the interlocking shaft 130.

The insulating extension stick 200 of the automatic opening and closing stripping device 1 for indirect live wires having wire stripping and taping functions according to the present invention is configured to allow a worker to assure a safe distance from the operator head 400 on which a gripping operation is performed and a wire, which will be described below, is mounted.

Figure 3:
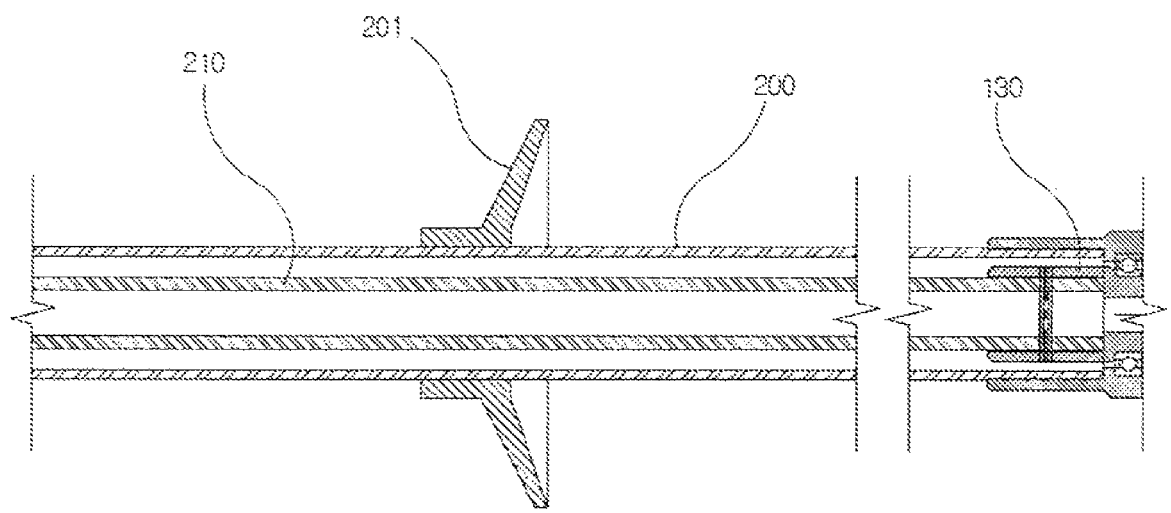
FIG. 3 is a cross-sectional view of a principal part of an insulating extension stick of the automatic opening and closing stripping device for indirect live wires having wire stripping and taping functions according to the present invention.

For this purpose, the extension stick 200 is provided in the form of a pipe having a hollow formed therein, formed of an insulator and extending to have a safe distance, as shown in FIG. 3, and the extension stick 200 protrudes forwards in the state in which the rear part of the extension stick 200 is combined with the front part of the driving unit body 110.

Here, at least one fixing wing 201 configured to fix a worker's hand and to prevent contact of the worker's hand with the wire during a process of gripping the wire by the worker is provided around the insulating extension stick 200.

Further, a power transmission rod 210, which is combined with the front part of the interlocking shaft 130 and is rotated by receiving the rotating power from the interlocking shaft 130, is provided inside the insulating extension stick 200, and the power transmission rod 210 is spaced apart from the inner circumferential surface of the insulating extension stick 200 so that the rotation of power transmission rod 210 is not interfered with by the insulating extension stick 200.

That is, the insulating extension stick 200 assures a distance between the worker and the operator head 400, on which the wire is mounted, so as to facilitate a safe operation during process of stripping or taping the wire, and is gripped, together with the handle 140, by the worker so as to facilitate a stable operation.

The adaptor unit 300 of the automatic opening and closing stripping device 1 for indirect live wires having wire stripping and taping functions according to the present invention is configured to serve as a medium to transmit rotating power to the rotating power unit 500, which will be described below.

Figure 4:
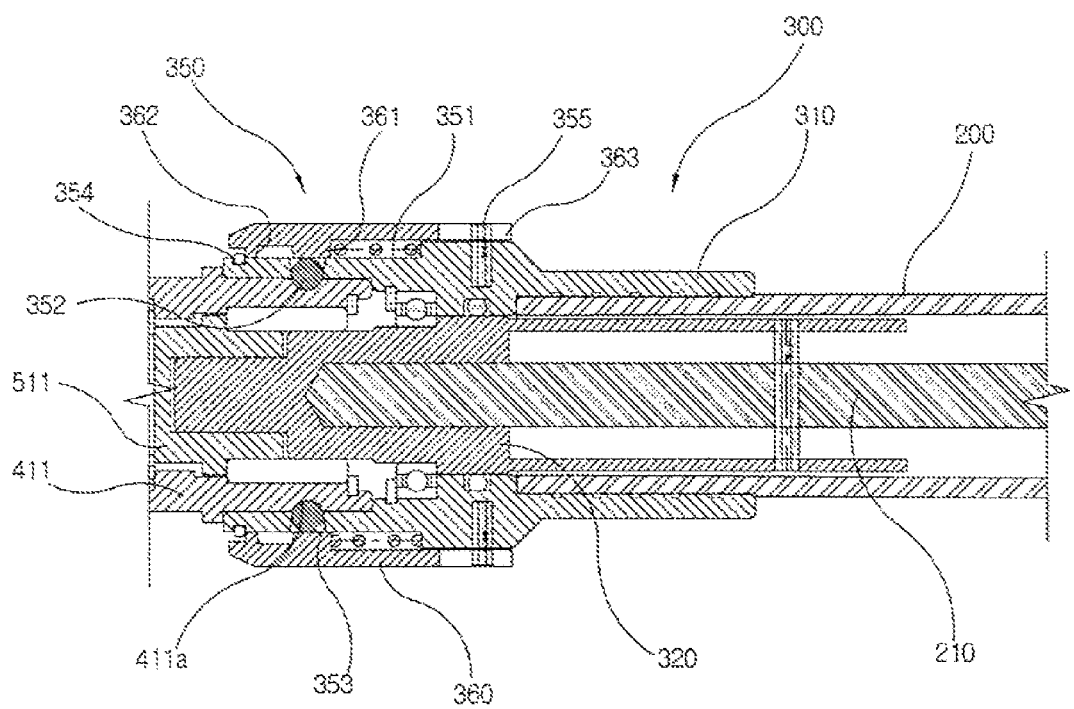
FIG. 4 is a cross-sectional view of a principal part of an adaptor unit of the automatic opening and closing stripping device for indirect live wires having wire stripping and taping functions according to the present invention.

For this purpose, referring to FIG. 4, the adaptor unit 300 includes an adaptor body 310 and an adaptor rod 320.

First, the adaptor unit 300 is provided in the form of a pipe, and is configured such that the rear part thereof is combined with the front part of the insulating extension stick 200.

The adaptor rod 320 is axially installed inside the adaptor body 310 through a bearing or the like so as to be rotatable, and is configured such that the rear part of the adaptor rod 320 is combined with the front end of the power transmission rod 210 and a power bevel gear 511, which will be described below, is combined with the front part of the adaptor rod 320.

That is, the adaptor unit 300 serves as a medium to receive rotating power from the power transmission rod 210 and then to transmit the rotating power to the power bevel gear 511 of the rotating power unit 500.

The operator head 400 of the automatic opening and closing stripping device 1 for indirect live wires having wire stripping and taping functions according to the present invention is configured to confine the wire so as to strip or tape the wire and configured to guide the rotating power of the rotating power unit 500, which will be described below, mounted on the operator head 400, and, referring to FIGS. 5 to 7, the operator head 400 is divided into two parts in the width direction and configured such that the rotating power unit 500, which will be described below, is mounted thereon, and is then combined.

Here, an adapter combination pipe 411 is provided at the rear end of the operator head 400 so as to be inserted into the adaptor body 310.

Further, a rotation guide hole 412 having a circular shape is formed through the center of the operator head 400 in the width direction, and a power unit receipt recess 413, which is stepped, is formed at each of both sides of the inside of the rotation guide hole 412 so that the rotating power unit 500, which will be described below, may be mounted therein.

In addition, a wire lead-in groove 414 configured to communicate with the rotation guide hole 412 so as to guide a wire to be stripped or taped is provided in the upper part of the operator head 400, and the wire lead-in groove 414 is inclined so as to head from the rear region of the upper part of the operator head 400 to the center of the rotation guide hole 412.

Further, the operator head 400 may be configured to fix an insulating tape prior to taping of the wire, and to cut the insulating tape after taping of the wire is completed.

For this purpose, a tape fixing bar 440 is provided at one side of the operator head 400 in the width direction, preferably at the upper part of a side surface of the operator head 400 on which a taping machine 840 is mounted.

Here, the tape fixing bar 440 protrudes from the operator head 400 towards the wire lead-in groove 414 by a designated distance, and a tape fixing groove 441, which is formed vertically so as to be open towards the wire lead-in groove 414, is formed between the side surface of the operator head 400 and the tape fixing bar 440.

Further, a tape cutter 450 is further provided on the operator head 400, and the tape cutter 450 is configured such that the upper end thereof is saw-toothed and is provided at the upper end of the operator head 400 forming the wire lead-in groove 414 so as to have a designated length in the width direction.

In the present invention, the operator head 400 may be detachably combined with the adaptor unit 300 by a locking unit 350.

For this purpose, referring again to FIG. 4, the locking unit 350 includes a locking guide groove 351 formed in the circumference of the front part of the adaptor body 310 and stepped to form a smaller diameter than the diameter of the adaptor body 310.

Further, a plurality of ball receipt recesses 353 is formed around the locking guide groove 351 at designated intervals, the ball receipt recesses 353 are configured such that the width thereof is gradually increased in the outward direction, and locking balls 352 are received in the respective ball receipt recesses 353 such that one side of each of the locking balls 352 protrudes towards the inside of the adaptor body 310.

Further, a stopper 354 is provided to protrude from the circumference of the front part of the locking guide groove 351, and the stopper 354 in the present invention may be provided as an O-ring which is detachably combined with a groove formed in the locking guide groove 351 so as to be combined with a locking lever 360, which will be described below.

In addition, protruding guide pins 355 configured to protrude outwards are provided at the rear end of the adaptor body 310.

Moreover, semicircular ball locking recesses 411a, with which the locking balls 352 protruding towards the inside of the adaptor body 310 are engaged, are provided on the circumference of the adapter combination pipe 411 of the operator head 400.

Further, the locking lever 360, which is installed at the rear end of the locking guide groove 351 so as to surround the adaptor body 310 and has forward protruding force due to a spring (not shown) elastically installed therein so as to control protrusion of the locking balls 352, is provided on the circumference of the adaptor body 310.

Here, the locking lever 360 includes a pressing protrusion 361 provided on the inner circumference surface of the locking lever 360 and configured to protrude towards the locking guide groove 351 so as to apply pressure to the locking balls 352 and to have the spring (not shown) elastically installed behind the pressing protrusion 361, and a stopping protrusion 362 provided on the front part of the inner circumference surface of the locking lever 360 and provided with the front end engaged with the stopper 354 so as to prevent forward release of the locking lever 360.

Here, the corresponding planes of the pressing protrusion 361 and the stopping protrusion 362 may be inclined such that the distance therebetween is decreased in the outward direction, and the reason for this is to effectively push the locking balls 352 through such an inclination during a process of applying pressure to the locking balls 352.

Further, a protruding guide groove 363, the forward and outward operation of which is guided by the protruding guide pins 355, is provided at the rear part of the locking lever 360.

That is, the locking unit 350 forms a space between the pressing protrusion 361 and the stopping protrusion 362 when the locking lever 360 is moved backwards and, when the adaptor combination pipe 411 is pulled forwards, the locking balls 352 are released from the semicircular ball locking recesses 411a and thus the operator head 400 may be released from the adaptor body 310.

On the contrary, when the adaptor combination pipe 411 is inserted into the adaptor body 310 and external force applied to the locking lever 360 is released in the state in which the locking lever 360 is moved backwards, the locking lever 360 protrudes forwards due to spring force and thus the pressing protrusion 361 applies pressure to the locking balls 352, and thereby, the locking balls 352 are inserted into the ball locking recesses 411a and thus the adaptor body 310 and the adaptor combination pipe 411 may be combined with each other.

The rotating power unit 500 of the automatic opening and closing stripping device 1 for indirect live wires having wire stripping and taping functions according to the present invention is configured to rotate the working tool 600, which will be described below, and to perform stripping and taping of the wire through the rotating operation of the rotating power unit 500.

Figure 5:
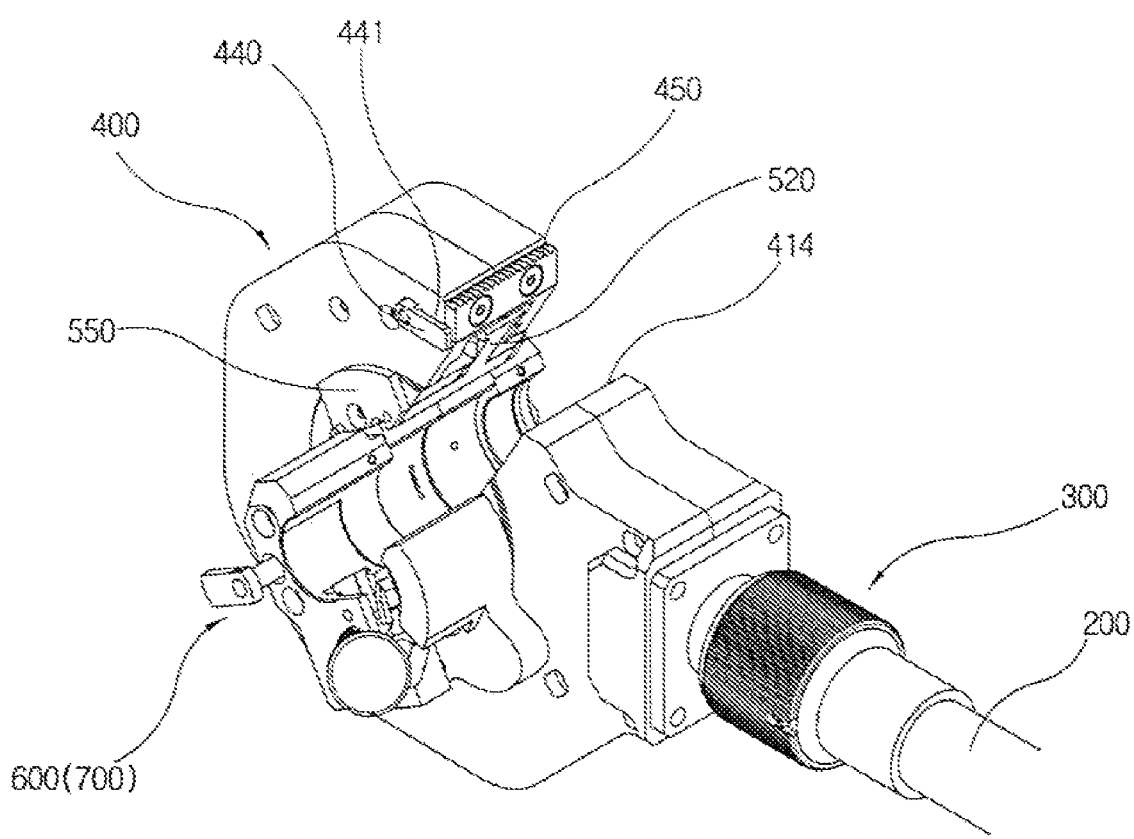
FIG. 5 is a perspective view of a principal part of an operator head of the automatic opening and closing stripping device for indirect live wires having wire stripping and taping functions according to the present invention.
Figure 6:
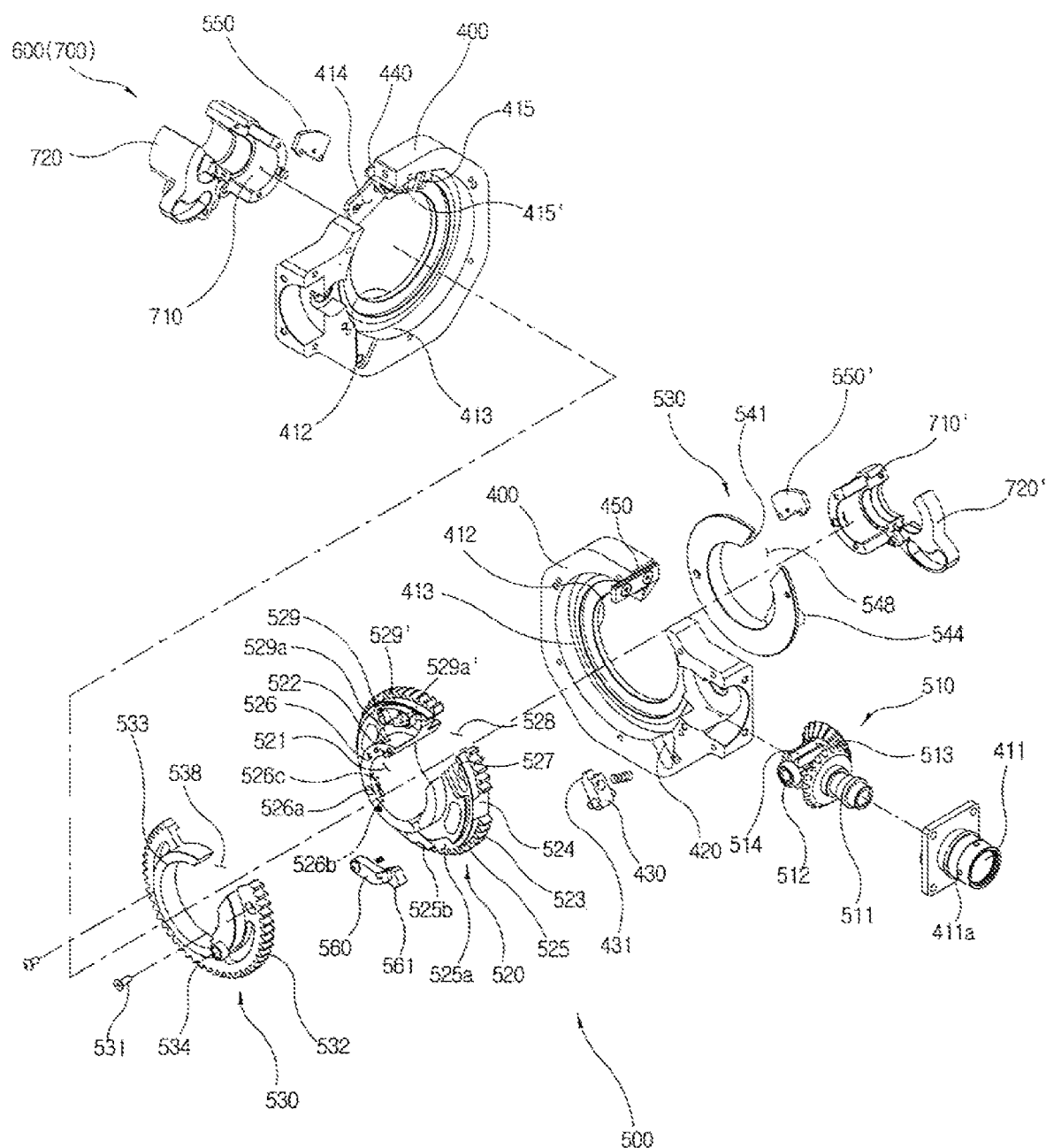
FIG. 6 is an exploded perspective view of the principal part of the operator head of the automatic opening and closing stripping device for indirect live wires having wire stripping and taping functions according to the present invention.
Figure 7:
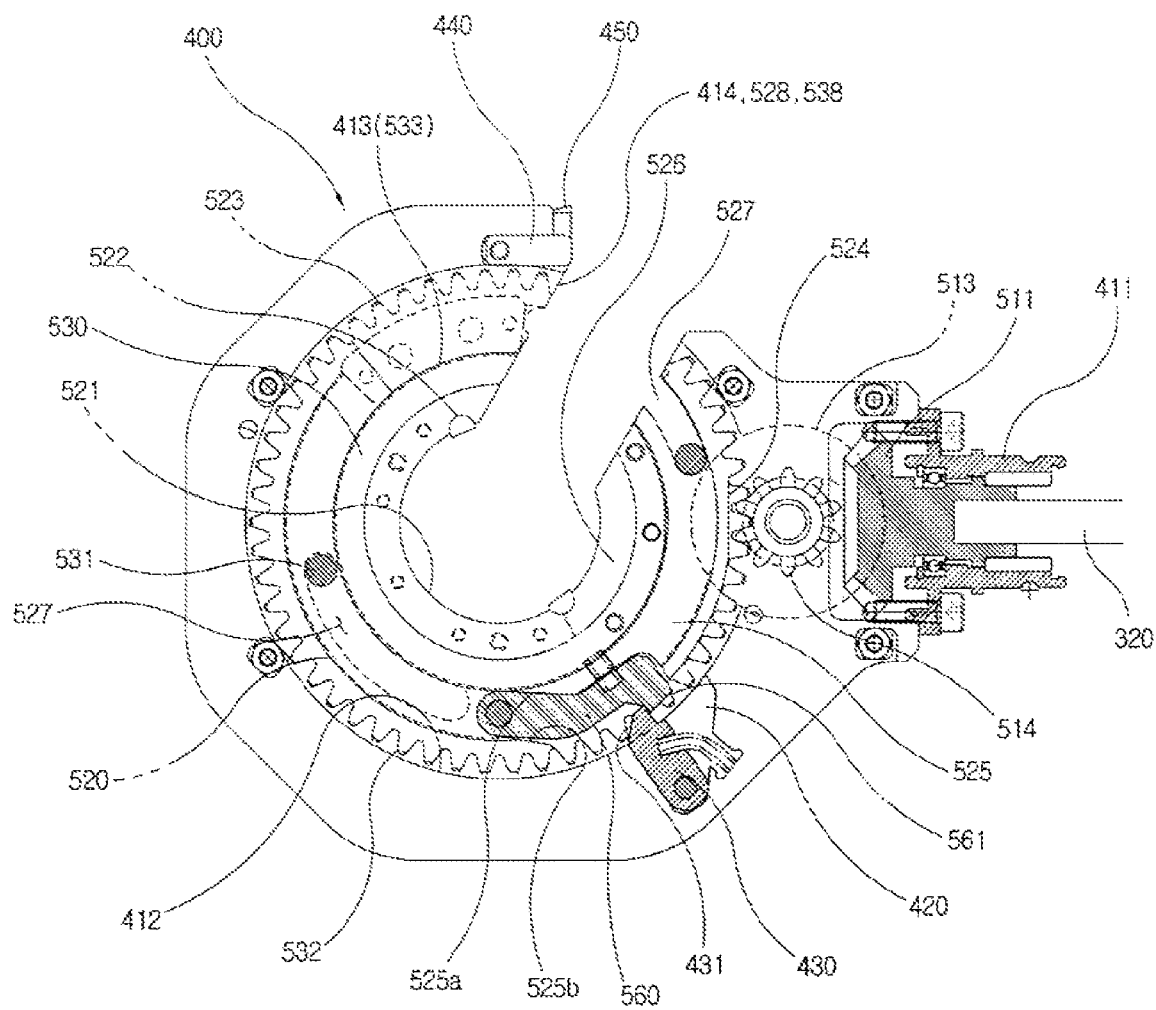
FIG. 7 is a cross-sectional view of the principal part of the operator head of the automatic opening and closing stripping device for indirect live wires having wire stripping and taping functions according to the present invention.

Here, the rotating power unit 500, referring to FIGS. 5 to 7, is installed in the power unit receipt recesses 413 inside the rotation guide hole 412 of the operator head 400, is rotated by receiving rotating power from the adaptor unit 300, and includes a power transmission unit 510, a first power gear 520, a second power gear 530, an interlocking plate 540, and finishing members 550 and 550'.

First, the power transmission unit 510 is provided inside the rear part of the operator head 400 and is configured to receive rotating power from the adaptor rod 320.

Here, the power transmission unit 510 includes a power bevel gear 511, and the power bevel gear 511 is provided at the rear part of the operator head 400, is axially installed inside the adaptor combination pipe 411 through a bearing or the like, and is configured such that the rear part of the power transmission unit 510 is combined with the front end of the adaptor rod 320 so as to receive the rotating power from the adaptor rod 320.

Further, a power transmission shaft 512 is provided on the power transmission unit 510, and the power transmission shaft 512 is configured to be axially installed at the rear part of the operator head 400 through a bearing or the like so as to be provided at right angles with the power bevel gear 511.

Here, an interlocking bevel gear 513 engaged with the power bevel gear 511 so as to change rotating direction is provided at one end of the power transmission shaft 512.

Further, an interlocking gear 514 provided in the form of a spur gear engaged with the first and second power gears 520 and 530, which will be described below, is provided on the circumference of the power transmission shaft 512.

That is, the power transmission unit 510 is configured to receive rotating power from the adaptor rod 320 through the power bevel gear 511, and then to change rotating direction through the interlocking bevel gear 513 on the power transmission shaft 512 and to rotate the interlocking gear 514, simultaneously.

The first power gear 520 is received in the rotation guide hole 412 of the operator head 400, and is configured to receive rotating power from the interlocking gear 514 of e power transmission unit 510.

Here, the first power gear 520 is provided in the form of a circular wheel, a holder installation hole 521 configured to guide installation and fixation of the working tool 600 is formed through the center of the first power gear 520, and holder fixing pins 522 configured to guide slidable insertion and fixation of the working tool 600 are provided at both sides of the inner surface of the holder installation hole 521.

Further, a first gear part 523 provided in the form of a spur gear and engaged with the interlocking gear 514 so as to receive rotating power is provided on the circumference of the first power gear 520, and an idling recess 524 configured to allow the first power gear 520 to idle when the interlocking gear 514 enters the first gear part 523 is formed at one side of the first gear part 523 by removing gear teeth.

Moreover, a first shaft pipe 526 configured to protrude from both side surfaces of the first power gear 520 is provided around the holder installation hole 521 so as to be exposed from both sides of the rotation guide hole 412.

In addition, an expanding projection 525, configured to form a gap between the first gear part 523 and a second gear part 532 when the second power gear 530, which will be described below, is combined with the first power gear 520, is provided around the first shaft pipe 526 on one side surface of the first power gear 520.

Further, a pair of "arc-shaped" power guide grooves 527 is formed through the first power gear 520 on the periphery of the first shaft pipe 526, and the respective power guide grooves 527 are formed to have an angle of about 60°.

Moreover, a first wire lead-in groove 528 configured to cut the first gear part 523 and to open the holder installation hole 521 is provided on the circumference of the first power gear 520, the first wire lead-in groove 528 corresponds to the wire lead-in groove 414 of the operator head 400, and the idling recess 524 is located at a position coming into contact with the interlocking gear 514 in the state in which the first wire lead-in groove 528 the wire lead-in groove 414 correspond to each other.

Further, a holder combination hole 526a, into which a holder combination pin 838, which will be described below, is inserted, is formed at one side end of the first shaft pipe 526, an elastic fixing pin 526b is inserted into the first shaft pipe 526 in the orthogonal direction to the holder combination hole 526a so as to pass through the holder combination hole 526a and thus to interfere therewith, and an elastic guide groove 526c configured to communicate with the holder combination hole 526a so as to secure a space during a process of elastically operating the elastic fixing pin 526b is formed in the first shaft pipe 526.

The second power gear 530 is operated so as to be slidable on one side surface of the first power gear 520, and is configured to be received in the rotation guide hole 412 of the operator head 400 and to be seated on the power unit receipt recesses 413 so as to receive rotating power from the interlocking gear 514 of the power transmission unit 510.

Here, the second power gear 530 is provided in the form of a circular wheel, surrounds the first shaft pipe 526 of the first power gear 520 so as to be slidable, and is connected to the first power gear 510 through power guide pins 531, each of which passes through one end of a corresponding one of the respective power guide grooves 527.

Further, the second gear part 532 provided in the form of a spur gear having the same gear structure as the first gear part 523 of the first power gear 520 and engaged with the interlocking gear 514 so as to receive rotating power is provided on the circumference of the second gear part 530.

In addition, a second shaft pipe 533 axially installed in the rotation guide hole 412 while surrounding the first shaft pipe 526 provided at one side thereof protrudes from the outer surface of the second power gear 530.

Further, a pressing tool guide bearing 534 configured to guide operation of a stripping tool 700, which will be described below, is further provided at the end of the second shaft pipe 533, and the pressing tool guide bearing 534 may be initially provided at the lower part of one side of the second shaft pipe 533.

Moreover, a second wire lead-in groove 538 configured to cut the second gear part 532 and to open the holder installation hole 521 is provided on the circumference of the second power gear 530, and the second wire lead-in groove 538 corresponds to the wire lead-in groove 414 of the operator head 400 and the first wire lead-in groove 528 of the first power gear 520.

The interlocking plate 540 is operated so as to be slidable on the other side surface of the first power gear 520 and to correspond to the second power gear 530, and is configured to be received in the rotation guide hole 412 of the operator head 400 and be seated on the power unit receipt recesses 413.

Here, the interlocking plate 540 is provided in the form of a circular wheel, surrounds the first shaft pipe 526 of the first power gear 520 so as to be slidable, and is combined with the power guide pins 531 so as to be rotated together with the second power gear 530.

Further, a third shaft pipe 541 axially installed in the rotation guide hole 412 while surrounding the first shaft pipe 526 provided at the other side thereof protrudes from the outer surface of the interlocking plate 540.

Moreover, a pressing tool guide bearing 544 configured to guide operation of the stripping tool 700, which will be described below, is further provided at the end of the third shaft pipe 541, and the pressing tool guide bearing 544 and the pressing tool guide bearing 534 formed on the second shaft pipe 533 form a pair, and may be initially provided at the lower part of one side of the second shaft pipe 533.

Further, a third wire lead-in groove 548 configured to open the holder installation hole 521 is provided at one side of the interlocking plate 540, and the third wire lead-in groove 548 corresponds to the second wire lead-in groove 538 of the second power gear 530.

The finishing members 550 and 550' are provided in a pair and are combined with the first shaft pipe 526 of the first power gear 520, and one side of each of the finishing members 550 and 550' protrudes towards the rotation guide hole 412 of the operator head 400 so as to interfere therewith, thereby preventing release of the first power gear 520, the second power gear 530 and the interlocking plate 540 from one another and preventing gap occurrence during a process of rotating the first and second power gears 520 and 530.

That is, the operator head 400 is configured such that the rotating power unit 500 is installed in the rotation guide hole 412 so as to guide rotation of the working tool 600, which will be described below, rotating power, which is transmitted to the power transmission unit 510 through the adaptor rod 320, changes the rotating direction of the power transmission shaft 512 through the power bevel gear 511 and the interlocking bevel gear 513, and is then applied to the interlocking gear 514.

Thereafter, the interlocking gear 514 is engaged with the first gear part 523 of the first power gear 520 and the second gear part 532 of the second power gear 530 and thus transmits the rotating power to the first and second power gears 520 and 530, and in this case, the interlocking gear 514 is inserted into the idling recess 524 of the first power gear 520 and engaged with the second gear part 532 of the second power gear 530 in the state in which the wire lead-in groove 414 and the first to third wire lead-in grooves 528, 538 and 548 communicate with one another.

Further, in this case, each of the power guide pins 531 is located in the end of a corresponding one of the power guide grooves 527 in a direction opposite the wire stripping or taping direction.

Therefore, when the rotating power is transmitted to the interlocking gear 514, the interlocking gear 514 prevents rotation of the first power gear 520 due to the idling recess 524, and rotates the second power gear 530 and the interlocking plate 540 through the second gear part 532 with which the interlocking gear 514 is engaged.

Accordingly, the power guide pins 531 are moved along the power guide grooves 517 simultaneously with rotation of the second power gear 530 and the interlocking plate 540, the second wire lead-in groove 538 of the second power gear 530 and the third wire lead-in groove 548 are moved inwards the operator head 400 and do not correspond to the wire lead-in groove 414 and the first wire lead-in groove 528, and thus, the holder installation hole 521 is closed.

Thereafter, when the power guide pins 531 are located in the ends of the power guide grooves 527 during a process of continuously rotating the second power gear 530, the power guide pins 531 interfere with the first power gear 520, and thus, the first and second power gears 520 and 530 and the interlocking plate 540 are rotated together.

The first power gear 520 and the second power gear 530 provided on the operator head 400 further include a unit configured to guide simultaneous rotation of both the first power gear 520 and the second power gear 530 when the first power gear 520 and the second power gear 530 are rotated in the stripping or taping direction and to prevent rotation of the first power gear 520 when the first power gear 520 and the second power gear 530 are rotated in the opposite direction.

For this purpose, a stopper operation groove 525a configured to be open towards the circumference of the expanding projection 525 is provided on the outer circumference of the expanding projection 525, an inclined engagement plane 525b configured to be inclined towards the outside of the expanding projection 525 is formed on the inner surface of one side of the stopper operation groove 525a, and the closed state of one side of the stopper operation groove 525a is maintained and the rotating power of an anti-rotation stopper 560, which will be described below, is restricted through the inclined engagement plane 525b.

Further, the anti-rotation stopper 560 configured to have protruding power towards the circumference of the expanding projection 525 due to a spring (not shown) elastically installed therein is provided in the stopper operation groove 525a.

Here, one side of the anti-rotation stopper 560 is axially coupled to the inside of the stopper operation groove 525a so that the anti-rotation stopper 560 is rotatable, the other side of the anti-rotation stopper 560 protrudes towards the circumference of the expanding projection 525 due to the spring elastically installed therein, and a stopping protrusion 561 protrude from the protruding end of the anti-rotation stopper 560.

Further, an elastic projection 430 configured to react to the anti-rotation stopper 560 is provided on the operator head 400.

Here, in order to constitute the elastic projection 430, first, an elastic movement recess 420, which is open towards the power unit receipt recess 413, is formed in the operator head 400.

Therefore, one side of the elastic projection 430 is axially coupled to the inside of the elastic movement recess 420 so that the elastic projection 430 is rotatable, and the other side of the elastic projection 430 protrudes towards the power unit receipt recess 413 due to a spring (not shown) elastically installed therein.

Further, an inclined plane 431 configured to allow the stopping protrusion 561 to climb thereover when the first power gear 520 is rotated in the stripping or taping direction is provided on one side of the protruding end of the elastic projection 430.

That is, the anti-rotation stopper 560 overcomes the spring force of the elastic projection 430 and simultaneously climbs over the inclined plane 431 so as to be rotatable, when the first power gear 520 is rotated in the stripping or taping direction, and the stopping protrusion 561 is engaged with the elastic projection 430 and thus the first power gear 520 may be stopped in the state in which the wire lead-in groove 414 and the first wire lead-in groove 528 correspond to each other, when the first power gear 520 is rotated in the opposite direction.

In addition to the stopper 560, a unit configured to prevent the first power gear 520 from being rotated in the direction opposite the stripping direction is further provided.

For this purpose, power gear fixing pins 415 and 415' in two rows are vertically provided on the inner surface of the power unit receipt groove 413 at one side of the operator head 400.

Further, a pair of power gear fixing protrusions 529 and 529' configured to react to the power gear fixing pins 415 and 415' is provided on the first power gear 520, and the respective power gear fixing protrusions 529 and 529' have protruding force towards the operator head 400 due to springs (not shown) elastically installed therein, and are preferably provided on the expanding projection 525.

Here, inclined planes 529a and 529a' are formed on the outer surfaces of the respective power gear fixing protrusions 529 and 529'.

The working tool 600 of the automatic opening and closing stripping device 1 for indirect live wires having wire stripping and taping functions according to the present invention is mounted on the rotating power unit 500 so as to perform stripping or taping of the wire.

The working tool 600 applied to the automatic opening and closing stripping device 1 for indirect live wires having wire stripping and taping functions according to the present invention includes the stripping tool 700 configured to strip a wire or a taping tool 800 configured to tape a wire, and is mounted on the holder installation hole 521 of the first power gear 520 so as to be replaceable.

For this purpose, when the stripping tool 700 is used as the working tool 600, the stripping tool 700 may perform stripping of a wire.

Figure 8:
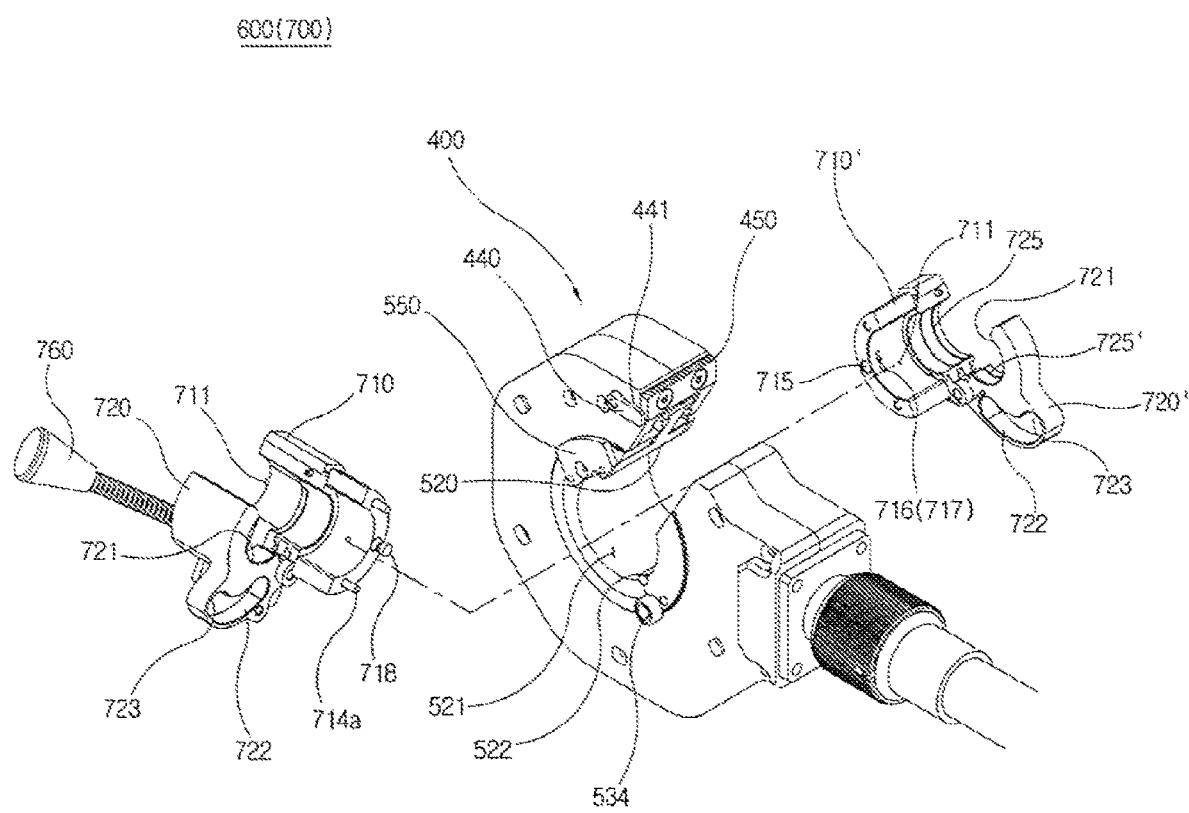
FIG. 8 is an exploded perspective view of a principal part of a stripping tool of the automatic opening and closing stripping device for indirect live wires having wire stripping and taping functions according to the present invention.
Figure 9:
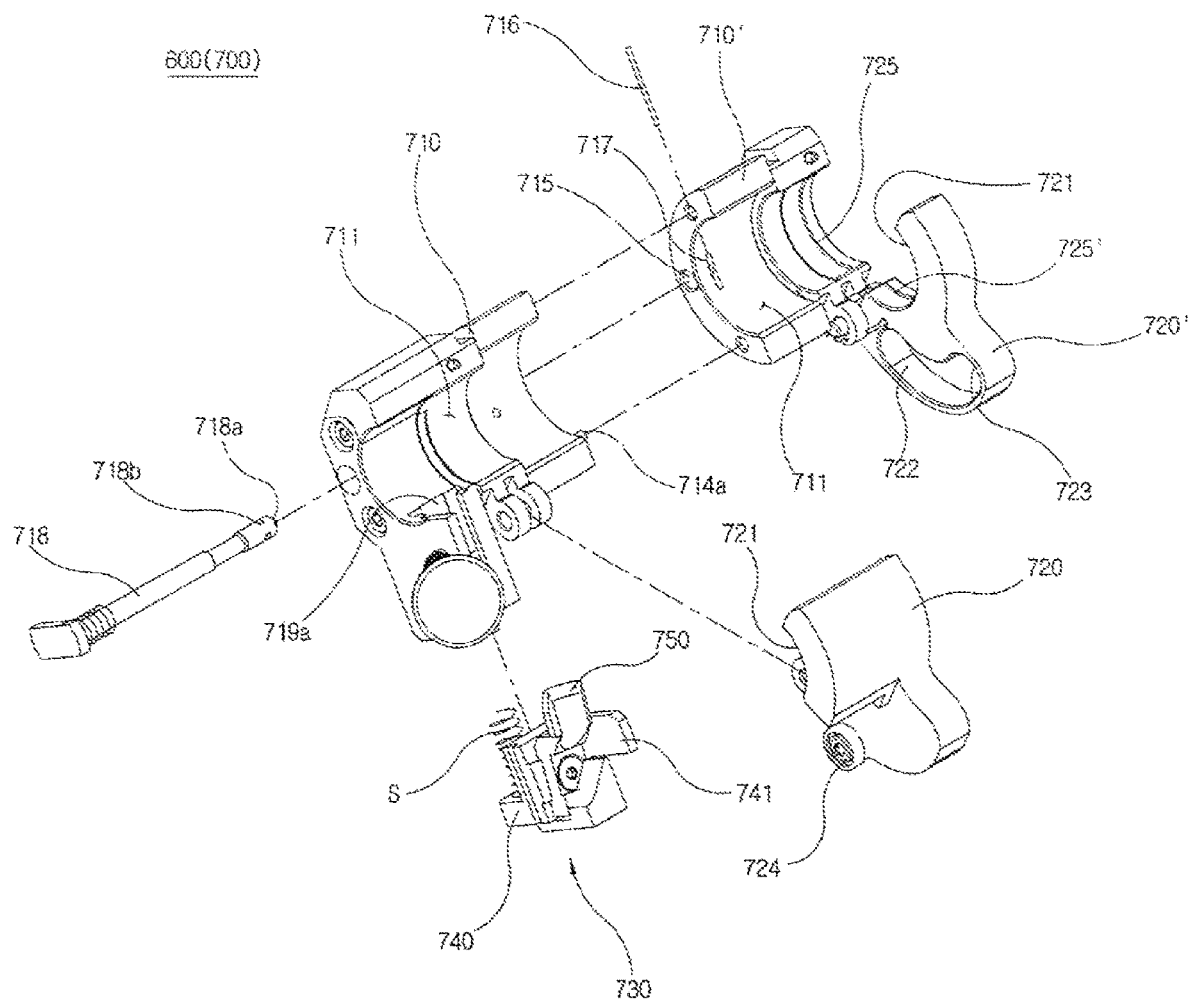
FIG. 9 is an exploded perspective view of the principal part of the stripping tool of the automatic opening and closing stripping device for indirect live wires having wire stripping and taping functions according to the present invention.
Figure 10:
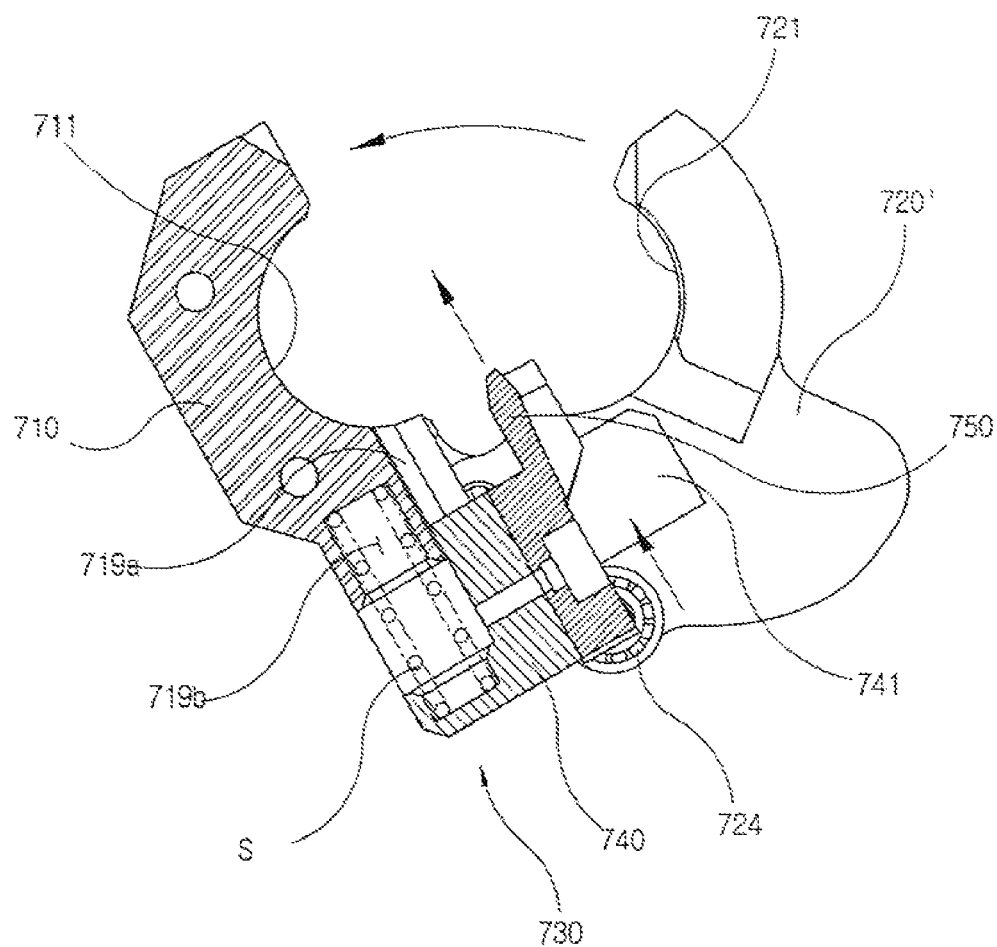
FIG. 10 is a cross-sectional view of the principal part of the stripping tool of the automatic opening and closing stripping device for indirect live wires having wire stripping and taping functions according to the present invention.

Here, the stripping tool 700, referring to FIGS. 8 to 10, includes stripping tool holders 710 and 710', wire pressing tools 720 and 720', and a stripping unit 730.

First, the stripping tool holders 710 and 710' are mounted on the rotating power unit 500, preferably, in the holder installation hole 521 of the first power gear 520 so that a wire to be stripped is placed in the stripping tool holders 710 and 710', are provided in a pair, and are slidably combined into the holder installation hole 521 using holder fixing pins 522 provided at both sides of the first power gear 520 as guides so as to be rotated together with the first power gear 520.

Here, the respective stripping tool holders 710 and 710' are provided in the form of a semicircular pipe having the same outer diameter as the diameter of the holder installation hole 521, and semicircular stripped wire receipt recesses 711 configured to be open upwards so that the wire is seated therein are formed at the upper parts of the stripping tool holders 710 and 710'.

The two stripping tool holders 710 and 710' of the present invention are coupled to each other inside the first power gear 520, and are configured to have guide coupling force through guide pins 714a.

For this purpose, first, a holder combination pin 718 inserted into a holder combination hole 715, which will be described below, slidably passes through the center of one stripping tool holder 710 from the outside, and in this case, the holder combination pin 718 is configured to have retreating force due to a spring (not shown) elastically installed therein.

An inclined plane 718a is formed at the end of the holder combination pin 718 so that the holder combination pin 718 is slidable during a process of interfering with an elastic fixing pin 716, and a fixing pin engagement groove 718b configured to have an arc shape so that the elastic fixing pin 716 is engaged therewith is formed in the circumference of the front part of the holder combination pin 718.

Further, the holder combination hole 715, into which the holder combination pin 718 is inserted, is formed through the center of the corresponding end of the other stripping tool holder 710', the elastic fixing pin 716 is inserted into the stripping tool holder 710' in the direction orthogonal to the holder combination hole 715 so as to pass through the holder combination hole 715 and thus to interfere therewith, and an elastic guide groove 717 configured to communicate with the holder combination hole 715 so as to secure a space during a process of elastically operating the elastic fixing pin 716 is formed in the stripping tool holder 710'.

That is, both the stripping tool holders 710 and 710' are slidably combined with each other through the guide pins 714a, when the elastic fixing pin 716 is pushed by external force, the inclined plane 718a at the end of the holder combination pin 718 pushes the elastic fixing pin 716 outwards and simultaneously the elastic fixing pin 716 climbs over the inclined plane 718a, the elastic fixing pin 716 is engaged with the fixing pin engagement groove 718b and is thus fixed, and thereby, the two stripping tool holders 710 and 710' are combined with each other.

On the other hand, in order to separate the two stripping tool holders 710 and 710' from each other, when the holder combination pin 718 is rotated at a designated angle by applying external force thereto, the elastic fixing pin 716 is elastically operated and is simultaneously released from the fixing pin engagement groove 718b, and thereby, the holder combination pin 718 is released from the holder combination hole 715 by the elasticity of the spring and thus the stripping tool holders 710 and 710' may be separated from each other.

Each of the wire pressing tools 720 and 720' is hinged to one side of the circumference of a corresponding one of the respective stripping tool holders 710 and 710' so as to be rotatable, includes a stripped wire pressing recess 721 formed on the inner circumferential surface of each of the wire pressing tools 720 and 720' so as to correspond to the stripped wire receipt recess 711, and is configured to apply pressure to and release a wire received in the stripped wire receipt recess 711 through the rotating operation of the wire pressing tools 720 and 720'.

Further, an arc-shaped cam groove 722 configured to receive a corresponding one of pressing tool guide bearings 534 and 544 during a process of combining the stripping tool holders 710 and 710' with the first power gear 520 is formed at one side of each of the wire pressing tools 720 and 720'.

Here, the cam grooves 722 allow the wire pressing tools 720 and 720' to expose the wire, when the pressing tool guide bearings 534 and 544 are received in starting ends of the cam grooves 722, and rotate the wire pressing tools 720 and 720' around the hinges thereof during a process of moving the pressing tool guide bearings 534 and 544 along the cam grooves 722 and allow the wire pressing tools 720 and 720' to cover and apply pressure to the wire received in the stripped wire receipt recesses 711, when the second power gear 530 and the interlocking gear 540 are rotated and thus the pressing tool guide bearings 534 and 544 are rotated.

Further, bearing fixing recesses 723, which are bent, are provided at the ends of the respective cam grooves 722 so that the pressing tool guide bearings 534 and 544 are received in and engaged with the bearing fixing recesses 723 so as not to be pushed, when the wire pressing tools 720 and 720' completely cover the wire and thus apply pressure to the wire.

That is, the wire pressing tools 720 and 720' are rotated by the operation of the pressing tool guide bearings 534 and 544 and the cam grooves 722 so as to cover and apply pressure to the wire, during the process of rotating the second power gear 530 and the interlocking plate 540 to confine the wire received in the operator head 400.

Further, a stripping blade guide bearing 724, configured to control entry of the stripping unit 730, which will be described below, during a process of rotating the wire pressing tools 720 and 720', is provided on the outer surface of one wire pressing tool 720.

Moreover, a pair of cutting protrusions 725 and 725' configured to protrude from the inner circumferential surfaces of the stripping wire receipt recess 711 and the stripping wire pressing recess 721 and to extend into an arc shape along the inner circumferential surfaces thereof is provided on the other stripping tool holder 710' and the other wire pressing tool 720', and the cutting protrusions 725 and 725' interfere with a stripped sheath and thus cut the sheath due to pressure when the operator head 400 is twisted at a designated angle by applying a designated external force to the handle 410 after stripping.

The stripping unit 730 is provided at the stripping tool holder 710 so as to perform stripping of the wire, and includes a stripping blade holder 740 and a stripping blade 750.

Here, in order to install the stripping unit 730 on the stripping tool holder 710, a stripping blade guide groove 719a configured to guide the stripping blade 750, which will be described below, to the inside of the stripping wire receipt recess 711 and a spring installation groove 719b are further provided in the stripping tool holder 710.

Therefore, the stripping blade holder 740 is slidably combined with the stripping blade guide groove 719a so as to slidably protrude towards the stripping wire receipt recess 711, and is configured to have retreating force due to a spring S elastically installed in the spring installation groove 719b.

Further, a pressing support 741, to which pressure is applied during the process of rotating the stripping blade guide bearing 724, is provided at one side of the stripping blade holder 740, and the stripping blade 750 is combined with the stripping blade holder 740 so as to protrude towards the stripping wire receipt recess 711, protrudes towards the stripping wire receipt recess 711 when the stripping blade holder 740 enters the stripping blade guide groove 719a, is released from the stripping wire receipt recess 711 when the stripping blade holder 740 exits the stripping blade guide groove 719a, and is provided as a semicircular blade having a designated inclined plane so as to perform spiral stripping of the wire during stripping of the wire.

That is, the stripping unit 730 is configured such that the stripping blade guide bearing 724 applies pressure to the pressing support 741, and thus, the stripping blade holder 740 slides along the stripping blade guide groove 719a and the stripping blade 750 protrudes towards the stripping wire receipt recess 711 so as to interfere with a wire to be stripped.

Further, in the present invention, the stripping tool 700 is configured to collect the stripped sheath.

Figure 11:
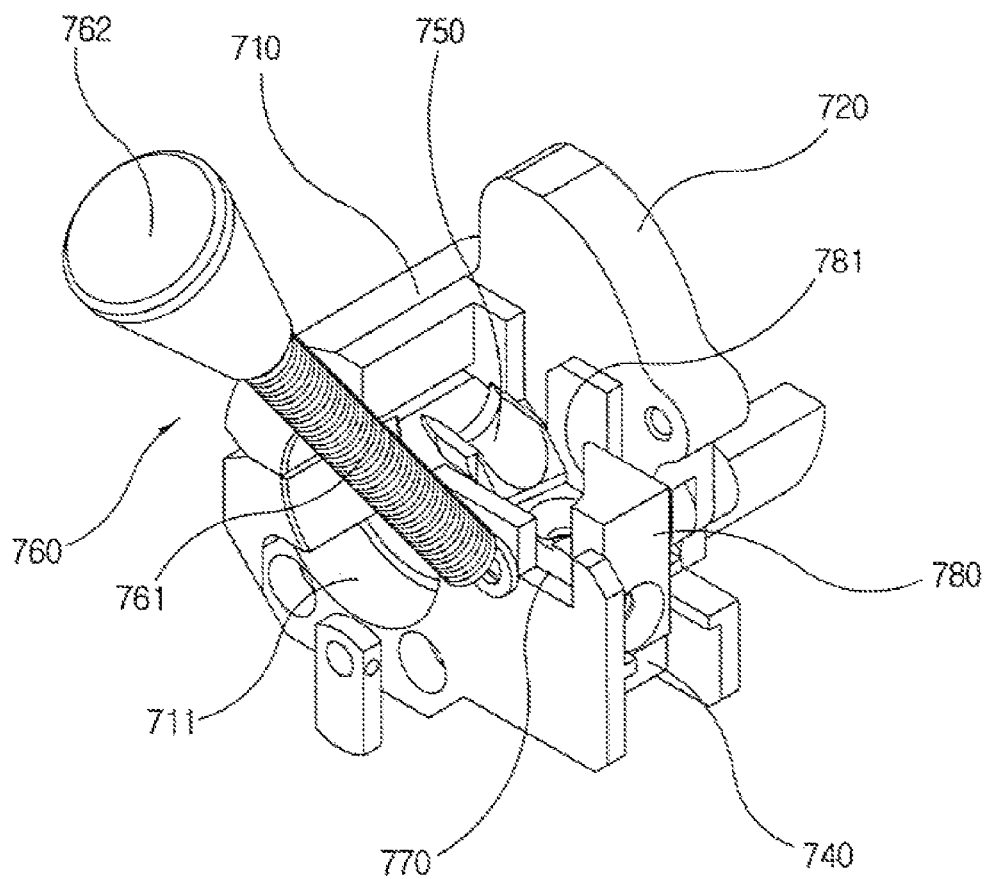
FIG. 11 is a perspective view illustrating another embodiment of the stripping tool of the automatic opening and closing stripping device for indirect live wires having wire stripping and taping functions according to the present invention.
Figure 12:
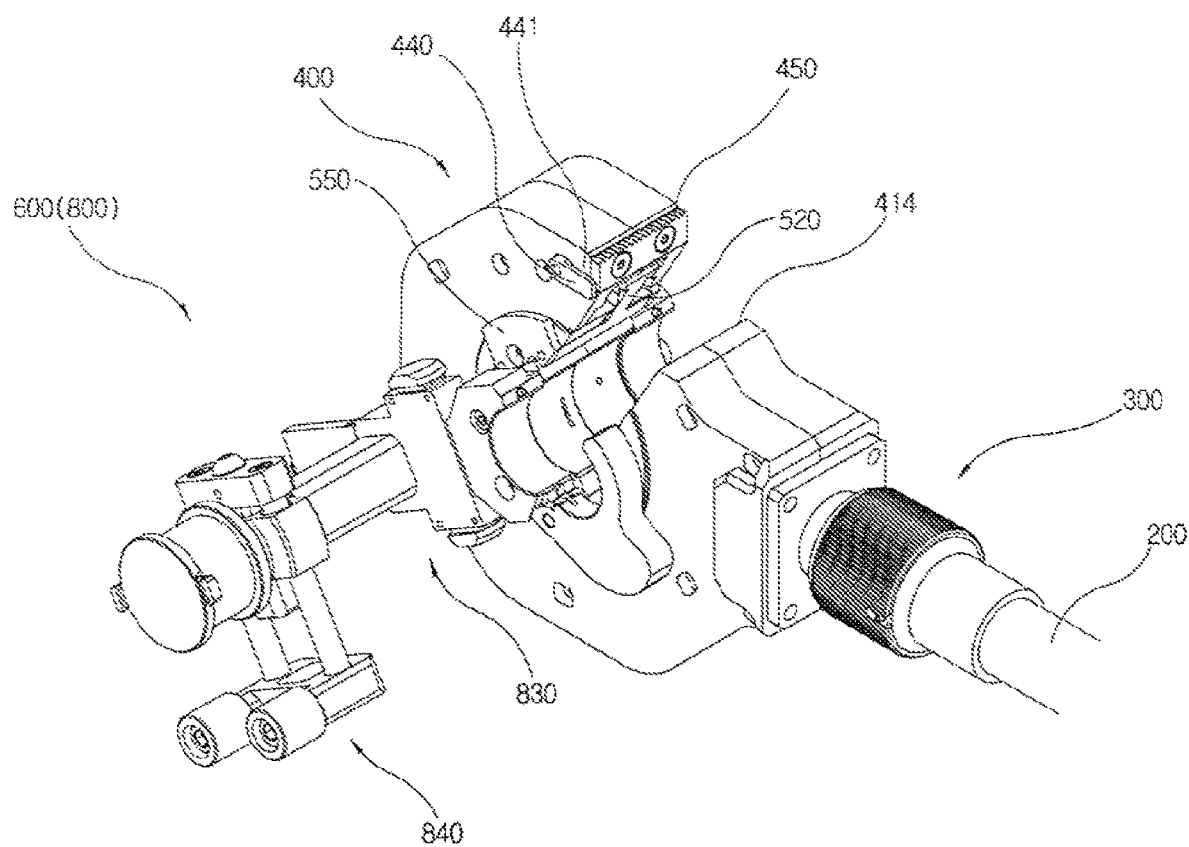
FIG. 12 is a perspective view of a principal part of a taping tool of the automatic opening and closing stripping device for indirect live wires having wire stripping and taping functions according to the present invention.
Figure 13:
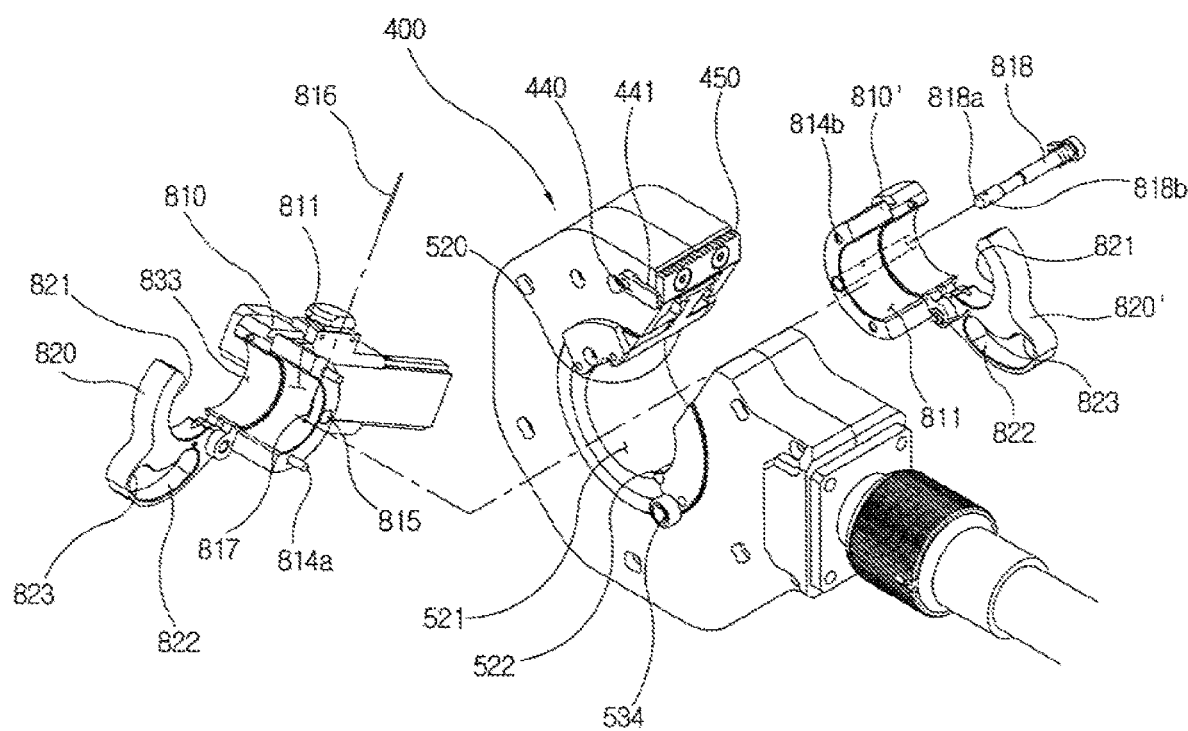
FIG. 13 is an exploded perspective view of the principal part of the taping tool of the automatic opening and closing stripping device for indirect live wires having wire stripping and taping functions according to the present invention.

For this purpose, referring to FIG. 11, a sheath collection bar 760, which protrudes upwards at a designated inclination from the stripping unit 730, is further provided on the outer surface of one stripping tool holder 170.

Here, in the present invention, the sheath collection bar 760 includes a winder spring 761 formed of a coiled spring having a designated length so that the sheath is wound thereon, and the winder spring 761 is configured to prevent interference with the stripped wire receipt recess 711 of the stripping tool holder 710.

Further, an engagement projection 762 expanded to have a greater diameter than that of the winder spring 761 so as to prevent release of the sheath wound thereon is provided at the upper end of the winder spring 761, and in the present invention, the engagement projection is provided in the form of a tapered rod having a diameter gradually expanded from the winder spring 761.

Further, a discharge guide hole 770 located adjacent to the sheath collection bar 760 may be provided in one side of the stripping tool holder 710.

In addition, the stripping blade holder 740 may include a discharge guide member 780 provided behind the stripping blade 750 and is configured to guide a sheath stripped off from a wire to the discharge guide hole 770 so as to be discharged.

Here, an inclined guide plane 781 connected to the discharge guide hole 770 so as to allow the sheath to move along the inclined guide plane 781 and thus to stably guide the sheath to the discharge guide hole 770 is provided at the side of the discharge guide member 780 corresponding to the stripping blade 750.

That is, the above-described stripped sheath collection structure effectively collects the stripped sheath, thereby being capable of preventing damage to the environment on a construction site due to fall of the stripped sheath during the wire stripping process.

In the stripping tool 700 of the present invention, the stripped wire receipt recesses 711 of the stripping tool holders 710 and 710' and the stripped wire pressing recesses 721 of the wire pressing tools 720 and 720' may have various diameters, and thus, the stripping tool holders 710 and 710' and the wire pressing tools 720 and 720' may be replaced with appropriate ones depending on the diameter of a wire to be stripped.

Further, when the taping tool 800 is used as the working tool 600, the taping tool 800 is configured to perform taping of a wire, and in the present invention, the taping tool 800 is not limited in configuration and may have various configurations.

For this purpose, the taping tool 800, referring to FIGS. 12 to 15, may include a pair of taping tool holders 810 and 810', wire pressing tools 820 and 820', a taping machine mount unit 830, and a taping machine 840.

First, the taping tool holders 810 and 810' are mounted on the rotating power unit 500, preferably, in the holder installation hole 521 of the first power gear 520 so that a wire to be taped is placed in the taping tool holders 810 and 810', are provided in a pair, and are slidably combined into the holder installation hole 521 using the holder fixing pins 522 provided at both sides of the first power gear 520 as guides so as to be rotated together with the first power gear 520.

Here, the respective taping tool holders 810 and 810' are provided in the form of a semicircular pipe having the same outer diameter as the diameter of the holder installation hole 521, and semicircular taped wire receipt recesses 811 configured to be open upwards so that the wire is seated therein are formed at the upper parts of the taping tool holders 810 and 810'.

The two taping tool holders 810 and 810' of the present invention are coupled to each other inside the first power gear 520, and are configured to have guide coupling force through guide pins 814a.

Further, a holder combination hole 815 is formed through the center of an end of one taping tool holder 810 corresponding to the other taping tool holder 810', an elastic fixing pin 816 is inserted into the taping tool holder 810 in the direction orthogonal to the holder combination hole 815 so as to pass through the holder combination hole 815 and thus to interfere therewith, and an elastic guide groove 817 configured to communicate with the holder combination hole 815 so as to secure a space during a process of elastically operating the elastic fixing pin 816 is formed in the taping tool holder 810.

In addition, a holder combination pin 818 inserted into the holder combination hole 815 slidably passes through the center of the taping tool holder 810' from the outside, and in this case, the holder combination pin 818 is configured to have retreating force due to a spring (not shown) elastically installed therein.

An inclined plane 818a is formed at the end of the holder combination pin 818 so that the holder combination pin 818 is slidable during a process of interfering with the elastic fixing pin 816, and a fixing pin engagement groove 818b configured to have an arc shape so that the elastic fixing pin 816 is engaged therewith is formed in the circumference of the front part of the holder combination pin 818.

That is, both the taping tool holders 810 and 810' are slidably combined with each other through the guide pins 814a, when the elastic fixing pin 816 is pushed by external force, the inclined plane 818a at the end of the holder combination pin 818 pushes the elastic fixing pin 816 outwards and simultaneously the elastic fixing pin 816 climbs over the inclined plane 818a, the elastic fixing pin 816 is engaged with the fixing pin engagement groove 818b and is thus fixed, and thereby, the two taping tool holders 810 and 810' are combined with each other.

On the other hand, in order to separate the taping tool holders 810 and 810' from each other, when the holder combination pin 818 is rotated at a designated angle by applying external force thereto, the elastic fixing pin 816 is elastically operated and is simultaneously released from the fixing pin engagement groove 818b, and thereby, the holder combination pin 816 is released from the holder combination hole 818b by the elasticity of the spring and thus the taping tool holders 810 and 810' may be separated from each other.

Each of the wire pressing tools 820 and 820' is hinged to one side of the circumference of a corresponding one of the respective taping tool holders 810 and 810' so as to be rotatable, includes a taped wire pressing recess 721 formed on the inner circumferential surface of each of the wire pressing tools 820 and 820' so as to correspond to the taped wire receipt recess 811, and is configured to apply pressure to and release a wire received in the taped wire receipt recess 811 through the rotating operation of each of the wire pressing tools 820 and 820'.

Further, an arc-shaped cam groove 822 configured to receive a corresponding one of pressing tool guide bearings 534 and 544 during a process of combining the taping tool holders 810 and 810' with the first power gear 520 is formed at one side of each of the wire pressing tools 820 and 820'.

Here, the cam grooves 822 allow the wire pressing tools 820 and 820' to expose the wire, when the pressing tool guide bearings 534 and 544 are received in starting ends of the cam grooves 822, and rotate the wire pressing tools 820 and 820' around the hinges thereof during a process of moving the pressing tool guide bearings 534 and 544 along the cam grooves 822 and allow the wire pressing tools 820 and 820' to cover and apply pressure to the wire received in the taped wire receipt recesses 811, when the second power gear 530 and the interlocking gear 540 are rotated and thus the pressing tool guide bearings 534 and 544 are rotated.

Further, bearing fixing recesses 823, which are bent, are provided at the ends of the cam grooves 822 so that the pressing tool guide bearings 534 and 544 are received in and engaged with the bearing fixing recesses 823 so as not to be pushed, when the wire pressing tools 820 and 820' completely cover the wire and thus apply pressure to the wire.

That is, the wire pressing tools 820 and 820' are rotated by the operation of the pressing tool guide bearings 534 and 544 and the cam grooves 822 so as to cover and apply pressure to the wire; during the process of rotating the second power gear 530 and the interlocking plate 540 to confine the wire received in the operator head 400.

Figure 14:
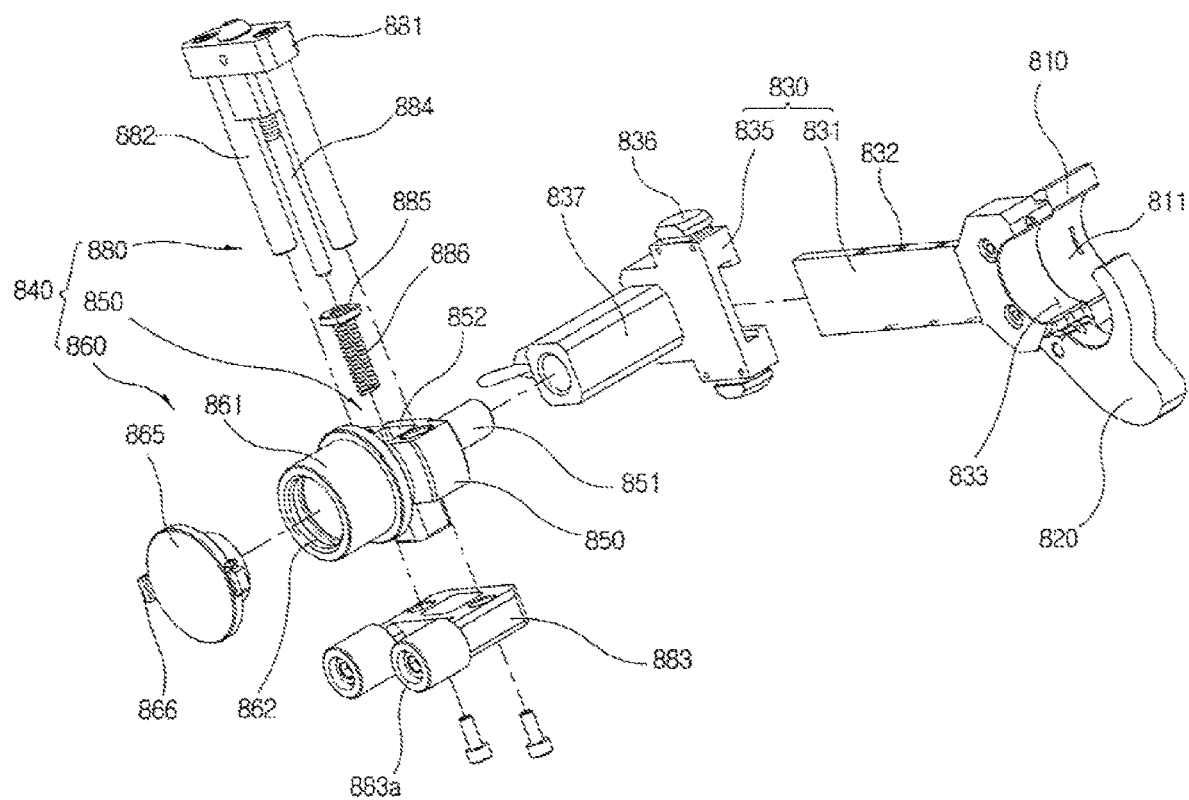
FIG. 14 is an exploded perspective view of the principal part of the taping tool of the automatic opening and closing stripping device for indirect live wires having wire stripping and taping functions according to the present invention.
Figure 15:
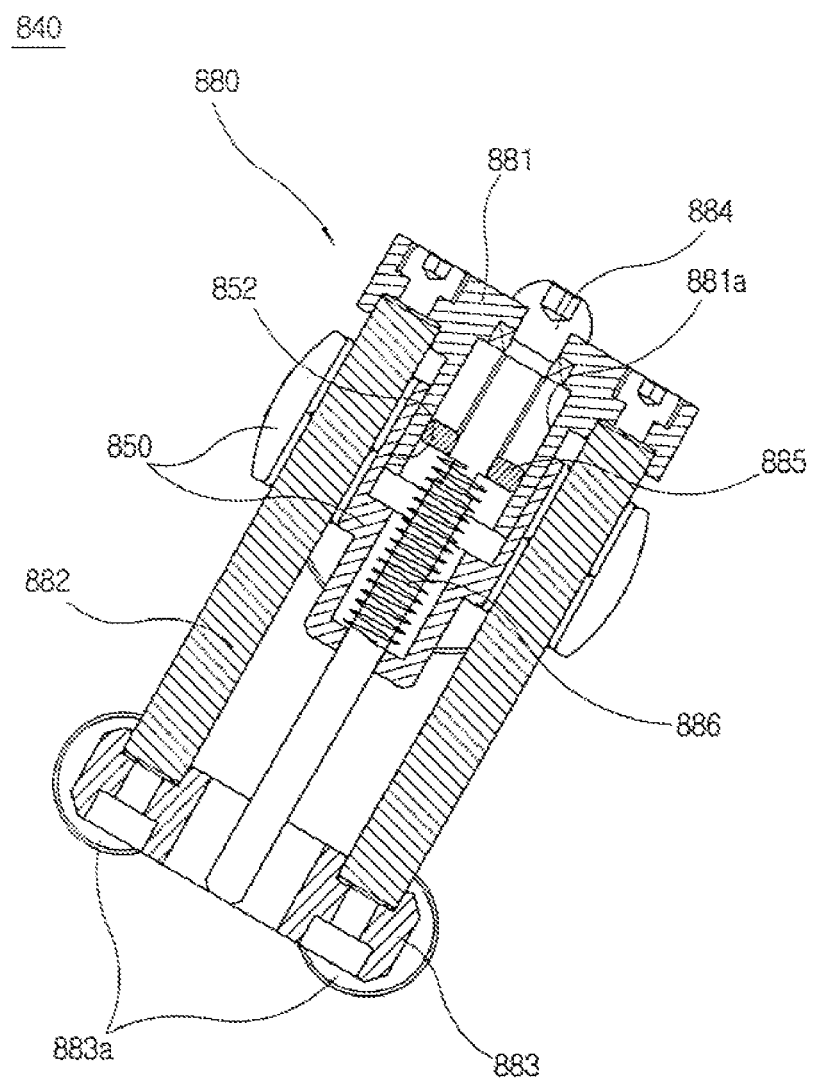
FIG. 15 is a cross-sectional view of the principal part of the taping tool of the automatic opening and closing stripping device for indirect live wires having wire stripping and taping functions according to the present invention.

Further, the taping tool 800, referring to FIGS. 14 and 15, may include a single taping tool holder 801, a taping machine mount unit 830 and a taping machine 840.

First, the taping tool holder 801 is mounted on the rotating power unit 500, preferably, in the holder installation hole 521 of the first power gear 520 so that a wire to be taped is placed in the taping tool holders 710 and 710', and is slidably combined into the holder installation hole 521 at one side of the first power gear 520 so as to be rotated together with the first power gear 520.

Here, the taping tool holder 801 is provided in the form of a semicircular pipe having the same outer diameter as the diameter of the holder installation hole 521, and a semicircular taped wire inner diameter expansion receipt recess 802 configured to be open upwards so that the wire is seated therein are formed at the upper part of the taping tool holder 801.

The taping machine mount unit 830 is configured to protrude perpendicularly from the outer end of one taping tool holder 810 among both taping tool holders provided in a pair or the single taping tool holder 801 in the circumferential direction, and facilitate mounting of the taping machine 840, which will be described below, thereon.

Here, the taping machine mount unit 830 includes a mount bar 831 configured to protrude from one taping tool holder 810 among both taping tool holders provided in a pair or the single taping tool holder 801, engagement recesses 832 provided in multiple rows are formed at both sides of the mount bar 831, and an extension recess 833 extending from the taped wire receipt recess 811 is formed in the upper end of the mount bar 831.

Figure 16:
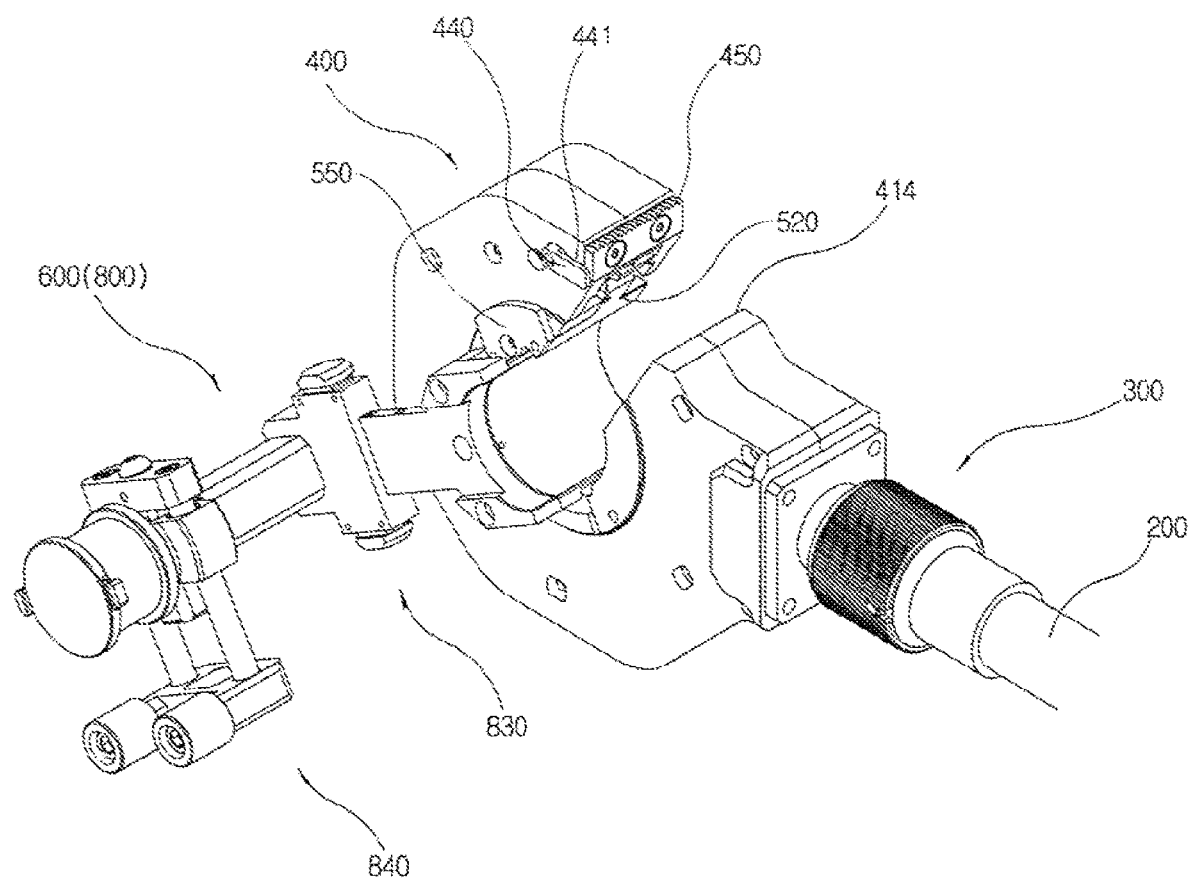
FIG. 16 is a perspective view illustrating a principal part of another embodiment of the taping tool of the automatic opening and closing stripping device for indirect live wires having wire stripping and taping functions according to the present invention.
Figure 17:
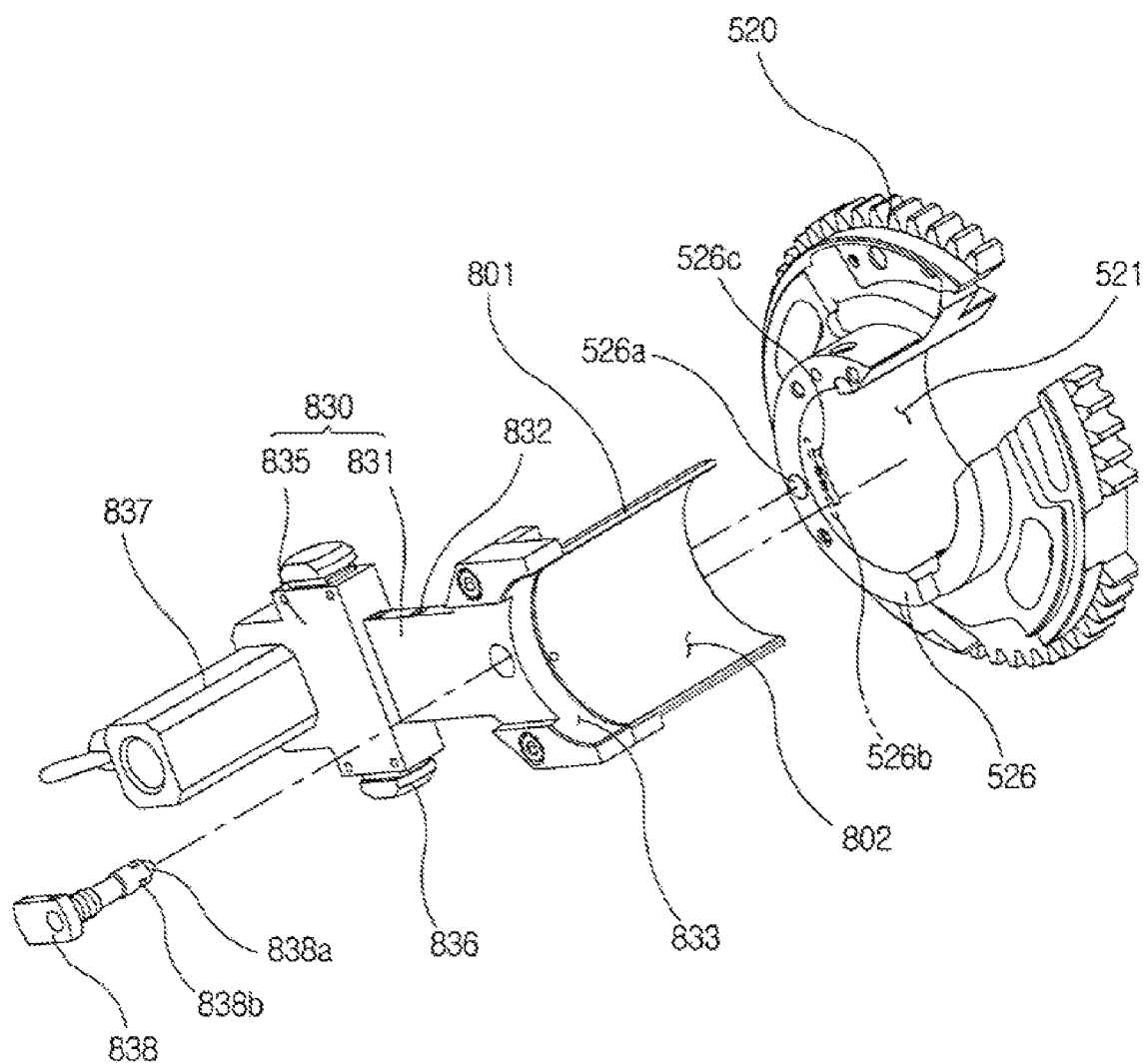
FIG. 17 is a perspective view illustrating the principal part of another embodiment of the taping tool of the automatic opening and closing stripping device for indirect live wires having wire stripping and taping functions according to the present invention.

In the mount bar 831 of the present invention, referring to FIGS. 16 and 17, when the single taping tool holder 801 is applied, the taping tool holder 801 may be configured to be fixedly combined with the first power gear 520.

For this purpose, the mount bar 831 is configured such that the holder combination pin 838 inserted into the holder combination hole 526a of the first power gear 520 slidably passes through the mount bar 831 behind the taping tool holder 801, i.e., at a position of the mount bar 831 deviating from the outer circumference of the taping tool holder 801, from the outside, and in this case, the holder combination pin 838 is configured to have retreating force due to a spring shown) elastically installed therein.

Here, an inclined plane 838a is formed at the end of the holder combination pin 838 so that the holder combination pin 838 is slidable during a process of interfering with the elastic fixing pin 526b, and a fixing pin engagement groove 838b configured to have an arc shape so that the elastic fixing pin 526b is engaged therewith is formed in the circumference of the front part of the holder combination pin 838.

In the present invention, in contrast to the above-described combination structure to combine the taping tool holders 810 and 810' which are provided separately, the taping tool holder 801 is configured such that the first shaft pipe 526 of the first power gear 520 includes the holder combination hole 526a and the elastic fixing pin 526b, with which the holder combination pin 838 is combined, and thus, the thickness of the taping tool holder 801 may be reduced and the semicircular taped wire inner diameter expansion receipt recess 802 may be expanded thereby as compared to the taped wire receipt recesses 811.

That is, when the elastic fixing pin 526b is pushed by external force, the inclined plane 838a at the end of the taping tool holder 801 pushes the elastic fixing pin 526b outwards and simultaneously the elastic fixing pin 526b climbs over the inclined plane 838a, the elastic fixing pin 526b is engaged with the fixing pin engagement groove 838b and is thus fixed, and thereby, the taping tool holder 801 and the first power gear 520 are combined with each other.

On the other hand, in order to separate the taping tool holder 801 and the first power gear 520 from each other, when the holder combination pin 838 is rotated at a designated angle by applying external force thereto, the elastic fixing pin 526*b* is elastically operated and is simultaneously released from the fixing pin engagement groove 838*b*, and thereby, the holder combination pin 838 is released from the holder combination hole 526*a* by the elasticity of the spring and thus the taping tool holder 801 and the first power gear 520 may be separated from each other.

Further, the taping machine mount unit 830 includes an interval adjuster 835 configured to slide along the mount bar 831 so as to adjust the interval of an insulating tape from the center of the rotating power unit 500, i.e., the diameter of the insulating tape.

Here, the interval adjuster 835 is slidably combined with the mount bar 831 and includes fixing levers 836 provided at both sides thereof so as to provide engagement force to the engagement recesses 832 of one row due to springs (not shown) elastically installed therein, like a general ball plunger, and the fixing levers 836 have engagement force with respect to the engagement recesses 832 due to spring force and are configured such that the engagement force thereof is released when the fixing levers 836 are pressed inwards.

Further, a shaft combination pipe 837, into which a combination shaft 851 or an extension shaft 890, which will be described below, is inserted, protrudes from the interval adjuster 835 in the length direction of the taping tool holders 810 and 810' or the taping tool holder 801, and a fixing bolt (not shown) configured to fix the combination shaft 851 or the extension shaft 890 combined with the shaft combination pipe 837 is provided on the shaft combination pipe 837 so as to achieve firm combination.

The taping machine 840 is combined with the taping machine mount unit 830 and rotated together with the rotating power unit 500 so as to perform taping of a wire, and includes a taping machine body 850, a tape mount unit 860, and a tension unit 880.

First, the taping machine body 850 is provided in the form of a block, the combination shaft 851 inserted into the shaft combination pipe 837 protrudes from one side surface of the taping machine body 850, and a sliding hole 852 configured to be open upwards is formed in the upper part of the taping machine body 850.

The tape mount unit 860 protrudes from a position of the other side surface of the taping machine body 850, corresponding to the combination shaft 851, is configured such that the insulating tape is mounted on the tape mount unit 860, and includes a bobbin 861 configured to protrude from the taping machine body 850.

A bobbin finishing cap 865, which controls mounting and fixation of the insulating tape, is provided at the end of the bobbin 861, and the bobbin finishing cap 865 is configured to have a greater diameter than the diameter of the bobbin 861 so as to mount the insulating tape thereon when the bobbin finishing cap 865 is removed from the bobbin 861 and to prevent release of the insulating tape when the bobbin finishing cap 865 is combined with the bobbin 861.

Here, combination between the bobbin 861 and the bobbin finishing cap 865 may be achieved by various methods, and in the present invention, engagement grooves 862 are formed on the inner circumferential surface of the bobbin 861, and push levers 866 configured to be engaged with and released from the engagement grooves 862 due to springs (not shown) elastically installed in the push levers 866 are provided on the bobbin finishing cap 865.

The tension unit 880 is provided on the taping machine body 850, and applies tension to the insulating tape mounted on the tape mount unit 860 due to the elastic force of a spring so as to adjust unwinding force.

Here, the tension unit 880 includes a slider 881 slidably combined with the sliding hole 852 of the taping machine mount body 850, and a nut sliding hole 881*a* configured to be open downwards so that a nut 885, which will be described below, is slidably combined with the nut sliding hole 881*a*, is formed in the slider 881.

Further, the tension unit 880 includes a pair of guide rods 882 provided with upper ends fixed to both sides of the slider 881 and lower ends configured to slidably pass through the taping machine mount unit 850 and then to protrude downwards.

In addition, the tension unit 800 includes a connector 883 configured to fixedly connect the lower ends of the guide rods 882.

Further, a pair of cylindrical tension members 883*a* corresponding to the circumference of the bobbin 861 is provided on the connector 883.

Moreover, the tension unit 880 includes a screw shaft 884 provided with an upper end installed on the slider 881 so as to have rotating power, and the lower part of the tension unit 880 passes through the nut sliding hole 881*a*, the taping machine mount unit 850 and the connector 883.

Further, the tension unit 880 includes the nut 885 screwed to the screw shaft 884 inside the nut sliding hole 881*a* of the slider 881 so as to move along the screw shaft 884 inside the nut sliding hole 881*a* when the screw shaft 884 is rotated.

In addition, the tension unit 880 includes a tension spring 886 configured to surround the screw shaft 884 inside the nut sliding hole 881*a* and provided with both ends elastically installed on the nut 885 and in the sliding hole 852 of the taping machine mount unit 850.

That is, the tension unit 880 has elastic force to move the slider 881 upwards due to elasticity of the tension spring 886, and in this case, the tension members 883*a* apply pressure to and thus fix the circumference of an insulating tape mounted on the bobbin 861 so as to facilitate stable unwinding of the insulating tape.

Further, the tension unit 880 may adjust elasticity of the tension spring 886 through rotation of the screw shaft 884, concretely, the tension spring 886 is compressed so as to provide strong elasticity when the nut 885 is moved downwards due to rotation of the screw shaft 884 and is tensioned so as to provide weak elasticity when the nut 885 is moved upwards, that is to say, when the contraction degree of the insulating tape is low, i.e., when temperature is low, such as in the winter, the insulating tape loses elasticity and thus strong tension is provided so as to stably hold the insulating tape during a process of unwinding the insulating tape, and when temperature is high, such as in the summer, the insulating tape has elasticity and thus even weak tension is provided so as to stably hold the insulating tape.

That is, the taping machine 840 is rotated together with rotation of the taping tool 800, the insulating tape wound on the bobbin 861 is unwound, passes through the tension members 883*a* and is taped onto the wire during such a rotating process, and particularly, the tension members 883*a* may apply tension to the insulating tape so as to stably hold the insulating tape during the process of unwinding the insulating tape.

Further, the taping machine 840 is configured such that the interval adjuster 835 of the taping machine mount unit 830 slides along the mount bar 831, and the diameter of a wire to be taped or the rotating diameter of a dead end cover or a sleeve cover from the center of the rotating power unit 500 when the dead end cover or the sleeve cover is taped may be adjusted through such sliding.

Figure 18:
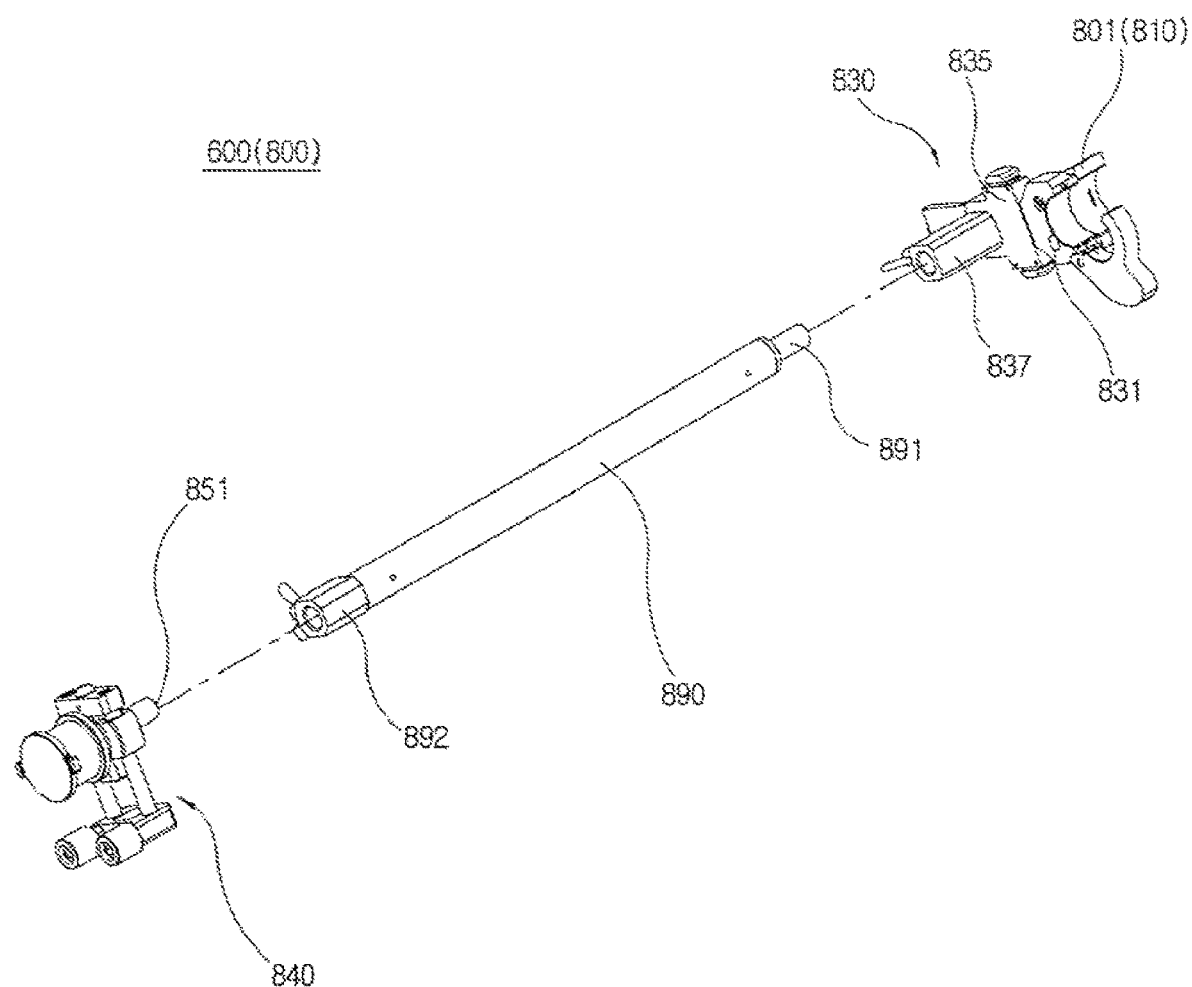
FIG. 18 is a perspective view illustrating the principal part of another embodiment of the taping tool of the automatic opening and closing stripping device for indirect live wires having wire stripping and taping functions according to the present invention.

According to another embodiment, referring to FIG. 18, the taping tool 800 may further include an extension shaft 890 configured to adjust an interval between the taping machine 840 and the taping tool holders 810 and 810' or the taping tool holder 801, and a position to be taped from the operator head 400 may be adjusted through the extension shaft 890.

Here, the extension shaft 890 is provided in the form of a circular rod having a designated length, and a combination projection 891 inserted into the shaft combination pipe 837 of the taping machine mount unit 830 protrudes from one side of the extension shaft 890.

Further, a second shaft combination pipe 892, with which the combination shaft 851 of the taping machine 840 is combined, is provided at the other side of the extension shaft 890.

Here, a fixing bolt (not shown) configured to fix the combination shaft 851 combined with the second shaft combination pipe 892 is provided on the extension shaft 890 so as to achieve firm combination.

That is, in the automatic opening and closing stripping device 1 for indirect live wires having wire stripping and taping functions according to the present invention, when rotating power is applied to the driving unit 100, the rotating power is transmitted to the adaptor unit 300 through the power transmission rod 210 and then transmitted to the rotating power unit 500 connected to the adaptor unit 300, and the rotating power unit 500 is operated to confine a wire and to continuously perform stripping or taping of a wire through the stripping tool 700 or the taping tool 800.

Hereinafter, methods for stripping and taping an indirect live wire using the above-described automatic opening and closing stripping device for indirect live wires having wire stripping and taping functions according to the present invention will be described in detail with reference to the accompanying drawings.

Figure 19:
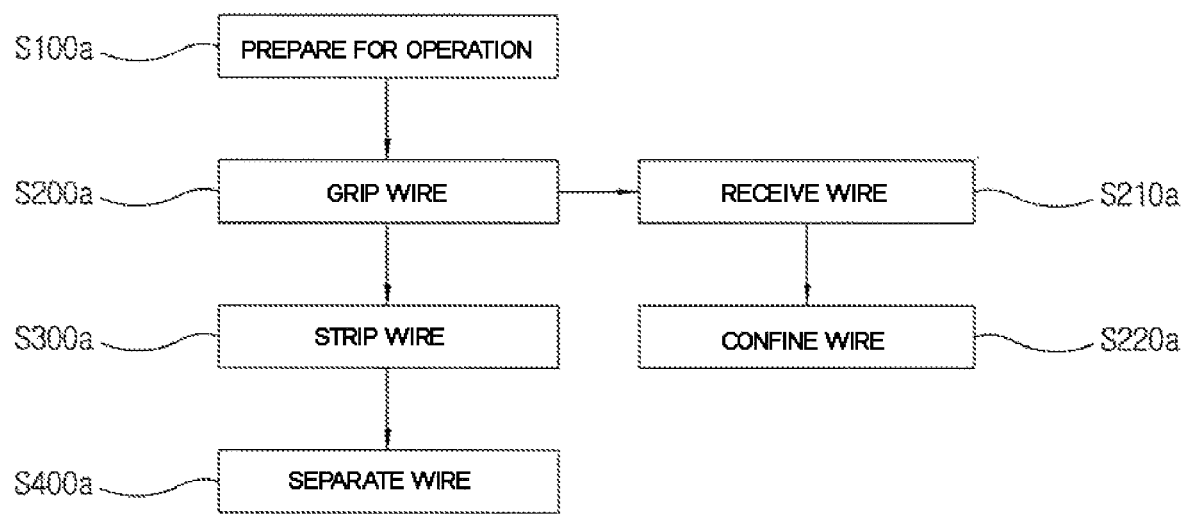
FIG. 19 is a flowchart illustrating a method for stripping an indirect live wire using the automatic opening and closing stripping device for indirect live wires having wire stripping and taping functions according to the present invention.

First, a method for stripping an indirect live wire using the above-described automatic opening and closing stripping, device for indirect live wires having wire stripping and taping functions according to the present invention will be described, and FIG. 19 is a flowchart illustrating the method for stripping an indirect live wire using the automatic opening and closing stripping device for indirect live wires having wire stripping and taping functions according to the present invention.

Referring to FIGS. 1 to 18, the method for stripping an indirect live wire using the automatic opening and closing stripping device for indirect live wires having wire stripping and taping functions according to the present invention includes preparing for an operation (S100a), gripping the wire (S200a), stripping the wire (S300a), and separating the wire (S400a), as shown in FIG. 19.

For this purpose, the automatic opening and closing stripping device for indirect live wires having wire stripping and taping functions, including the driving unit 100, the insulating extension stick 200, the adaptor unit 300, the operator head 400, the rotating power unit 500 and the working tool 600 is used in the present invention, and the stripping tool 700 including a pair of the stripping tool holders 710 and 710', a pair of the wire pressing tools 720 and 720' and the stripping unit 730 is used as the working tool 600.

Figure 20:
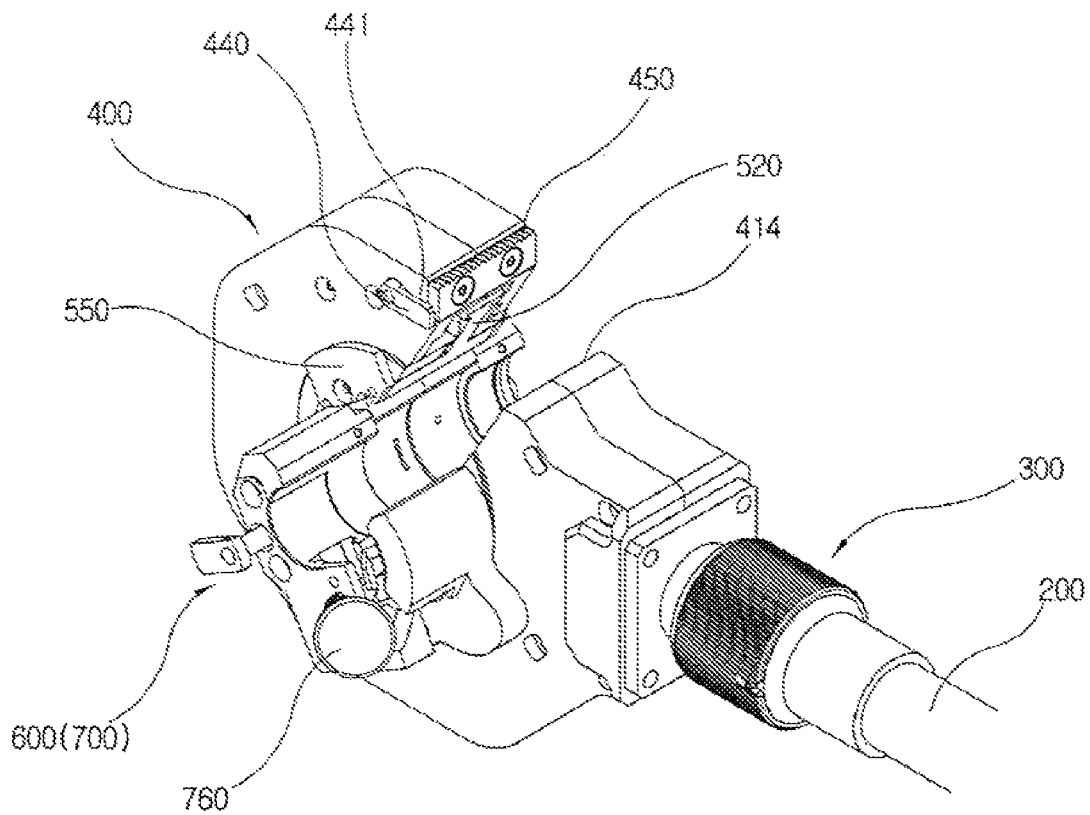
FIG. 20 is a schematic view illustrating preparation for an operation in the method for stripping the indirect live wire using the automatic opening and closing stripping device for indirect live wires having wire stripping and taping functions according to the present invention.

In preparation for the operation (S100a),
referring to FIG. 20, the stripping tool 700 configured to be fit into the wire so as to strip the wire is mounted on the rotating power unit 500 on the operator head 400 of the automatic opening and closing stripping device 1 for indirect live wires having wire stripping and taping functions.

For this purpose, referring to FIGS. 5 to 10, the stripping tool holders 710 and 710' are mounted on the first power gear 520 of the rotating power unit 500, and in this case, the stripping tool holders 710 and 710' are mounted in the holder installation hole 521 between the holder fixing pins 522 using the holder fixing pins 522 provided at both sides of the first power gear 520 as guides, and are fixedly combined with each other through the holder combination pin 718.

Here, the pressing tool guide bearings 534 and 544 are received in the cam grooves 722 of the wire pressing tools 720 and 720' of the stripping tool 700 which is mounted in the above-described manner.

Figure 21:
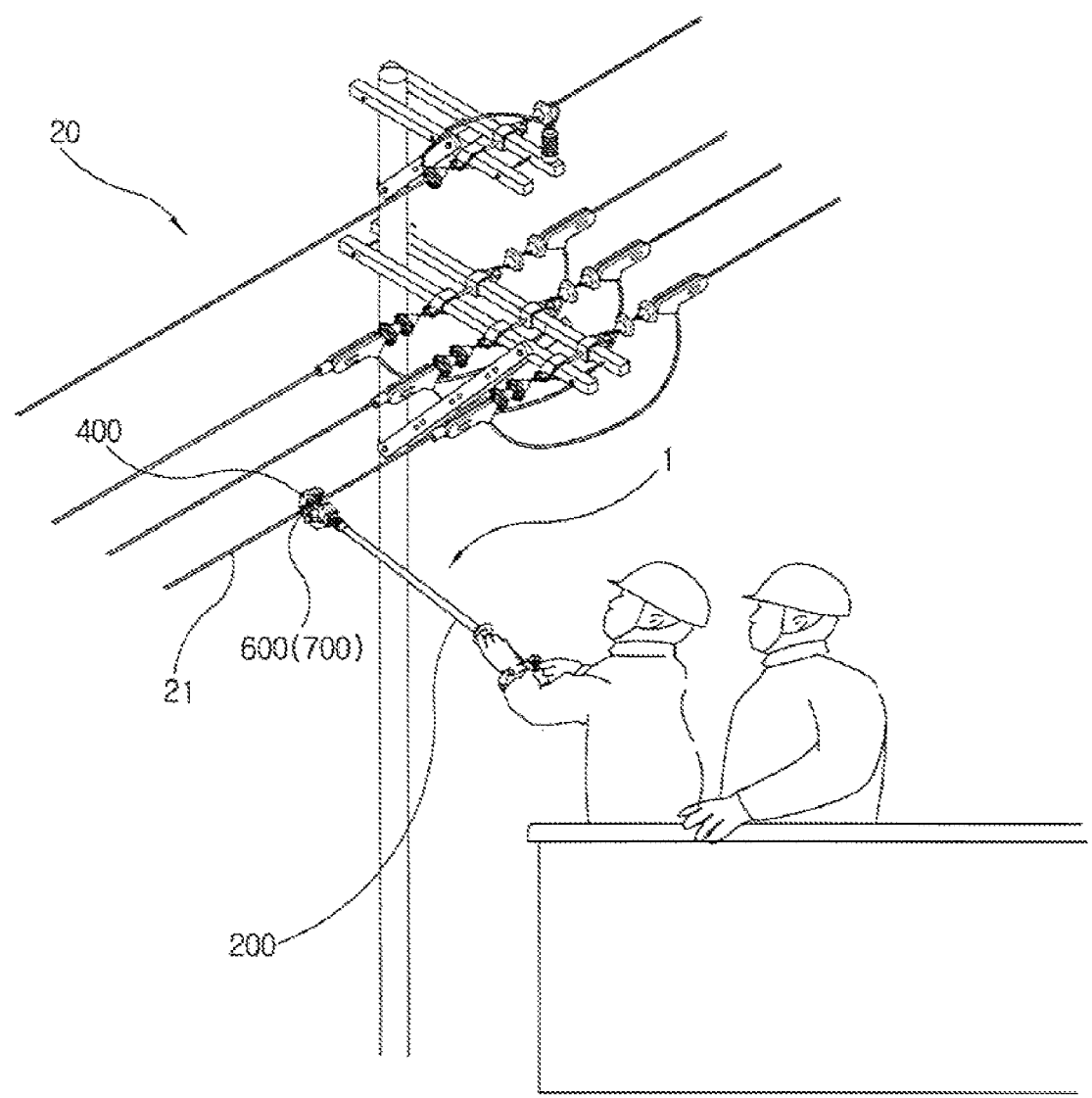
FIG. 21 is a schematic view illustrating preparation for the operation in the method for stripping the indirect live wire using the automatic opening and closing stripping device for indirect live wires having wire stripping and taping functions according to the present invention.

Thereby, the automatic opening and closing stripping device 1 for indirect live wires having wire stripping and taping functions is prepared and, referring to FIG. 21, a worker may approach an electric line 20 using a live wire bucket in the state in which a sufficiently safe distance is assured.

Thereafter, in gripping of the wire (S200a),
the worker inserts a wire 21 into the rotating power unit 500 on the operator head 400 through the insulating extension stick 200 of the prepared automatic opening and closing stripping device 1 for indirect live wires having wire stripping and taping functions at the safe distance, and gripping of the wire (S200a) includes receiving the wire (S210a) and confining the wire (S220a).

Figure 22:
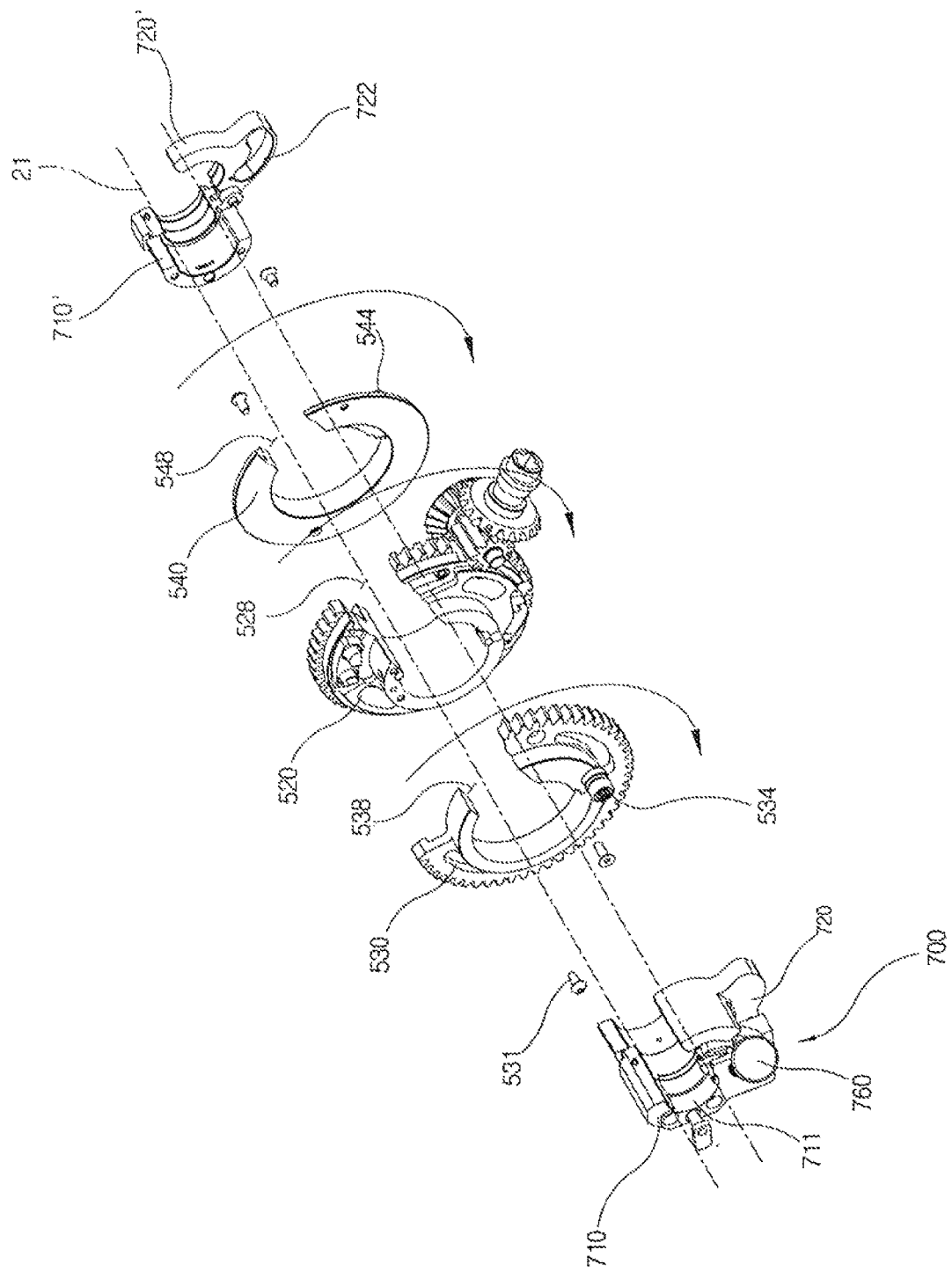
FIG. 22 is a schematic view illustrating receipt of the wire in the method for stripping the indirect live wire using the automatic opening and closing stripping device for indirect live wires having wire stripping and taping functions according to the present invention.

First, in receipt of the wire (S210a),
referring to FIG. 22, the wire is received and placed in the stripped wire receipt recesses 711 of the stripping tool holders 710 and 710' in the state in which the wire lead-in groove 414 formed in the operator head 400, the first wire lead-in groove 528 of the first power gear 520, the second wire lead-in groove 538 of the second power gear 530 and the third wire lead-in groove 548 of the interlocking plate 540 coincide with one another so as to be open.

Here, opening of the lead-in groove 414, the first wire lead-in groove 528, the second wire lead-in groove 538 and the third wire lead-in groove 548 due to coincidence thereamong is achieved by the driving unit 100.

That is, the driving unit 100 rotates a rotating tool in the direction opposite the wire stripping direction in the state in which the rotating tool is combined with the tool combination groove 122 of the drive shaft 120, and the rotating power of the driving unit 100 is transmitted to the interlocking shaft 130 and the power transmission rod 210 of the insulating extension stick 200 through the second bevel gear 131 and to the power transmission unit 510 of the rotating power unit 500 through the adaptor rod 320 of the adaptor unit 300.

Therefore, the power transmission unit 510 transmits the rotating power to the first and second gear parts 523 and 532 of the first power gear 520 and the second power gear 530 through the power bevel gear 511 connected to the adaptor rod 320 and the interlocking bevel gear 513, and the rotating power is applied in the rightward direction in the drawings.

Thereby, when the rotating power is transmitted to the first power gear 520 and the second power gear 530 and then the interlocking gear 514 reaches the idling recess 524 of the first power gear 520 during a process of simultaneously rotating the first power gear 520 and the second power gear 530, rotation of the first power gear 520 is stopped due to release of the engagement force of the first gear part 523 and the second power gear 530 alone is rotated, rotation of the second power gear 530 is also stopped together with engagement of the power guide pins 531 with the power guide grooves 527 when the power guide pins 531 are rotated in the sections of the power guide grooves 527 and then located at the ends (the left ends in the drawings) of the power guide grooves 527, and in this case, the wire lead-in groove 414 of the operator head 400, the first wire lead-in groove 528 of the first power gear 520, the second wire lead-in groove 538 of the second power gear 530 and the third wire lead-in groove 548 of the interlocking plate 540 are in the open state, and therefore, the wire 21 may enter these lead-in grooves and thus be received in the stripped wire receipt recesses 711 of the stripping tool holders 710 and 710'.

Here, when rotating power is continuously transmitted to the second power gear 530 during the process of stopping rotation of the second power gear 530, the power guide pins 531 may push the power guide grooves 527 and thus provide rotating power, and such a phenomenon is prevented by the anti-rotation stopper 560 and the fixing pins 415 and 415'.

First, when the first power gear 520 is rotated in the opposite direction, the stopping protrusion 561 is engaged with the elastic projection 430 and thus rotation of the first power gear 520 is prevented, i.e., rotation of the first power gear 520 may be stopped in the state in which the wire lead-in groove 414 and the first wire lead-in groove 528 correspond to each other.

Further, because the power gear fixing protrusion 529 formed at one side of the first power gear 520 is engaged with and supported by the power gear fixing pin 415 formed at one side of the operator head 400, rotation of the first power gear 520 is blocked, and thereby, even when the rotating power is continuously transmitted to the second power gear 530, the power guide pins 531 are engaged with the power guide grooves 527 and thus rotation of the second power gear 530 is prevented and the wire lead-in groove 414, the first wire lead-in groove 528, the second wire lead-in groove 538 and the third wire lead-in groove 548 remain open.

In addition, because the pressing tool guide bearings 534 and 544 are received in the cam grooves 722 of the wire pressing tools 720 and 720' during the process of rotating the second power gear 530 and the interlocking plate 540, the stripped wire receipt recesses 711 of the stripping tool holders 710 and 710' are open by rotating the wire pressing tools 720 and 720' outwards.

Figure 23:
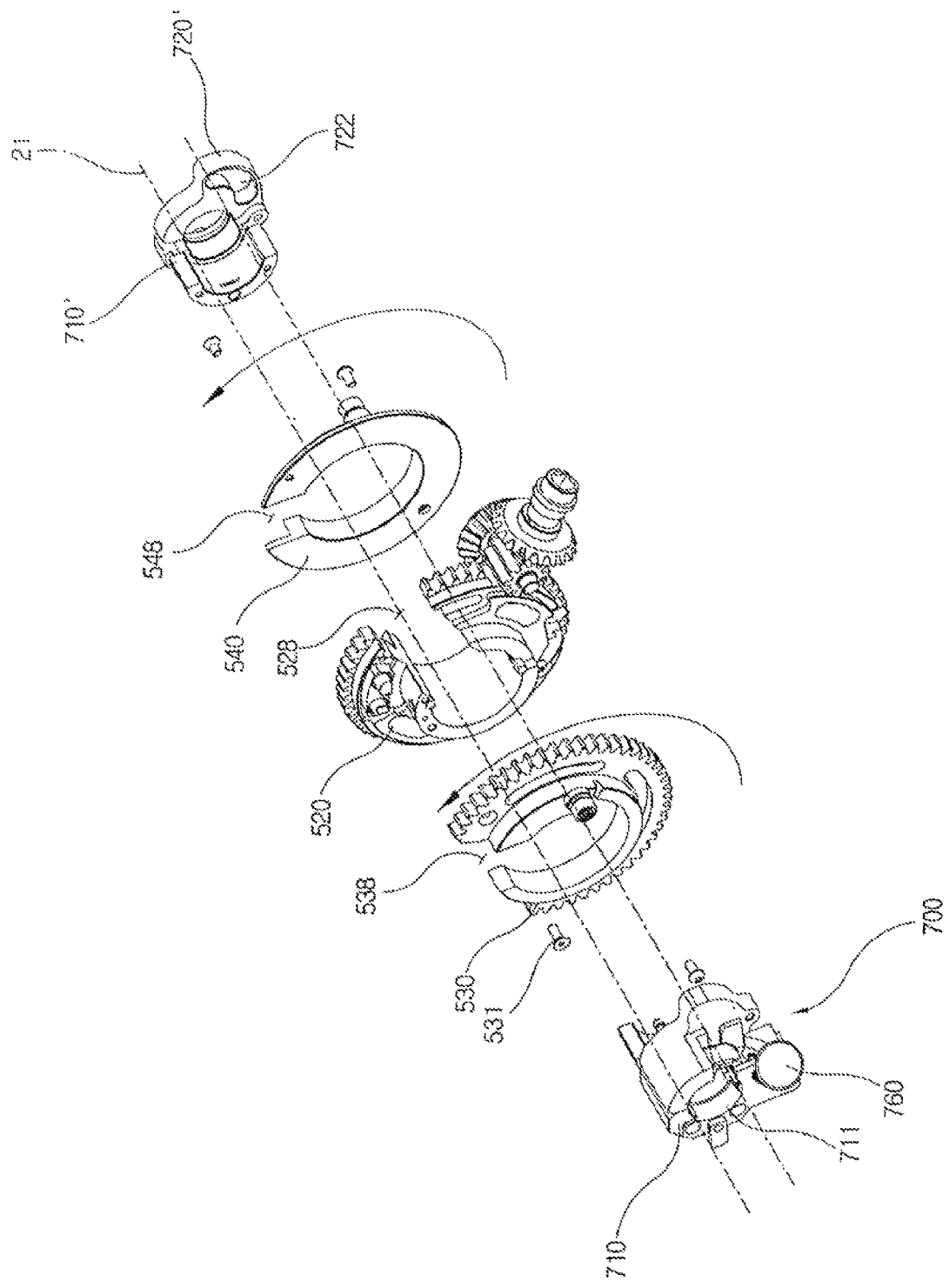
FIG. 23 is a schematic view illustrating confinement of the wire in the method for stripping the indirect live wire using the automatic opening and closing stripping device for indirect live wires having wire stripping and taping functions according to the present invention.

Thereafter, in confinement of the wire (S220*a*), referring to FIG. 23, when the rotating tool is primarily rotated in the opposite direction, i.e., the wire stripping direction, in the state in which the wire 21 is received in the stripped wire receipt recesses 711, the rotating power is transmitted to the power transmission unit 510, as described above, and such a direction may be opposite the direction when the wire lead-in groove 414 of the operator head 400, the first wire lead-in groove 528 of the first power gear 520, the second wire lead-in groove 538 of the second power gear 530 and the third wire lead-in groove 548 of the interlocking plate 540 are open.

Therefore, the power transmission unit 510 transmits the rotating power to the first and second gear parts 523 and 532 of the first power gear 520 and the second power gear 530 through the power bevel gear 511 connected to the adaptor rod 320 and the interlocking bevel gear 513, and the rotating power is applied in the leftward direction in the drawings.

Thereby, when the rotating power is transmitted to the first power gear 520 and the second power gear 530, the interlocking gear 514 is located in the idling recess 524 of the first power gear 520 and thus the first power gear 520 is not rotated and the second power gear 530 alone is rotated, and in this case, the power guide pins 531 are engaged with the power guide grooves 527 and the second and third wire lead-in recesses 538 and 548 of the second power gear 530 and the interlocking plate 540 are moved to the stripped wire receipt recesses 711 when the power guide pins 531 are rotated in the sections of the power guide grooves 527 and then located at the other ends (the right ends in the drawings) of the power guide grooves 527.

Here, because the power gear fixing protrusion 529' formed at the other side of the first power gear 520 is engaged with and supported by the other power gear fixing pin 415', rotation of the first power gear 520 is prevented even when the first gear part 523 is interfered with by an error of the interlocking gear 514, and when the power guide pins 531 are located in the other ends of the power guide grooves 527, the second power gear 530 climbs over the inclined plane 529*a*' of the power gear fixing protrusion 529' so that the power gear fixing protrusion 529' is inserted thereinto, and thus the first power gear 520 becomes rotatable.

Further, because the pressing tool guide bearings 534 and 544 are rotated along the cam grooves 722 of the wire pressing tools 720 and 720' when the second power gear 530 and the interlocking plate 540 are rotated, the wire pressing tools 720 and 720' are rotated towards the stripped wire receipt recesses 711 and thus cover and fix the wire 21 through the stripped wire pressing recesses 721 during such a process, and pressure is uniformly applied to the wire 21 at both sides of the operator head 400 by the wire pressing tools 720 and 720' so as to fix the wire.

Here, the pressing tool guide bearings 534 and 544 moving along the cam grooves 722 are inserted into the bearing fixing recesses 723 at the ends of the cam grooves 722, thus being fixed.

Further, because the stripping blade guide bearing 724 applies pressure to the press support 741 of the stripping blade holder 740 during the above process of rotating the wire pressing tools 720 and 720', the stripping blade holder 740 is moved to the stripped wire receipt recesses 711, and the stripping blade 750 protrudes towards the stripped wire receipt recesses 711 and penetrates the sheath of the wire 21 to a designated depth.

Thereafter, in stripping of the wire (S300*a*), the driving unit 100 in the indirect live wire state at the safe distance through the insulating extension stick 200 is secondarily operated in the state in which the wire to be stripped is confined, thereby driving the rotating power unit 500 so as to strip the wire.

Figure 24:
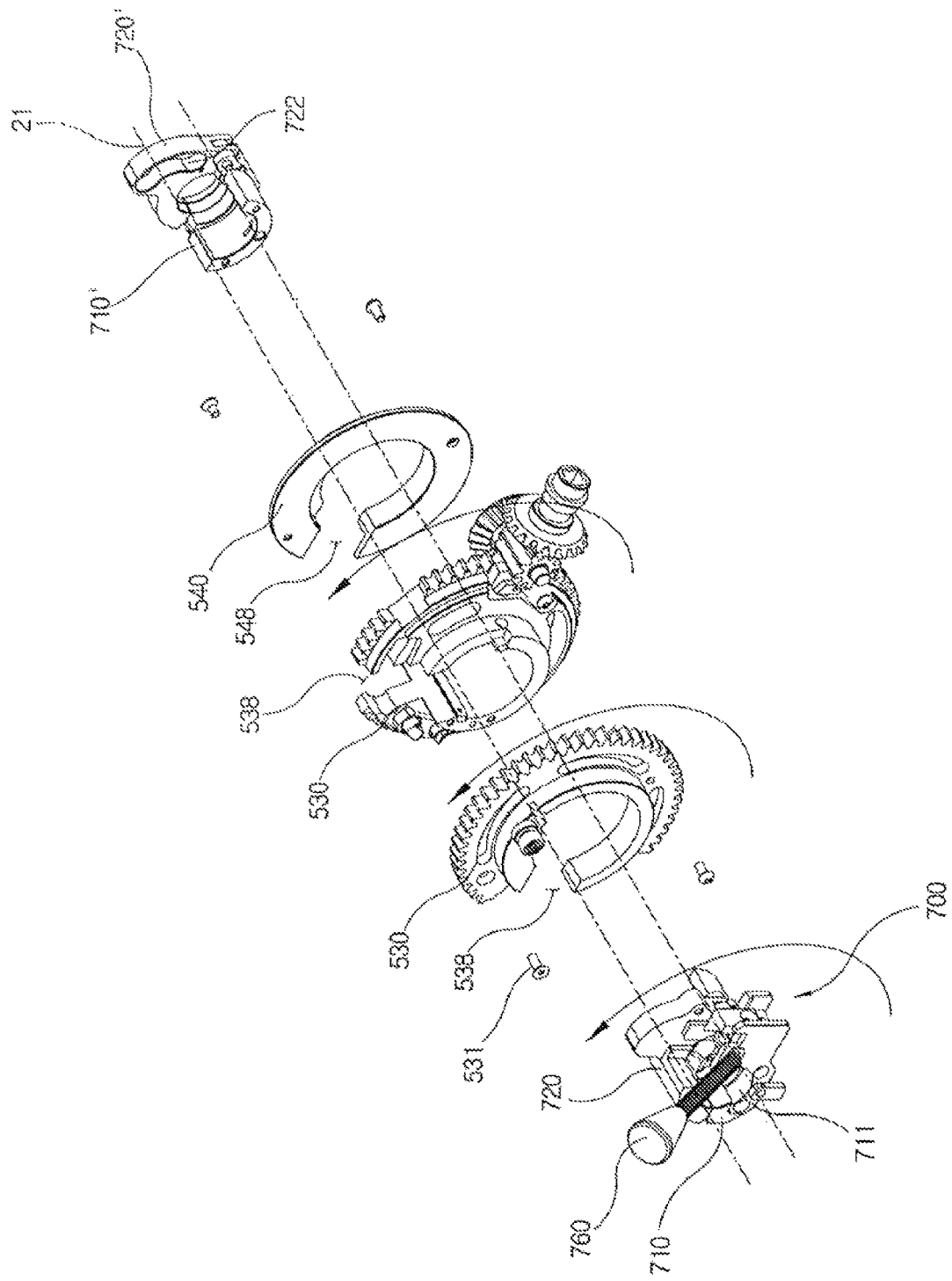
FIG. 24 is a schematic view illustrating stripping of the wire in the method for stripping the indirect live wire using the automatic opening and closing stripping device for indirect live wires having wire stripping and taping functions according to the present invention.
Figure 25:
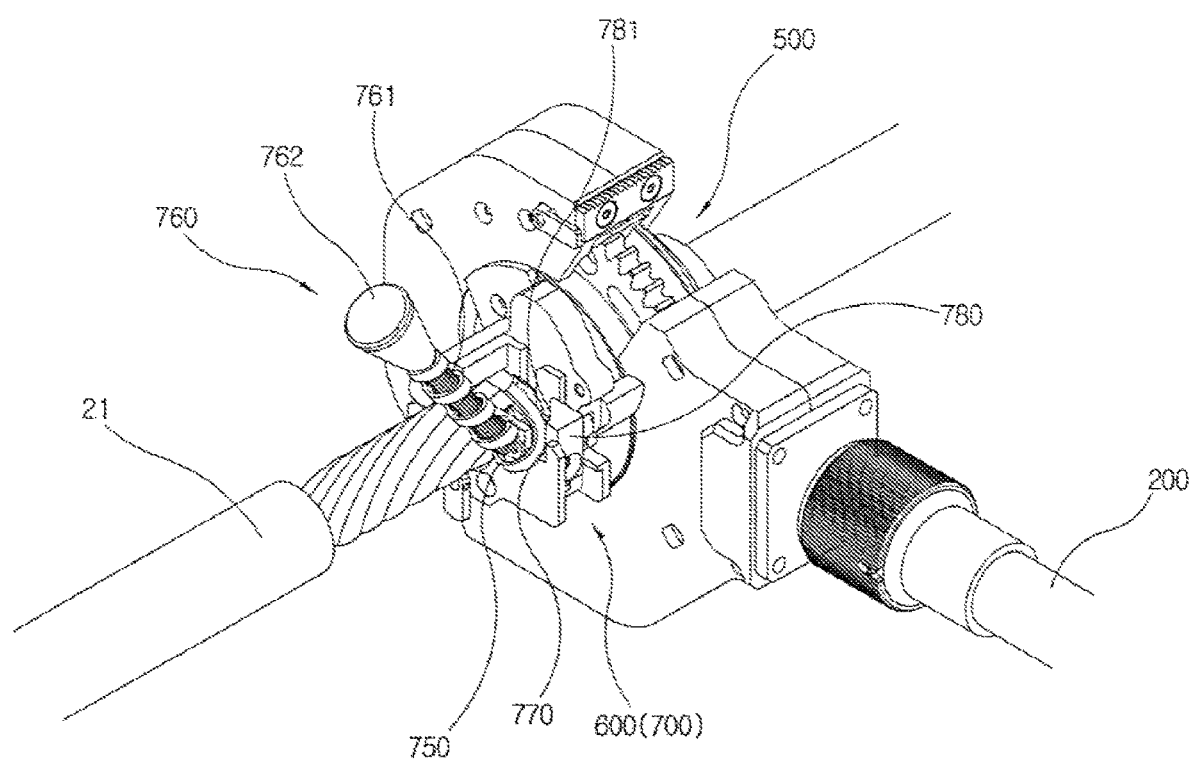
FIG. 25 is a schematic view illustrating the stripped state of the wire in the method for stripping the indirect live wire using the automatic opening and closing stripping device for indirect live wires having wire stripping and taping functions according to the present invention.
Figure 26:
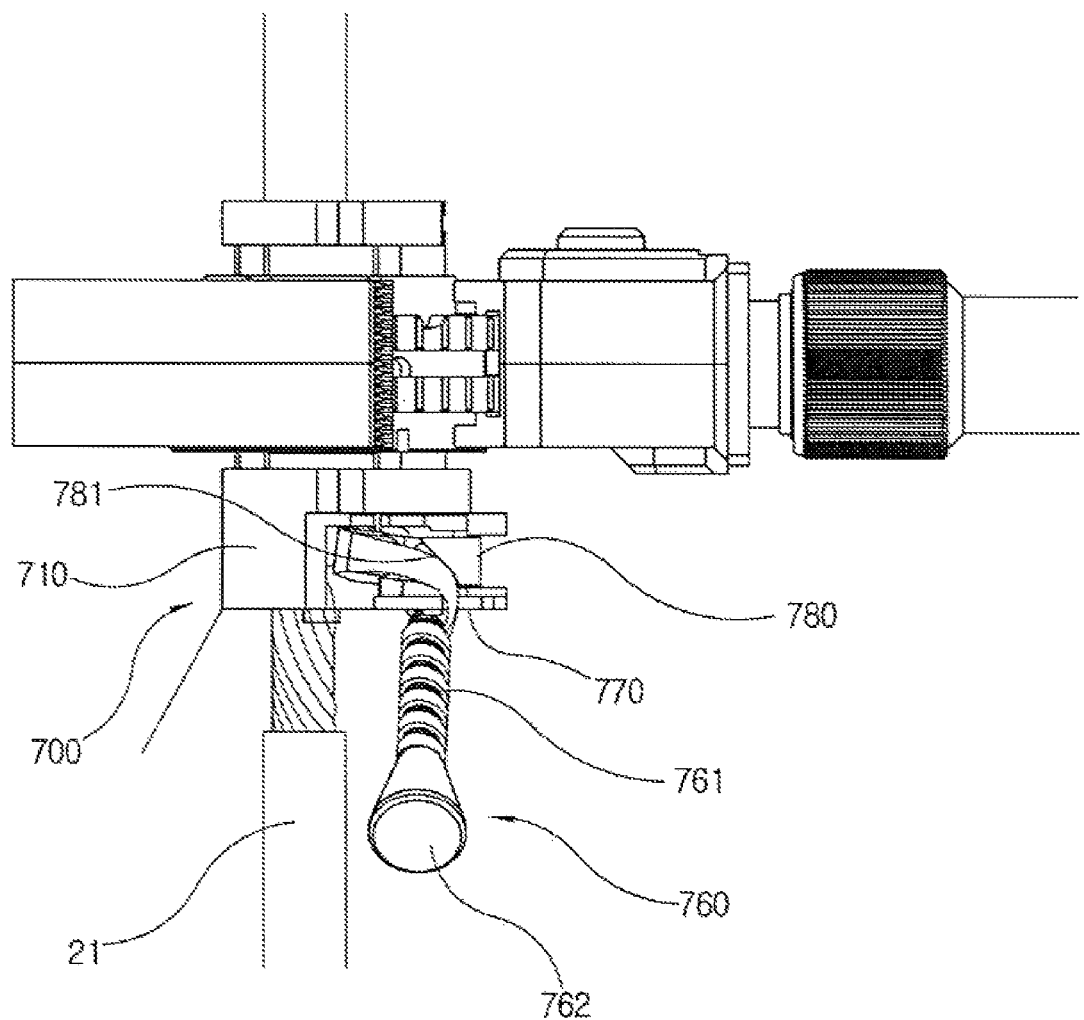
FIG. 26 is a schematic view illustrating the stripped state of the wire in the method for stripping the indirect live wire using the automatic opening and closing stripping device for indirect live wires having wire stripping and taping functions according to the present invention.

In more detail, referring to FIGS. 24 to 26, the driving unit 100 primarily driven in the above-described manner is continuously driven in the state in which the first power gear 520, the second power gear 530 and the interlocking plate 540 are connected and supported by the power guide pins 531.

That is, when the interlocking gear 514 is continuously rotated, the interlocking gear 514 rotates the second power gear 530 and then pulls the first power gear 520 supported by the power guide pins 531 in the direction of rotation so as to rotate the first power gear 520 together, and thereby, the first and second power gears 520 and 530 and the interlocking plate 540 are simultaneously rotated.

Therefore, the stripping blade 750 interferes with the sheath of the wire 21 and penetrates the sheath, thus stripping the wire 21.

The sheath stripped in the present invention is discharged into a spiral form, and referring to FIG. 11, the stripped sheath is discharged into the discharge guide hole 770 along the inclined guide plane 781 of the discharge guide member 780 and is simultaneously wound on the winder spring 761.

Here, the sheath discharged in the spiral form is naturally wound on the winder spring 761 spirally along the coiled spring thereof, and is engaged with the engagement projection 762 having a tapered shape provided at the end of the winder spring 761 so as to prevent release of the sheath, and such collection of the sheath may prevent the stripped sheath from harming the environment on a construction site.

Thereafter, in separation of the wire (S400a), the stripped sheath is cut and the wire is separated from the operator head 400 in the state in which stripping of the wire is completed, and thereby, the automatic opening and closing stripping device 1 for indirect live wires having wire stripping and taping functions is removed.

In more detail, the stripped sheath of the wire 21 is cut by the cutting protrusions 725 and 725' provided on the stripping wire receipt recess 711 and the stripping wire pressing recess 721 of the stripping tool holder 710' and the wire pressing tool 720', and the cutting protrusions 725 and 725' may cut the stripped sheath when a worker applies a designated external force to the handle 140 to twist the operator head 400 at a designated angle.

Thereafter, because the operator head 400 is separated from the wire 21 by operating the rotating power unit 500 in the opposite direction by rotating the drive shaft of the driving unit 100 using the rotating tool in the same manner as in receipt of the wire 21 (S210a), the operator head 400 is separated from the wire 21 in the state in which the wire lead-in groove 414 of the operator head 400, the first wire lead-in groove 528, the second wire lead-in groove 538 and the third wire lead-in groove 548 coincide with one another so as to be open, and thereby, the automatic opening and closing stripping device 1 for indirect live wires having wire stripping and taping functions may be removed from the wire 21.

That is, in the method for stripping an indirect live wire using the automatic opening and closing stripping device for indirect live wires having wire stripping and taping functions according to the present invention, confinement and gripping of the wire, stripping of the wire and separation of the wire are continuously performed through continuous operation of the driving unit 100 in gripping of the wire (S200a) and stripping of the wire (S300a) without requiring a process of confining the wire and a process of stripping the wire separately, and thus, operation of the driving unit 100 and the stripping operation may be very conveniently performed.

Figure 27:
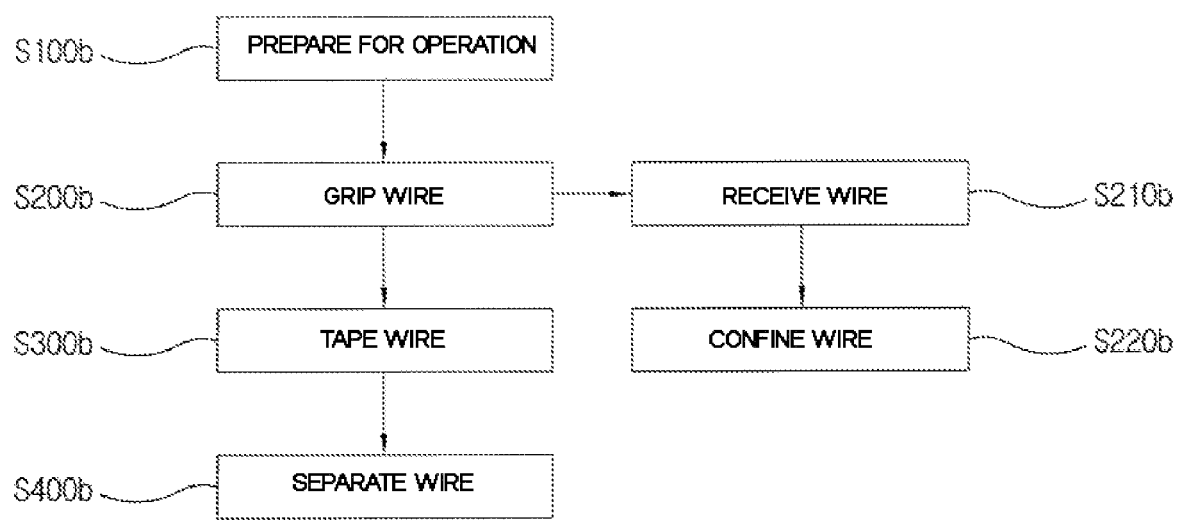
FIG. 27 is a flowchart illustrating a method for taping an indirect live wire using the automatic opening and closing stripping device for indirect live wires having wire stripping and taping functions according to the present invention.

Further, a method for taping an indirect live wire using the above-described automatic opening and closing stripping device for indirect live wires having wire stripping and taping functions according to the present invention will be described, and FIG. 27 is a flowchart illustrating the method for taping an indirect live wire using the automatic opening and closing stripping device for indirect live wires having wire stripping and taping functions according to the present invention.

Referring to FIGS. 1 to 18, the method for taping an indirect live wire using the automatic opening and closing stripping device for indirect live wires having wire stripping and taping functions according to the present invention includes preparing for an operation (S100b), gripping the wire (S200b), taping the wire (S300b), and separating the wire (S400b), as shown in FIG. 27.

For this purpose, the automatic opening and closing stripping device for indirect live wires having wire stripping and taping functions, including the driving unit 100, the insulating extension stick 200, the adaptor unit 300, the operator head 400, the rotating power unit 500 and the working tool 600 is used in the present invention, and the taping tool 800 including a pair of the taping tool holders 810 and 810', a pair of the wire pressing tools 820 and 820', the taping machine mount unit 830 and the taping machine 840, or the taping tool 800 including the single taping tool 801, the taping machine mount unit 830 and the taping machine 840 is used as the working tool 600.

Figure 28:
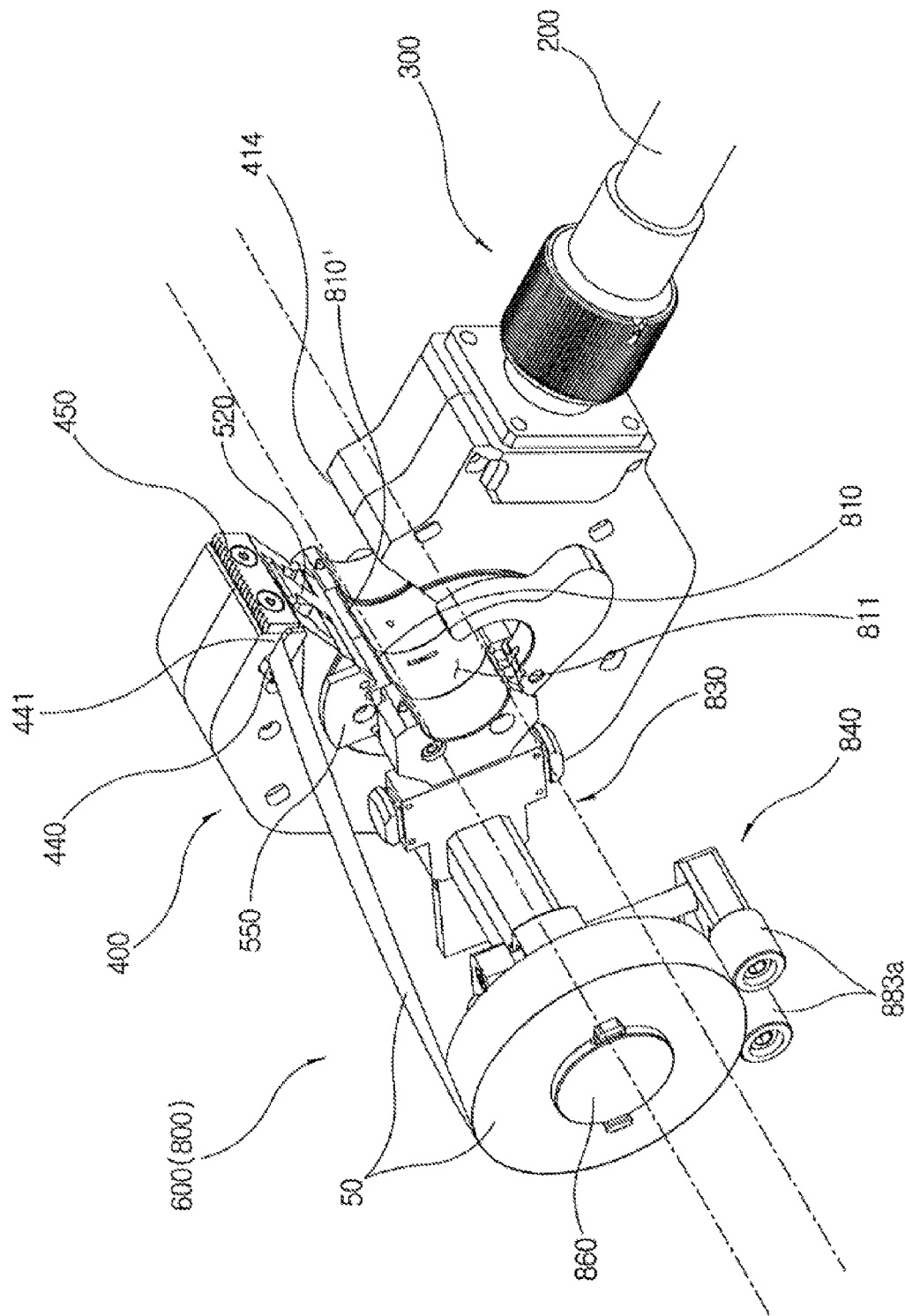
FIG. 28 is a schematic view illustrating preparation for an operation in the method for taping the indirect live wire using the automatic opening and closing stripping device for indirect live wires having wire stripping and taping functions according to the present invention.
Figure 29:
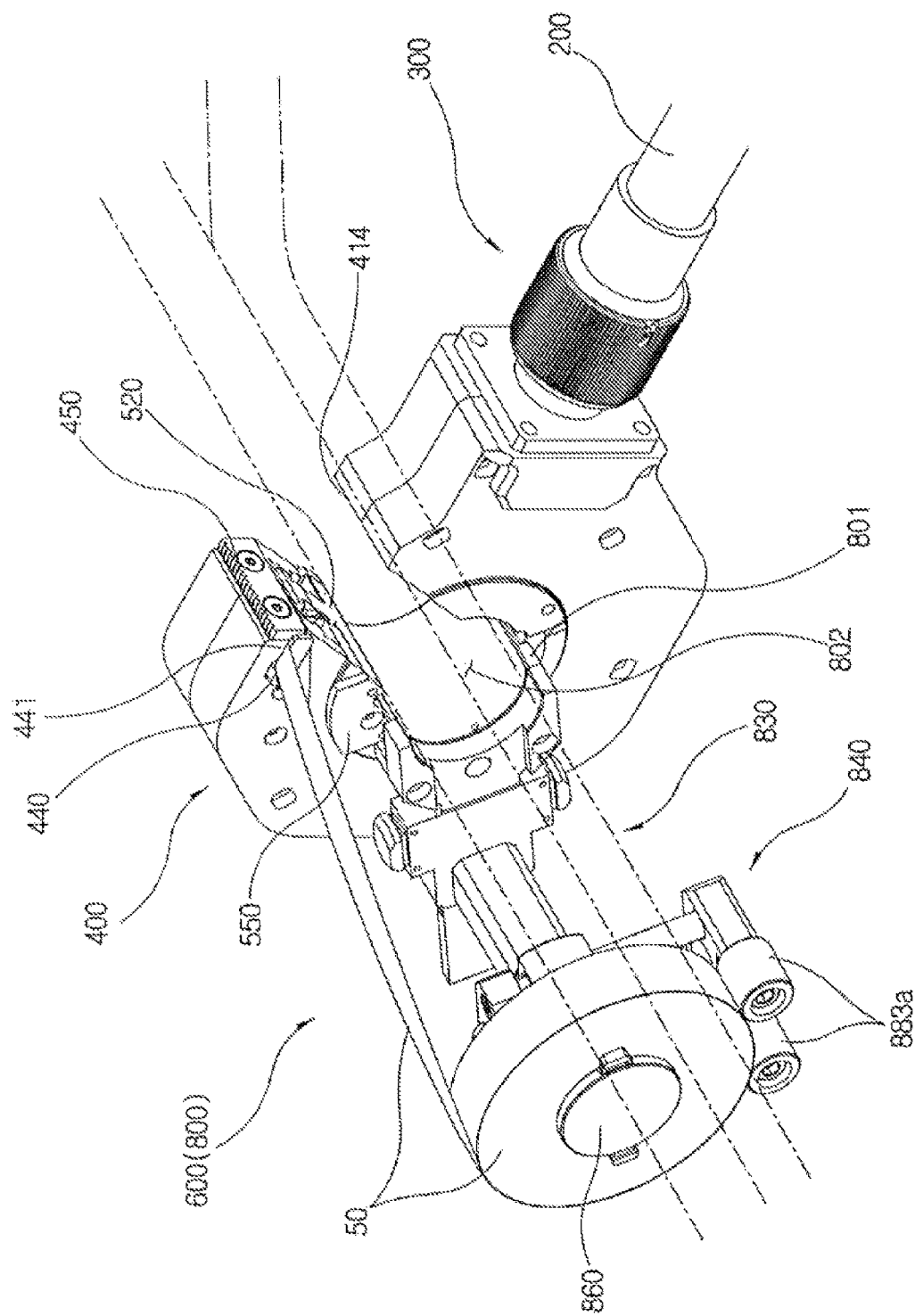
FIG. 29 is a schematic view illustrating preparation for an inner diameter expanding operation in the method for taping the indirect live wire using the automatic opening and closing stripping device for indirect live wires having wire stripping and taping functions according to the present invention.

In preparation for the operation (S100b), referring to FIGS. 28 and 29, the taping tool 800 configured to be fit into the wire so as to tape the wire is mounted on the rotating power unit 500 on the operator head 400 of the automatic opening and closing stripping device 1 for indirect live wires having wire stripping and taping functions.

For this purpose, referring to FIGS. 12 to 17, when the taping tool 800 including a pair of the taping tool holders 810 and 810' is used, as shown in FIG. 28, the taping tool holders 810 and 810' are mounted on the first power gear 520 of the rotating power unit 500, and in this case, the taping tool holders 810 and 810' are mounted in the holder installation hole 521 between the holder fixing pins 522 using the holder fixing pins 522 provided at both sides of the first power gear 520 as guides, and are fixedly combined with each other through the holder combination pin 818.

Here, the pressing tool guide bearings 534 and 544 are received in the cam grooves 822 of the wire pressing tools 820 and 820' of the taping tool 800 which is mounted in the above-described manner.

Further, when the taping tool 800 including the single taping tool holder 801 is used, as shown in FIG. 29, the taping tool holder 801 is mounted on the first power gear 520 of the rotating power unit 500, and in this case, the taping tool holder 801 is mounted in the holder installation hole 521 at one side of the first power gear 520 and the mounted taping tool holder 801 is combined with the holder installation hole 521 by the holder combination pin 838.

Further, in the mounted taping tool 800, an insulating tape 50 to be taped onto the wire is mounted on the taping machine 840.

Here, the mounted insulating tape 50 is mounted on the bobbin 861 in the state in which the bobbin finishing cap 865 of the tape mount unit 860 is open, the bobbin finishing cap 865 is closed, and the tension members 883a of the tension unit 880 provide tension to the circumference of the mounted insulating tape 50 so as to apply pressure to and fix the insulating tape 50.

Further, the mounted insulating tape 50 is unwound and withdrawn, and in this case, the withdrawn end thereof is adhered to the insulating tape 50 so as to form a circular loop, and the insulating tape loop is inserted into the tape fixing groove 441 and engaged with the tape fixing bar 440 so as to be fixed.

Figure 30:
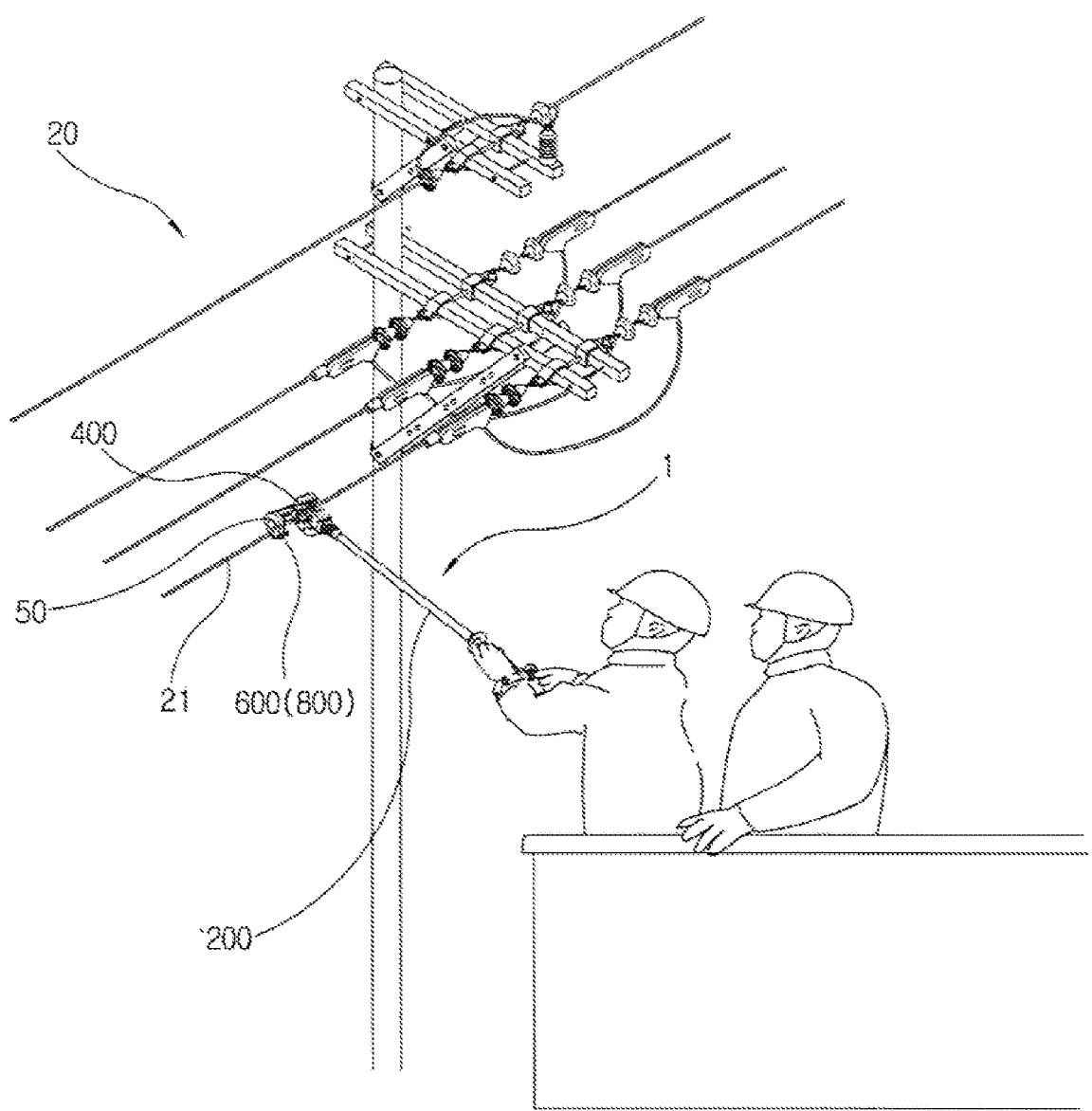
FIG. 30 is a schematic view illustrating receipt of the wire in the method for taping the indirect live wire using the automatic opening and closing stripping device for indirect live wires having wire stripping and taping functions according to the present invention.

Thereby, the automatic opening and closing stripping device 1 for indirect live wires having wire stripping and taping functions is prepared and, referring to FIG. 30, a worker may approach an electric line 20 using a live wire bucket in the state in which a sufficiently safe distance is assured.

Thereafter, in gripping of the wire (S200b), the worker inserts a wire 21 into the rotating power unit 500 on the operator head 400 through the insulating extension stick 200 of the prepared automatic opening and closing stripping device 1 for indirect live wires having wire stripping and taping functions at the safe distance, and gripping of the wire (S200b) includes receiving the wire (S210b) and confining the wire (S220b).

Figure 31:
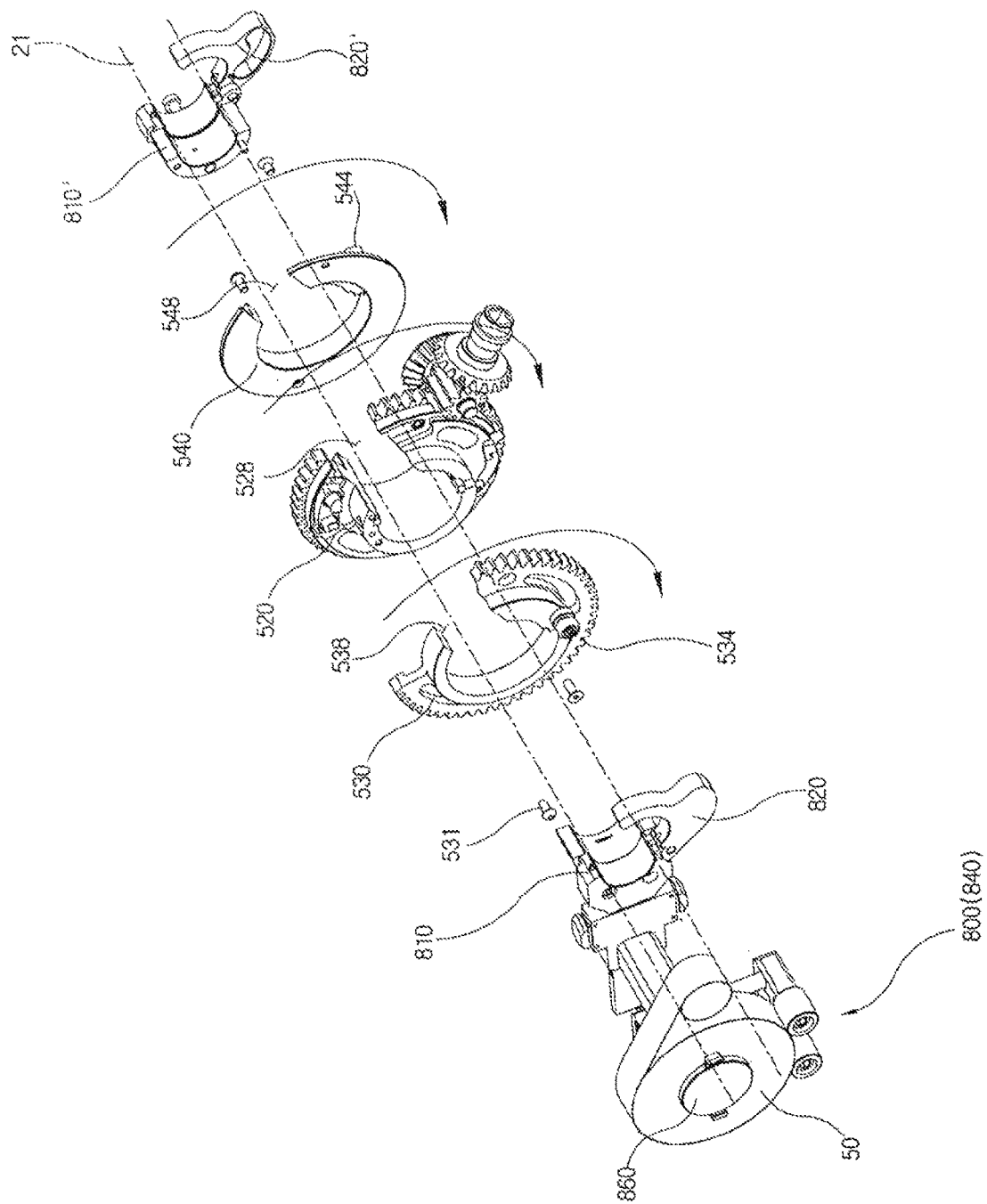
FIG. 31 is a schematic view illustrating receipt of the wire in the method for taping the indirect live wire using the automatic opening and closing stripping device for indirect live wires having wire stripping and taping functions according to the present invention.

First, in receipt of the wire (S210b), referring to FIG. 31, the wire is received and placed in the taped wire receipt recesses 811 of the taping tool holders 810 and 810' in the state in which the wire lead-in groove 414 formed in the operator head 400, the first wire lead-in groove 528 of the first power gear 520, the second wire lead-in groove 538 of the second power gear 530 and the third wire lead-in groove 548 of the interlocking plate 540 coincide with one another so as to be open.

Here, opening of the lead-in groove 414, the first wire lead-in groove 528, the second wire lead-in groove 538 and the third wire lead-in groove 548 due to coincidence thereamong is achieved by the driving unit 100.

That is, the driving unit 100 rotates a rotating tool in the direction opposite the wire taping direction in the state in which the rotating tool is combined with the tool combination groove 122 of the drive shaft 120, and the rotating power of the driving unit 100 is transmitted to the interlocking shaft 130 and the power transmission rod 210 of the insulating extension stick 200 through the second bevel gear 131 and to the power transmission unit 510 of the rotating power unit 500 through the adaptor rod 320 of the adaptor unit 300.

Therefore, the power transmission unit 510 transmits the rotating power to the first and second gear parts 523 and 532 of the first power gear 520 and the second power gear 530 through the power bevel gear 511 connected to the adaptor rod 320 and the interlocking bevel gear 513, and the rotating power is applied in the rightward direction in the drawings.

Thereby, when the rotating power is transmitted to the first power gear 520 and the second power gear 530 and then the interlocking gear 514 reaches the idling recess 524 of the first power gear 520 during a process of simultaneously rotating the first power gear 520 and the second power gear 530, rotation of the first power gear 520 is stopped due to release of the engagement force of the first gear part 523 and the second power gear 530 alone is rotated, rotation of the second power gear 530 is also stopped together with engagement of the power guide pins 531 with the power guide grooves 527 when the power guide pins 531 are rotated in the sections of the power guide grooves 527 and then located at the ends (the left ends in the drawings) of the power guide grooves 527, and in this case, the wire lead-in groove 414 of the operator head 400, the first wire lead-in groove 528 of the first power gear 520, the second wire lead-in groove 538 of the second power gear 530 and the third wire lead-in groove 548 of the interlocking plate 540 are in the open state, and therefore, the wire 21 may enter these lead-in grooves and thus be received in the taped wire receipt recesses 811 of the taping tool holders 810 and 810'.

Here, when rotating power is continuously transmitted to the second power gear 530 during the process of stopping rotation of the second power gear 530, the power guide pins 531 may push the power guide grooves 527 and thus provide rotating power, and such a phenomenon is prevented by the anti-rotation stopper 560 and the fixing pins 415 and 415'.

First, when the first power gear 520 is rotated in the opposite direction, the stopping protrusion 561 is engaged with the elastic projection 430 and thus rotation of the first power gear 520 is prevented, i.e., rotation of the first power gear 520 may be stopped in the state in which the wire lead-in groove 414 and the first wire lead-in groove 528 correspond to each other.

Further, because the power gear fixing protrusion 529 formed at one side of the first power gear 520 is engaged with and supported by the power gear fixing pin 415 formed at one side of the operator head 400, rotation of the first power gear 520 is blocked, and thereby, even when the rotating power is continuously transmitted to the second power gear 530, the power guide pins 531 are engaged with the power guide grooves 527 and thus rotation of the second power gear 530 is prevented and the wire lead-in groove 414, the first wire lead-in groove 528, the second wire lead-in groove 538 and the third wire lead-in groove 548 remain open.

In addition, because the pressing tool guide bearings 534 and 544 are received in the cam grooves 822 of the wire pressing tools 820 and 820' during the process of rotating the second power gear 530 and the interlocking plate 540, the taped wire receipt recesses 811 of the taping tool holders 810 and 810' are open by rotating the wire pressing tools 820 and 820' outwards.

Figure 32:
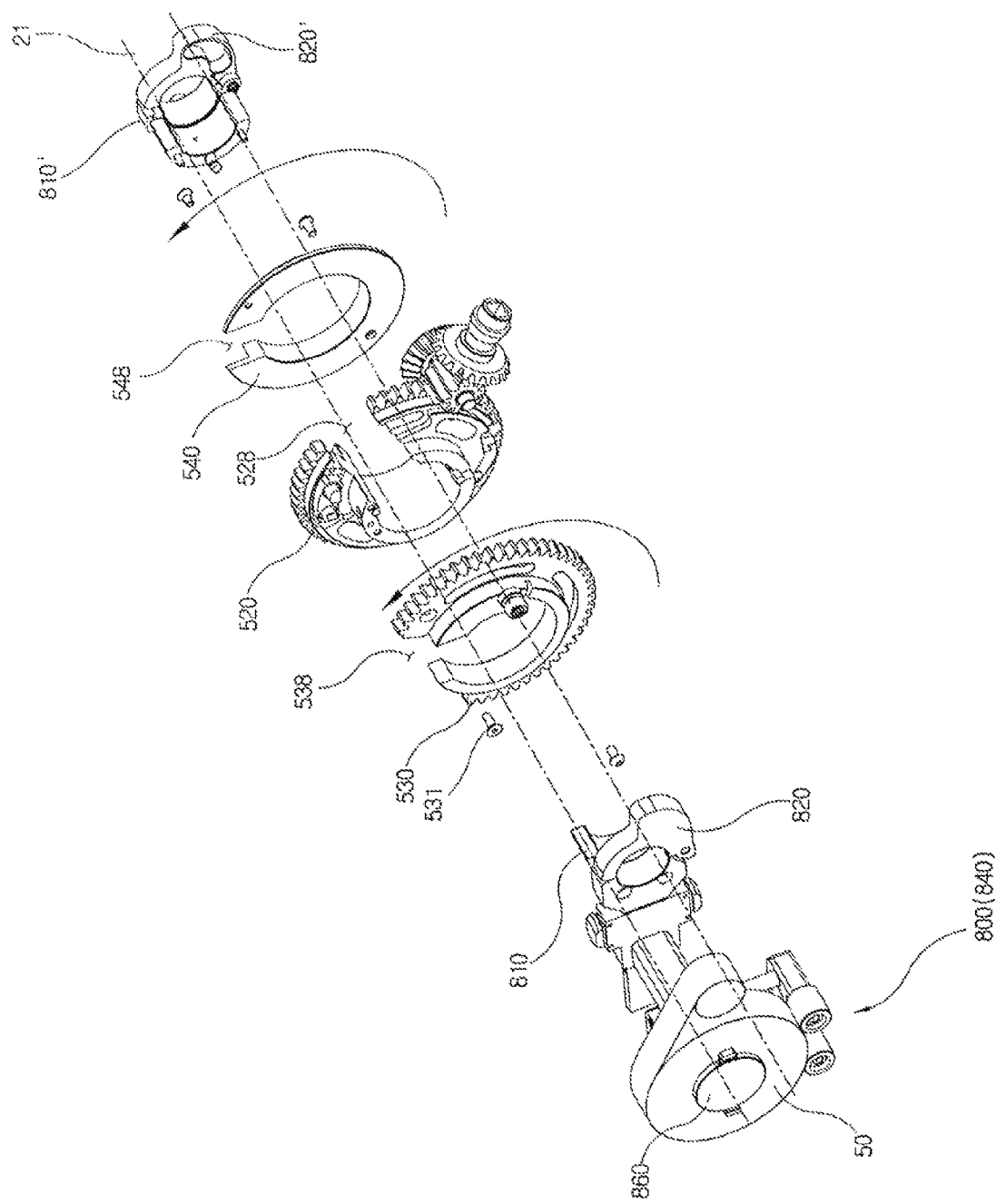
FIG. 32 is a schematic view illustrating confinement of the wire in the method for taping the indirect live wire using the automatic opening and closing stripping device for indirect live wires having wire stripping and taping functions according to the present invention.

Thereafter, in confinement of the wire (S220b), referring to FIG. 32, when the rotating tool is primarily rotated in the opposite direction, i.e., the wire taping direction, in the state in which the wire 21 is received in the taped wire receipt recesses 811, the rotating power is transmitted to the power transmission unit 510, as described above, and such a direction may be opposite the direction when the wire lead-in groove 414 of the operator head 400, the first wire lead-in groove 528 of the first power gear 520, the second wire lead-in groove 538 of the second power gear 530 and the third wire lead-in groove 548 of the interlocking plate 540 are open.

Therefore, the power transmission unit 510 transmits the rotating power to the first and second gear parts 523 and 532 of the first power gear 520 and the second power gear 530 through the power bevel gear 511 connected to the adaptor rod 320 and the interlocking bevel gear 513, and the rotating power is applied in the leftward direction in the drawings.

Thereby, when the rotating power is transmitted to the first power gear 520 and the second power gear 530, the interlocking gear 514 is located in the idling recess 524 of the first power gear 520 and thus the first power gear 520 is not rotated and the second power gear 530 alone is rotated, and in this case, the power guide pins 531 are engaged with the power guide grooves 527 and the second and third wire lead-in recesses 538 and 548 of the second power gear 530 and the interlocking plate 540 are moved to close the taped wire receipt recesses 811 when the power guide pins 531 are rotated in the sections of the power guide grooves 527 and then located at the other ends (the right ends in the drawings) of the power guide grooves 527.

Here, because the power gear fixing protrusion 529' formed at the other side of the first power gear 520 is engaged with and supported by the other power gear fixing pin 415', rotation of the first power gear 520 is prevented even when the first gear part 523 is interfered with by an error of the interlocking gear 514, and when the power guide pins 531 are located in the other ends of the power guide grooves 527, the second power gear 530 climbs over the inclined plane 529a' of the power gear fixing protrusion 529' so that the power gear fixing protrusion 529' is inserted thereinto, and thus the first power gear 520 becomes rotatable.

Particularly, when both the taping tool holders 810 and 810' are applied, because the pressing tool guide bearings 534 and 544 are rotated along the cam grooves 822 of the wire pressing tools 820 and 820' when the second power gear 530 and the interlocking plate 540 are rotated, the wire pressing tools 820 and 820' are rotated towards the taped wire receipt recesses 811 and thus cover and fix the wire 21 through the taped wire pressing recesses 821 during such a process, and pressure is uniformly applied to the wire 21 at both sides of the operator head 400 by the wire pressing tools 820 and 820' so as to fix the wire 21.

Here, the pressing tool guide bearings 534 and 544 moving along the cam grooves 822 are inserted into the bearing fixing recesses 823 at the ends of the cam grooves 822, thus being fixed.

Thereafter, in taping of the wire (S300*b*), the driving unit 100 is secondarily operated in the state in which the wire to be taped is confined, thereby driving the rotating power unit 500 so as to tape the wire.

Figure 33:
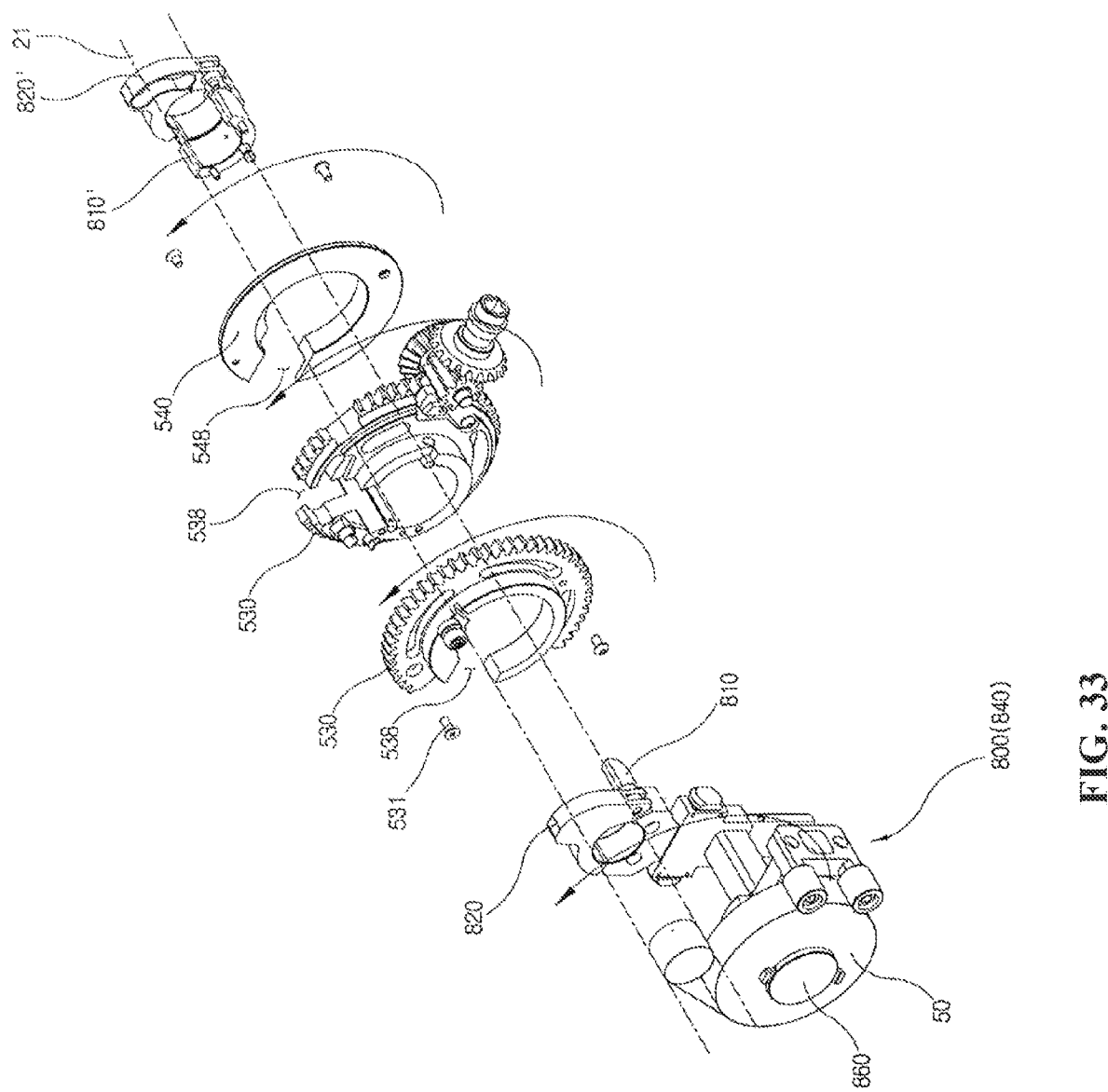
FIG. 33 is a schematic view illustrating taping of the wire in the method for taping the indirect live wire using the automatic opening and closing stripping device for indirect live wires having wire stripping and taping functions according to the present invention.
Figure 34:
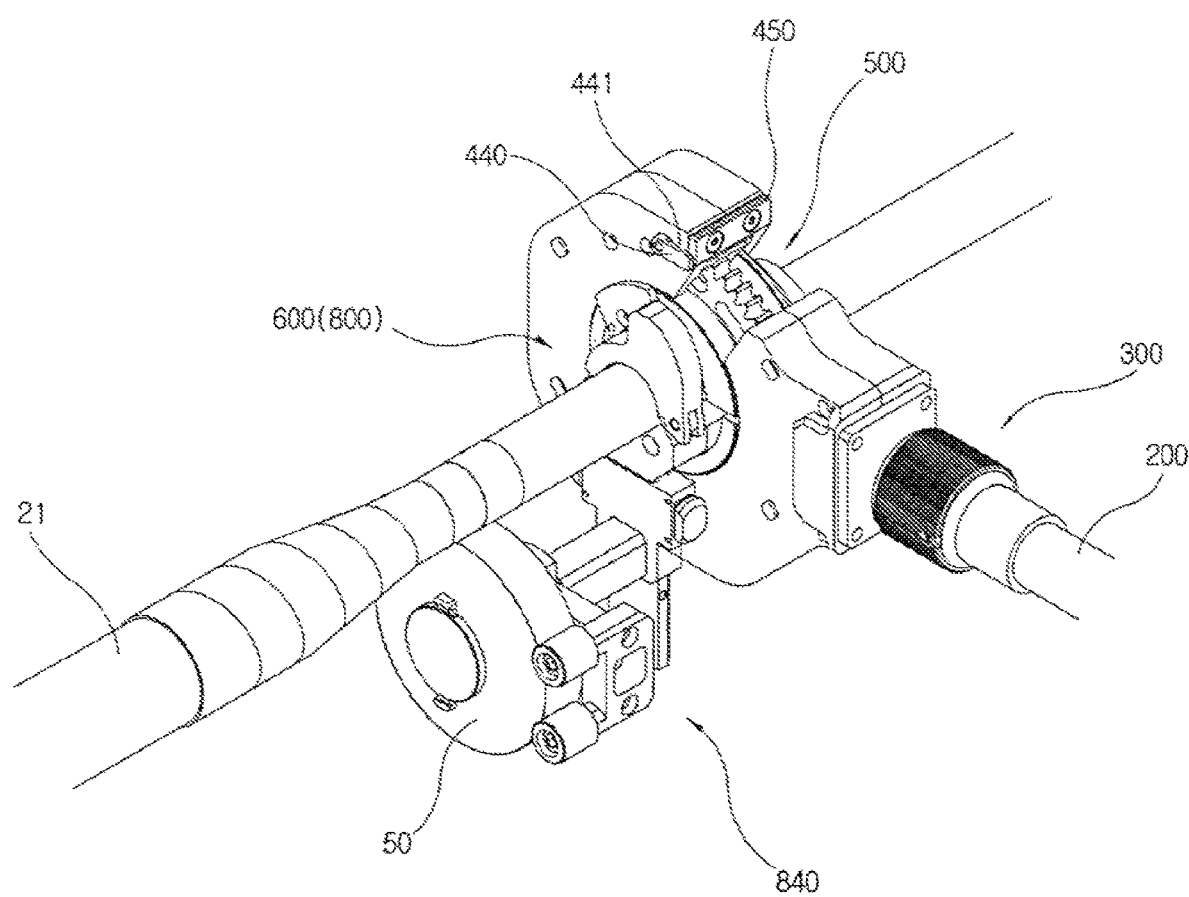
FIG. 34 is a schematic view illustrating the taped state of the wire in the method for taping the indirect live wire using the automatic opening and closing stripping device for indirect live wires having wire stripping and taping functions according to the present invention.
Figure 35:
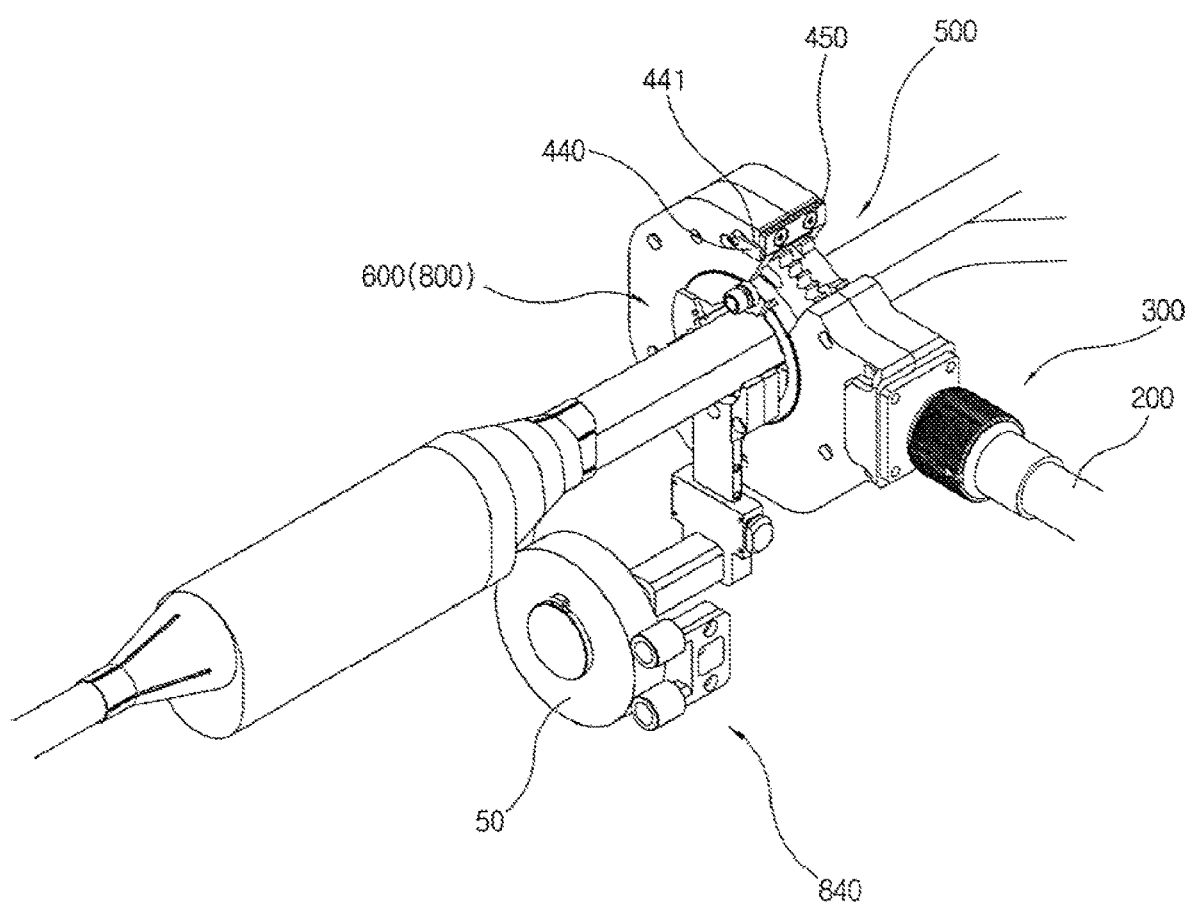
FIG. 35 is a schematic view illustrating the taped state of the wire when the inner diameter of the wire is expanded in the method for taping the indirect live wire using the automatic opening and closing stripping device for indirect live wires having wire stripping and taping functions according to the present invention.

In more detail, referring to FIGS. 33 to 35, the driving unit 100 primarily driven in the above-described manner is continuously driven in the state in which the first power gear 520, the second power gear 530 and the interlocking plate 540 are connected and supported by the power guide pins 531.

That is, when the interlocking gear 514 is continuously rotated, the interlocking gear 514 rotates the second power gear 530 and then pulls the first power gear 520 supported by the power guide pins 531 in the direction of rotation so as to rotate the first power gear 520 together, and thereby, the first and second power gears 520 and 530 and the interlocking plate 540 are simultaneously rotated.

Therefore, the taping tool 800 combined with the first power gear 520 rotates around the wire 21 together with rotation of the first and second power gears 520 and 530 and the interlocking plate 540, and the insulating tape 50 surrounds the wire 21, thus being capable of taping the wire 21 or a general dead end cover or sleeve cover.

Here, during such a taping process, the insulating tape 50 initially fixed to the tape fixing bar 440 is wound on the wire 21 simultaneously with rotation of the taping tool 800 around the wire 21 and is cut due to occurrence of tension between the wound portion and the fixed end of the insulating tape 50, and therefore, the insulting tape 50 may be smoothly rotated so as to tape the wire 21 without interference with the fixed part thereof.

Thereafter, in separation of the wire (S400*b*), the wire is separated from the operator head 400 and the insulating tape 50 is cut in the state in which taping of the wire is completed, and thereby, the automatic opening and closing stripping device 1 for indirect live wires having wire stripping and taping functions is removed.

In more detail, because the operator head 400 is separated from the wire 21 by operating the rotating power unit 500 in the opposite direction by rotating the drive shaft of the driving unit 100 using the rotating tool in the same manner as in receipt of the wire 21 (S210*a*), the operator head 400 is separated from the wire 21 in the state in which the wire lead-in groove 414 of the operator head 400, the first wire lead-in groove 528, the second wire lead-in groove 538 and the third wire lead-in groove 548 coincide with one another so as to be open, and thereby, the automatic opening and closing stripping device 1 for indirect live wires having wire stripping and taping functions may be removed from the wire 21.

Figure 36:
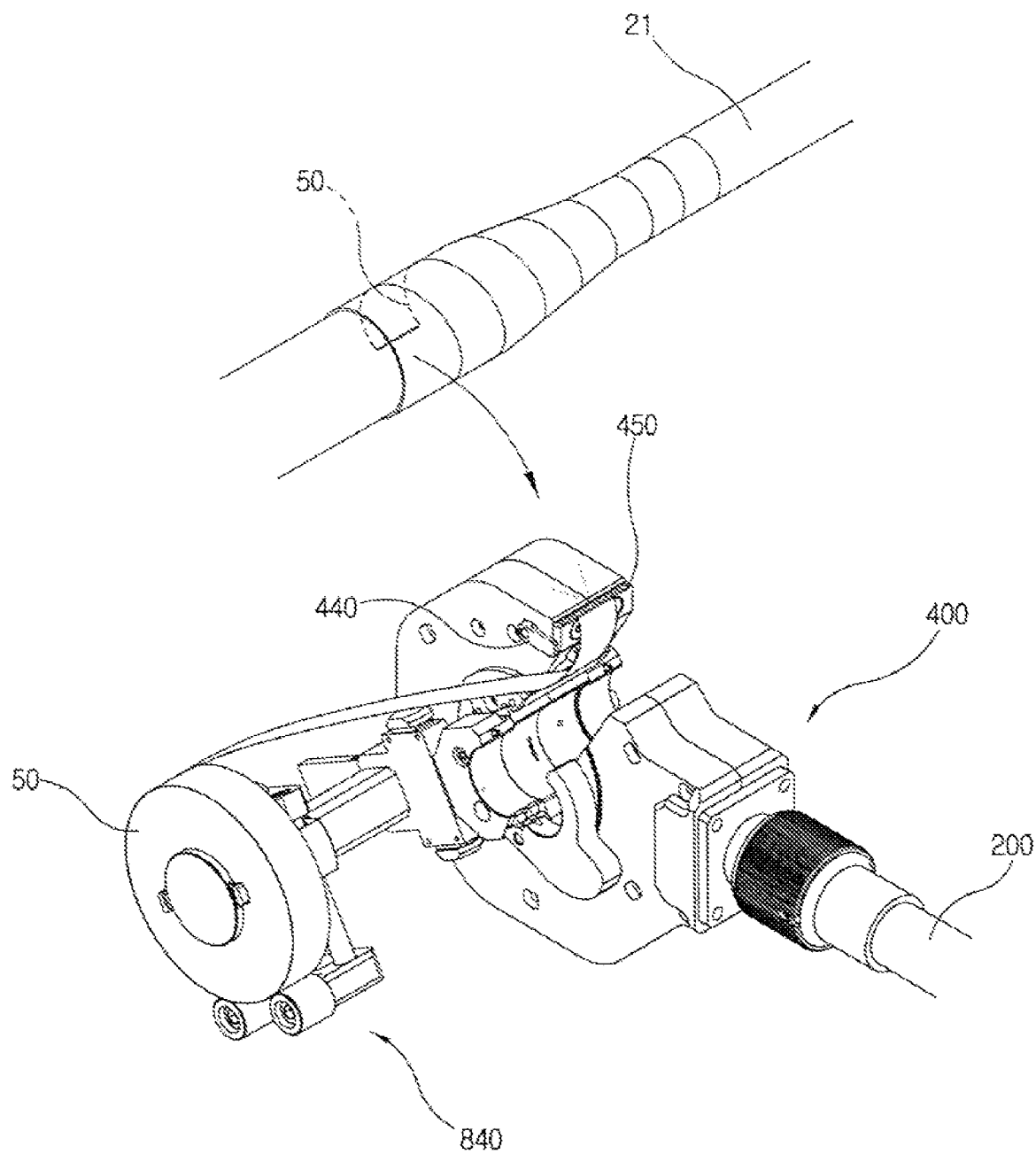
FIG. 36 is a schematic view illustrating the cut state of an insulating tape in the method for taping the indirect live wire using the automatic opening and closing stripping device for indirect live wires having wire stripping and taping functions according to the present invention.

Thereafter, the insulating tape 50 is cut, and concretely, referring to FIG. 36, the insulating tape 50 is cut while pulling the insulating tape 50 by external force in the state in which the tape cutter 450 of the operator head 400 comes into contact with a portion of the wire 21, in which taping of the insulating tape 50 is completed, behind the position of the insulating tape 50 close to the wire 21 under the condition that the handle 140 and the insulating extension stick 200 are gripped, and in this case, the end of the insulating tape 50 taped onto the wire 21 is fixedly adhered to the taped part of the wire 21.

That is, in the method for taping an indirect live wire using the automatic opening and closing stripping device for indirect live wires having wire stripping and taping functions according to the present invention, confinement and gripping of the wire and taping of the wire are continuously performed through continuous operation of the driving unit 100 in gripping of the wire (S200*b*) and taping of the wire (S300*b*) without requiring a process of confining the wire and a process of taping the wire separately, and thus, operation of the driving unit 100 and the taping operation may be very conveniently performed.

As is apparent from the above description, an automatic opening and closing stripping device for indirect live wires having wire stripping and taping functions and methods for stripping and taping an indirect live wire using the same allow an insulating stripping or taping operation to be performed on a wire while assuring a safe distance from the wire so as to perform convenient and safe indirect live wire work, and particularly, allow an operator head to be opened and closed through continuous regular rotation and reverse rotation of a driving unit during a process of confining the wire and a process of stripping or taping the wire so as to achieve convenience in operation and remarkably reduce working time.

The invention claimed is:

1. An automatic opening and closing stripping device for indirect live wires having wire stripping and taping functions, comprising:

a driving unit (100) comprising a driving unit body (110) provided in a form of a pipe having a hollow formed therein, a drive shaft (120) axially installed around the driving unit body (110) and provided with a first bevel gear (121) located therein so that a rotating tool is combined therewith, an interlocking shaft (130) axially instilled in a front part of the driving unit body (110) and provided with a second bevel gear (131) provided at a rear part of the interlocking shaft (130) so as to be engaged with the first bevel gear (121), and a handle (140) combined with a rear part of the driving unit body (110) and configured to provide rotating power;

an insulating extension stick (200) provided in a form of a pipe having a hollow formed therein, combined with a front part of the driving unit body (110), configured to have a designated length so as to protrude, and provided with a power transmission rod (210) formed therein without interference and combined with the interlocking shaft (130) so as to be rotated by receiving the rotating power;

an adaptor unit (300) comprising an adaptor body (310) provided in a form of a pipe and configured such that a front part of the insulating extension stick (200) is combined with the adaptor unit (300), and an adaptor rod (320) provided inside the adaptor body (310) and configured such that the power transmission rod (210) is combined with a rear part of the adaptor rod (320);

an operator head (400) provided with an adapter combination pipe (411) provided at a rear end of the operator head (400) so as to be inserted into the adaptor body (310), a rotation guide hole (412) formed through a center of the operator head (400) in a width direction and provided with power unit receipt recesses (413) respectively formed at both sides of an inside of the rotation guide hole (412), and a wire lead-in groove (414) formed at an upper part of the operator head (400) so as to lead a wire thereinto;

a rotating power unit (500) combined with the power unit receipt recesses (413) of the operator head (400) so as to lead the wire thereinto together with the operator head (400), and rotated by receiving the rotating power from the adaptor unit (300); and a working tool (600) detachably combined with the rotating power unit (500) so as to perform stripping or taping of the wire placed in the working tool (600) through a rotating operation of the rotating power unit (500), wherein the working tool (600) comprises any one of a stripping tool (700) configured to strip the wire and a taping tool (800) configured to tape the wire, and is mounted on the rotating power unit (500).

2. The automatic opening and closing stripping device for indirect live wires having wire stripping and taping functions according to claim 1, wherein:

a tape fixing bar (440) configured to have a tape fixing groove (441) formed between a side surface of the operator head (400) and tape fixing bar (440) is provided at one side of the operator head (400) in the width direction; and a tape cutter (450) configured to cut an insulating tape is provided at an upper end of the operator head (400) configured to form the tape fixing groove (441).

3. The automatic opening and closing stripping device for indirect live wires having wire stripping and taping functions according to claim 1, further comprising a locking unit (350) configured to control detachable combination between the adaptor unit (300) and the operator head (400), wherein, in the locking unit (350):

a locking guide groove (351) is formed in a circumference of the adaptor body (310), a plurality of ball receipt recesses (353) configured such that locking balls (352) are inserted thereinto so as to protrude towards an inside of the adaptor body (310) is formed on a circumference of the locking guide groove (351) at designated intervals, a stopper (354) is provided on a circumference of a front part of the locking guide groove (351), and protruding guide pins (355) configured to protrude outwards are provided at a rear end of the adaptor body (310);

semicircular ball locking recesses (411a) configured such the locking balls (352) protruding towards the inside of the adaptor body (310) are engaged therewith are provided on a circumference of the adapter combination pipe (411);

a locking lever (360) elastically installed at a rear end of the locking guide groove (351) by a spring so as to have forward protruding force and to control protrusion of the locking balls (352) is further provided on the circumference of the adaptor body (310); and a pressing protrusion (361) configured to apply pressure to the locking balls (352) and provided with a spring elastically installed behind the pressing protrusion (361) is provided on an inner circumference surface of the locking lever (360), a stopping protrusion (362) engaged with the stopper (354) is provided on a front part of the inner circumference surface of the locking lever (360), and a protruding guide groove (363) guided by the protruding guide pins (355) is provided in a rear part of the locking lever (360).

4. The automatic opening and closing stripping device for indirect live wires having wire stripping and taping functions according to claim 1, wherein the rotating power unit (500) comprises:

a power transmission unit (510) provided inside the operator head (400), and comprising a power bevel gear (511) provided with a rear part combined with the adaptor rod (320) so as to receive the rotating power from the adaptor rod (320), and a power transmission shaft (512) provided with an interlocking bevel gear (513) engaged with the power bevel gear (511) inside the operator head (400) and an interlocking gear (514) provided coaxially with the interlocking bevel gear (513);

a first power gear (520) inserted into the operator head (400), and provided with a holder installation hole (521) having holder fixing pins (522) provided at a center thereof so as to guide slidable installation and fixation of the working tool (600) comprising the stripping tool (700) and the taping tool (800), a first gear part (523) provided on a circumference of the first power gear (520) so as to have an idling recess (524) formed at one side of the first gear part (523) by removing gear teeth and engaged with the interlocking gear (514) of the power transmission shaft (512), a first shaft pipe (526) configured to protrude from both sides of the first power gear (520) so as to be exposed from the rotation guide hole (412) and to have an expanding projection (525) provided on a circumference of the first shaft pipe (526) at one side of the first power gear (520), a pair of "arc-shaped" power guide grooves (527) formed around the first shaft pipe (526), and a first wire lead-in groove (528) formed on the circumference of the first power gear (520) and configured to correspond to the wire lead-in groove (414) so as to open the holder installation hole (521);

a second power gear (530) combined with one side surface of the first power gear (520) so as to surround the first shaft pipe (526) and connected to the first power gear (520) by power guide pins (531) configured to pass through the power guide grooves (527), and provided with a second gear part (532) provided on a circumference of the second power gear (530) so as to have the same gear structure as the first gear part (523) and engaged with the interlocking gear (514) of the power transmission shaft (512), a second shaft pipe (533) configured to protrude from an outer surface of the second power gear (530) so as to pass through the rotation guide hole (412) and to have a pressing tool guide bearing (534) provided at an end of one side of the second shaft pipe (533), and a second wire lead-in groove (538) formed on the circumference of the second power gear (530) and configured to correspond to the wire lead-in groove (414);

an interlocking plate (540) provided at a remaining side of the first power gear (520) so as to surround the first shaft pipe (526) and connected to the first power gear (520) by the power guide pins (531) configured to pass through the power guide grooves (527), and provided with a third shaft pipe (541) axially installed so as to pass through the rotation guide hole (412) and to have a pressing tool guide bearing (544) provided at an end of one side of the third shaft pipe (541) so as to correspond to the pressing tool guide bearing (534), and a third wire lead-in groove (548) formed on a circumference of the interlocking plate (540) and configured to correspond to the first wire lead-in groove (528), and a pair of finishing members (550, 550') combined with the first shaft pipe (526) of the first power gear (520) at both sides of the operator head (400) and configured to interfere with the circumference of the operator head (400) so as to prevent release of the first power gear (520), the second power gear (530) and the interlocking plate (540) from one another.

5. The automatic opening and closing stripping device for indirect live wires having wire stripping and taping functions according to claim 4, wherein, in the expanding projection:

a stopper operation groove (525a) is provided so as to be open along a circumference of the expanding projection and to have an inclined engagement plane (525b); and an anti-rotation stopper (560), provided with one side axially combined with the stopper operation groove (525a) so that the anti-rotation stopper (560) is rotatable, a remaining side having a spring installed therein so as to spread outwards when external force is applied thereto, and a stopping protrusion (561) provided at an end of the anti-rotation stopper (560), is provided in the stopper operation groove (525a); and wherein, in the operator head (400):

an elastic movement recess (420) is formed at a position corresponding to the circumference of the first power gear (520); and an elastic projection (430), provided with one side axially combined with the elastic movement recess (420) so that the elastic projection (430) is rotatable, a remaining side having a spring installed therein so as to have protruding force towards the power unit receipt recess (413), is formed in the elastic movement recess (420), and an inclined plane (431) provided at one side of a protruding end of the elastic projection (430) so as to allow the stopping protrusion (561) to climb thereover when the first power gear (520) is rotated in a wire-stripping or wire-taping direction, is provided in the elastic movement recess (420).

6. The automatic opening and closing stripping device for indirect live wires having wire stripping and taping functions according to claim 4, wherein:

power gear fixing pins (415, 415') in two rows are provided on an inner surface of the power unit receipt groove (413) at one side of the operator head (400), and a pair of power gear fixing protrusions (529, 529') configured to react to the power gear fixing pins (415, 415') and to have protruding force due to springs elastically installed therein is provided on the first power gear, wherein inclined planes (529a, 529a') are formed on outer surfaces of the respective power gear fixing protrusions (529, 529').

7. The automatic opening and closing stripping device for indirect live wires having wire stripping and taping functions according to claim 4, wherein, in the first power gear:

a holder combination hole (526a) is formed at one side end of the first shaft pipe (526), an elastic fixing pin (526b) configured to interfere with an inside of the holder combination hole (526a) is inserted into the first shaft pipe (526), and an elastic guide groove (526c) configured to communicate with the holder combination hole (526a) so as to elastically guide the elastic fixing pin (526b) is formed.

8. The automatic opening and closing stripping device for indirect live wires having wire stripping and taping functions according to claim 1, wherein e stripping tool (700) comprises:

a pair of stripping tool holders (710, 710') provided with semicircular stripped wire receipt recesses (711) configured to be open upwards and mounted on the rotating power unit (500) at both sides of the operator head (400);

a pair of wire pressing tools (720, 720') hinged to the respective stripping tool holders (710, 710') so as to be rotated, and provided with stripped wire pressing recesses (721) formed on inner circumferential surfaces of the wire pressing tools (720, 720') so as to correspond to the stripped wire receipt recesses (711), and arc-shaped cam grooves (722) having bearing fixing recesses 3) bent and provided at ends of the respective cam grooves (722); and a stripping unit (730) provided at one stripping tool holder (710) so as to perform stripping of the wire, wherein:

a stripping blade guide bearing (724) configured to control entry stripping unit (730) is provided on an outer surface of one wire pressing tool (720); and cutting protrusions (725, 725') configured to protrude from inner circumferential surfaces of the stripping wire receipt recess (711) and the stripping wire pressing recess (721) are provided on a remaining stripping tool holder (710') and a remaining wire pressing tool (720').

9. The automatic opening and closing stripping device for indirect live wires having wire stripping and taping functions according to claim 8, wherein:

the stripping tool holders (710, 710') are configured to have guide coupling force through guide pins (714a);

a holder combination pin (718) slidably passes through a center of the stripping tool holder (710) from outside so as to have retreating force due to a spring elastically installed therein;

a holder combination hole (715) configured such that the holder combination pin (718) is inserted thereinto is formed through a center of the stripping tool holder (710') corresponding to the stripping tool holder (710), an elastic fixing pin (716) is inserted into the stripping tool holder (710') so as to interfere with an inside of the holder combination hole (715), and an elastic guide groove (717) configured to communicate with the holder combination hole (715) so as to elastically guide the elastic fixing pin (716) is formed in the stripping tool holder (710');

an inclined plane (718a) configured to interfere with the elastic fixing pin (716) is formed at a front end of the holder combination pin (718), and a fixing pin engagement groove (718h) configured to have an arc shape so that the elastic fixing pin (716) is engaged therewith is formed in a circumference of a front part of the holder combination pin (718); and when the holder combination pin (718) is adjusted to be rotated, a circumference of the holder combination pin (718) interferes with the elastic fixing pin (716) and thus the stripping tool holders (710, 710') are separated from each other, and when the elastic fixing pin (716) is received in the holder combination hole (715), the stripping tool holders (710, 710') are coupled to each other.

10. The automatic opening and closing stripping device for indirect live wires having wire stripping and taping functions according to claim 8, wherein:
- a stripping blade guide groove (719a) configured to guide the stripping unit (730) to an inside of the stripping wire receipt recess (711) and a spring installation groove (719b) are provided in the stripping tool holder (710); and
- the stripping unit (730) comprises:
- a stripping blade holder (740) slidably combined with the stripping blade guide groove (719a) so as to have retreating force due to a spring (S) elastically installed in the spring installation groove (719b), and provided with a pressing support (741) provided at one side of the stripping blade holder (740) so as to apply pressure to the stripping blade guide bearing (724); and
- a stripping blade (750) combined with the stripping blade holder (740) so as to protrude towards the stripping wire receipt recess (711).

11. The automatic opening and closing stripping device for indirect live wires having wire stripping and taping functions according to claim 10, wherein:
- a sheath collection bar (760) configured to protrude is provided on an outer surface of the stripping tool holder (170), and a discharge guide hole (770) is provided in one side of the stripping tool holder (710); and
- the stripping blade holder (740) comprises a discharge guide member (780) provided behind the stripping blade (750) and configured to have an inclined guide plane (781) so as to guide and discharge a sheath stripped from the wire to the discharge guide hole (770),
- wherein the sheath collection bar (760) comprises:
- a winder spring (761) formed of a coiled spring having a designated length so that the sheath is wound thereon; and
- an engagement projection (762) expanded to have a greater diameter than a diameter of the winder spring (761) so as to prevent release of the sheath wound thereon.

12. The automatic opening and closing stripping device for indirect live wires having wire stripping and taping functions according to claim 1, wherein the taping tool (800) comprises:
- a pair of taping tool holders (810, 810') provided with semicircular taping wire receipt recesses (811) configured to be open upwards and mounted on the rotating power unit (500) at both sides of the operator head (400);
- a pair of wire pressing tools (820, 820') hinged to the respective taping tool holders (810, 810') so as to be rotated, and provided with taped wire pressing recesses (821) formed on inner circumferential surfaces of the wire pressing tools (820, 820') so as to correspond to the taped wire receipt recesses (811), and arc-shaped cam grooves (822) having bearing fixing recesses (823) bent and provided at ends of the respective cam grooves (822);
- a taping machine mount unit (830) comprising a mount bar (831) configured to protrude perpendicularly from an outer surface of one taping tool holder (810) and provided with engagement recesses (832) provided in multiple stages and formed in a length direction at both sides of the mount bar (831) and an extension recess (833) formed in an upper end of the mount bar (831) so as to have the same diameter as a diameter of the taped wire receipt recess (811), and an interval adjuster (835) slidably combined with the mount bar (831) and comprising fixing levers (836) provided at both sides thereof so as to control engagement force applied to the engagement recesses (832) due to springs elastically installed therein and a shaft combination pipe (837) configured to protrude from one side surface of the interval adjuster (835) perpendicularly to the mount bar (831); and
- a taping machine (840) provided with a combination shaft (851) provided at one side thereof so as to be combined with the taping machine mount unit (830), and rotated so as to perform taping of the wire when the rotating power unit (500) is rotated.

13. The automatic opening and closing stripping device for indirect live wires having wire stripping and taping functions according to claim 12, wherein:
- the taping tool holders (810, 810') are configured to have guide coupling force through guide pins (814a);
- a holder combination hole (815) is formed through a center of an end of one taping tool holder (810) corresponding to a remaining taping tool holder (810'), an elastic fixing pin (816) configured to interfere with an inside of the holder combination hole (815) is inserted into the taping tool holder (810), and an elastic guide groove (817) configured to communicate with the holder combination hole (815) so as to elastically guide the elastic fixing pin (816) is formed in the taping tool holder (810);
- a holder combination pin (818) slidably passes through a center of the taping tool holder (810') from outside so that an end of the holder combination pin (818) is inserted into the holder combination hole (815), and is configured to have retreating force due to a spring elastically installed therein;
- an inclined plane (818a) configured to interfere with elastic fixing pin (816) is formed at a front end of the holder combination pin (818), and a fixing pin engagement groove (818b) configured to have an arc shape so that the elastic fixing pin (816) is engaged therewith is formed in a circumference of a front part of the holder combination pin (818); and
- when the holder combination pin (818) is adjusted to be rotated, a circumference of the holder combination pin (818) interferes with the elastic fixing pin (816) and thus the taping tool holders (810, 810') are separated from each other, and when the elastic fixing pin (816) is received in the fixing pin engagement groove (818b), the taping tool holders (810, 10') are coupled to each other.

14. The automate opening and closing stripping device for indirect live wires having wire stripping and taping functions according to claim 12, wherein the taping machine (840) comprises:
- a taping machine body (850) provided with a combination shaft (851) provided on one side surface thereof and a sliding hole (852) formed in an upper part thereof;
- a tape mount unit (860) configured to protrude from a remaining side surface of the taping machine body (850) so that an insulating tape is mounted on the tape mount unit (860); and
- a tension unit (880) provided on the taping machine body (850) so as to apply tension to the insulating tape,
- wherein the tape mount unit 860 comprises:
- a bobbin (861) configured to protrude from the taping machine body (850); and
- a bobbin finishing cap (865) configured to have a greater diameter than a diameter of the bobbin (861) and to open and close a front end of the bobbin (861) so as to control mounting and fixation of the insulating tape.

15. The automatic opening and closing stripping device for indirect wires having wire stripping and taping functions according to claim 14, wherein the tension unit (880) comprises:
- a slider (881) provided with a lower part slidably inserted into the sliding hole (852) of the taping machine mount body (850), and a nut sliding hole (881*a*) formed in the slider (881);
- a pair of guide rods (882) provided with upper ends fixed to both sides of the slider (881) and lower ends configured to pass through the taping machine body (850) and then to protrude downwards;
- a connector (883) configured to fixedly connect the lower ends of the guide rods (882) and provided with a pair of cylindrical tension members (883*a*) configured to correspond to a circumference of the bobbin (861);
- a screw shaft (884) configured to pass through the taping machine body (850) and the connector (883) and provided with an upper end axially installed on the slider (881);
- a nut (885) screwed to the screw shaft (884) inside the nut sliding hole (881*a*) be moved depending on rotation of the screw shaft; and
- a tension spring (886) elastically installed between the nut and an inside of the sliding hole (852) of the taping machine body (850),
- wherein the nut (885) is moved depending on rotation of the screw shaft (884), and thus, adjusts elasticity of the tension spring (886).

16. The automatic opening and closing stripping device for indirect live wires having wire stripping and taping functions according to claim 12, wherein the taping tool (800) further comprises an extension shaft (890),
- wherein the extension shaft (890) is configured such that a combination projection (891) inserted into the shaft combination pipe (837) of the taping machine mount unit (830) protrudes from one side of the extension shaft (890) and a second shaft combination pipe (892) combined with the combination shaft (851) of the taping machine (840) is provided at a remaining side of the extension shaft (890).

17. The automatic opening and closing stripping device for indirect live wires having wire stripping and taping functions according to claim 1, wherein the taping tool (800) comprises:
- a single taping tool holder (801) configured to have a semicircular taped wire inner diameter expansion receipt recess (802) configured to be open upwards and mounted on the rotating power unit (500) on the operator head (400);
- a taping machine mount unit (830) comprising a mount bar (831) configured to protrude perpendicularly from an outer surface of the taping tool holder (801) and provided with engagement recesses (832) provided in multiple rows and formed in a length direction at both sides of the mount bar (831) and an extension recess (833) formed in an upper end of the mount bar (831) so as to have the same diameter as a diameter of the taped wire inner diameter expansion receipt recess (802), and an interval adjuster (835) slidably combined with the mount bar (831) and comprising fixing levers (836) provided at both sides thereof so as to control engagement force applied to the engagement recesses (832) due to springs elastically installed therein and a shaft combination pipe (837) configured to protrude from one side surface of the interval adjuster (835) perpendicularly to the mount bar (831); and
- a taping machine (840) provided with a combination shaft (851) provided at one side thereof so as to be combined with the taping machine mount unit (830), and rotated so as to perform taping of the wire when the rotating power unit (500) is rotated.

18. The automatic opening and closing stripping device for indirect live wires having wire stripping and taping functions according to claim 17, wherein:
- a holder combination pin (838) slidably passes through a center of the mount bar (831) behind the taping tool holder (801) so as to protrude towards the rotating power unit (500) and to have retreating force due to a spring elastically installed therein; and
- an inclined plane (838*a*) is formed at a front end of the holder combination pin (838), and a fixing pin engagement groove (838*b*) configured to have an arc shape is formed in a circumference of a front part of the holder combination pin (838).

19. The automatic opening and closing stripping device for indirect live wires having wire stripping and taping functions according to claim 14, wherein the taping machine (840) comprises:
- a taping machine body (850) provided with a combination shaft (851) provided on one side surface thereof and a sliding hole (852) formed in an upper part thereof;
- a tape mount unit (860) configured to protrude from a remaining side surface of the taping machine body (850) so that an insulating tape is mounted on the tape mount unit (860); and
- a tension unit (880) provided on the taping machine body (850) so as to apply tension to the insulating tape,
- wherein the tape mount unit 860 comprises:
  - a bobbin (861) configured to protrude from the taping machine body (850); and
  - a bobbin finishing cap (865) configured to have a greater diameter than a diameter of the bobbin (861) and to open and close a front end of the bobbin (861) so as to control mounting and fixation of the insulating tape.

20. The automatic opening and closing stripping device for indirect live wires having wire stripping and taping functions according to claim 19, wherein the tension unit (880) comprises:
- a slider (881) provided with a lower part slidably inserted into the sliding hole (852) of the taping machine mount body (850), and a nut sliding hole (881*a*) formed in the slider (881);
- a pair of guide rods (882) provided with upper ends fixed to both sides of the slider (881) and lower ends configured to pass through the taping machine body (850) and then to protrude downwards;
- a connector (883) configured to fixedly connect the lower ends of the guide rods (882) and provided with a pair of cylindrical tension members (883*a*) configured to correspond to a circumference of the bobbin (861);
- a screw shaft (884) configured to pass through the taping machine body (850) and the connector (883) and provided with an upper end axially installed on the slider (881);
- a nut (885) screwed to the screw shaft (884) inside the nut sliding hole (881*a*) so as to be moved depending on rotation of the screw shaft; and
- a tension spring (886) elastically installed between the nut (885) and an inside of the sliding hole (852) of the taping machine body (850), wherein the nut (885) is moved depending on rotation of the screw shaft (884), and thus, adjusts elasticity of the tension spring (886).

21. The automatic opening and closing stripping device for indirect live wires having wire stripping and taping functions according to claim 17, wherein the taping tool (800) further comprises an extension shaft (890),
wherein the extension shaft (890) is configured such that a combination projection (891) inserted into the shaft combination pipe (837) of the taping machine mount unit (830) protrudes from one side of the extension shaft (890) and a second shaft combination pipe (892) combined with the combination shaft (851) of the taping machine (840) is provided at a remaining side of the extension shaft (890).

22. The automatic opening and closing stripping device for indirect live wires having wire stripping and taping functions according to claim 1, wherein the wire to be stripped or taped, inserted into the operator head (400) and the rotating power unit (500), is capable of being confined by operating the rotating unit (500), and being stripped or taped using the working tool (600) by operating the rotating power unit (500) through continuous rotation manipulation of the driving unit (100).

23. A method for stripping an indirect live wire using an automatic opening and closing stripping device for indirect live wires having wire stripping and taping functions which has a driving unit (100) configured to provide rotating power, an insulating extension stick (200) combined front part of the driving unit body (110) and configured to protrude, an adaptor unit (300) configured such that a front part of the insulating extension stick (200) is combined therewith, an operator head (400) combined with the adaptor unit (300), a rotating power unit (500) combined with the operator head (400) so as to be rotated, and a working tool (600) combined with the rotating power unit (500) so as to strip the wire, the method comprising:
preparing for an operation (S100a) such that the automatic opening and closing stripping device for indirect live wires having wire stripping and taping functions to strip the wire is prepared by mounting a stripping tool (700) as the working tool (600) on the rotating power unit (500) on the operator head (400) using stripping tool holders (710, 710'), and the prepared automatic opening and closing stripping device for indirect live wires having wire stripping and taping functions approaches an electric line;
gripping a wire (S200a) such that a worker inserts the wire into the operator head (400) at a safe distance from the wire using the insulating extension stick (200) of the prepared automatic opening and closing stripping device (1) for indirect live wires having wire stripping and taping functions;
stripping the wire (S300a) such that the wire is stripped by driving the rotating power unit (500) in a regular direction by operating the driving unit (100) though rotation of a rotating tool in an indirect live wire state at the safe distance from the wire through the insulating extension stick (200); and
separating the wire (400) (S400a) such that a sheath stripped from the wire is cut in a state in which stripping of the wire is completed, and the wire is separated from the operator head (400) by driving the rotating power unit (500) in a reverse direction.

24. The method according to claim 23, wherein the gripping the wire (S200a) and the stripping the wire (S300a) are continuously performed through continuous rotation manipulation of the driving unit (100).

25. The method according to claim 23, wherein the gripping the wire (S200a) comprises:
receiving the wire (S210a) such that the worker, located at the safe distance from the wire using the insulating extension stick (200) of the prepared automatic opening and closing stripping device (1) for indirect live wires having wire stripping and taping functions, inserts the wire into stripped wire receipt grooves (711) of stripping tool holders (710, 710') in a state in which a wire lead-in groove (414) formed in the operator head (400), a first wire lead-in groove (528) of a first power gear (520), a second wire lead-in groove (538) of a second power gear (530) and a third wire lead-in groove (548' of an interlocking plate (540) coincide with one another so as to be open; and
confining the wire (S220a) such that the rotating power unit (500) is operated by rotating a drive shaft of the driving unit (100) using the rotating tool, and in this case, the wire is confined by closing the wire lead-in groove (41.4) and the first wire lead-in groove (528) by operating the second power gear (530) and the interlocking plate (540) and rotating power guide pins (531) so as to come into contact with ends of power guide grooves (527), and simultaneously, pressure is applied to the wire so as to confine the wire and a stripping blade (750) of a stripping unit (730) penetrates the sheath of the wire through pressure by rotating wire pressing tools (720, 720') together with the second power gear (530).

26. The method according to claim 23, wherein, in the stripping the wire (S300a), the rotating power unit (500) is operated by rotating a drive shaft of the driving unit (100) using the rotating tool, and in this case, the wire is stripped through a stripping blade (750) of a stripping unit (730) by simultaneously rotating the first power gear (520) and the second gear (530) and the interlocking plate (540) in a state in which the first power gear (520) and the second gear (530) and the interlocking plate (540) are connected by power guide pins (531).

27. The method according to claim 23, wherein, in the separating the wire (S400a):
the stripped sheath is cut through cutting protrusions (725, 725') by twisting the automatic opening and closing stripping device (1) for indirect live wires having wire stripping and taping functions; and
the automatic opening and closing stripping device (1) for indirect live wires having wire stripping and taping functions is separated from the stripped wire in a state in which a wire lead-in groove (414) formed in the operator head (400), a first wire lead-in groove (528) of a first power gear (520), a second wire lead-in groove (538) of a second power gear (530) and a third wire lead-in groove (548) of an interlocking plate (540) coincide with one another so as to be open by driving the rotating power unit (500) in the reverse direction by rotating a drive shaft of the driving unit (100) using the rotating tool.

28. A method for taping an indirect live wire using an automatic opening and closing stripping device for indirect live wires having wire stripping and taping functions which has a driving unit (100) configured to provide rotating power, an insulating extension stick (200) combined with a front part of the driving unit body (110) and configured to protrude, an adaptor unit (300) configured such that a front part of the insulating extension stick (200) is combined therewith, an operator head (400) combined with the adaptor unit (300), a rotating power unit (500) combined with the operator head (400) and rotated, and a working tool (600) combined with the rotating power unit (500) so as to tape the wire, the method comprising:

preparing for an operation (S100b) such that the automatic opening and closing stripping device for indirect live wires having wire stripping and taping functions so as to tape the wire is prepared by mounting a taping tool (800) as the working tool (600) on the rotating power unit (500) on the operator head (400) using taping tool holders (810, 810') or a single taping tool holder (801) and mounting an insulting tape on a bobbin (861), applying pressure to a circumference of the insulating tape using tension members (883a) and unwinding the insulating tape so that an end of the insulating tape is fixed to a tape fixing bar (440), and the prepared automatic opening and closing stripping device for indirect live wires having wire stripping and taping functions approaches an electric line;

gripping a wire (S200b) such that a worker inserts the wire into the operator head (400) at a safe distance from the wire using the insulating extension stick (200) of the prepared automatic opening and closing stripping device (1) for indirect live wires having wire stripping and taping functions;

taping the wire (S300b) such that the wire is taped by driving the rotating power unit (500) in a regular direction by operating the driving unit (100) though rotation of a rotating tool in an indirect live wire state at the safe distance from the wire through the insulating extension stick (200); and separating the wire (400) (S400b) such that the wire is separated from the operator head (400) by driving the rotating power unit (500) in a reverse direction in a state in which taping of the wire is completed, and the insulating tape is cut.

29. The method according to claim 28, wherein the gripping the wire (S200b) and the taping the wire (S300b) are continuously performed through continuous rotation manipulation of the driving unit (100).

30. The method according to claim 28, wherein the gripping the wire (S200b) comprises:

receiving the wire (S210b) such that the worker, located at the safe distance from the wire using the insulating extension stick (200) of the prepared automatic opening and closing stripping device (1) for indirect live wires having wire stripping and taping functions, inserts the wire into stripped wire receipt grooves (811) of taping tool holders (810, 810') in a state in which a wire lead-in groove (414) formed in the operator head (400), a first wire lead-in groove (528) of a first power gear (520), a second wire lead-in groove (538) of a second power gear (530) and a third wire lead-in groove (548) of an interlocking plate (540) coincide with one another so as to be open; and confining the wire (S220b) such that the rotating power unit (500) is operated by rotating a drive shaft of the driving unit (100) using the rotating tool, and in this case, the wire is confined by closing the wire lead-in groove (414) and the first wire lead-in groove (528) by operating the second power gear (530) and the interlocking plate (540) and rotating power guide pins (531) so as to come into contact with ends of power guide grooves (527).

31. The method according to claim 28, wherein, in the taping stripping the wire (S300b), the rotating power unit (500) is operated by rotating the drive shaft of the driving unit (100) using the rotating tool, and in this case, the wire is taped by simultaneously rotating the first power gear (520) and the second gear (530) and the interlocking plate (540) in a state in which the first power gear (520) and the second gear (530) and the interlocking plate (540) are connected by power guide pins (531), and rotating the taping tool (800).

32. The method according to claim 28, wherein, in the separating the wire (S400b):

the operator head (400) is separated from the taped wire in a state in which a wire lead-in groove (414) formed in the operator head (400), a first wire lead-in groove (528) of a first power gear (520), a second wire lead-in groove (538) of a second power gear (530) and a third wire lead-in groove (548) of an interlocking plate (540) coincide with one another so as to be open by driving the rotating power unit (500) in the reverse direction by rotating a drive shaft of the driving unit (100) using the rotating tool; and the automatic opening and closing stripping device (1) for indirect live wires having wire stripping and taping functions is removed by cutting the insulating tape using a tape cutter (450) of the operator head (400).

\* \* \* \* \*